United States Patent
Rubin et al.

(10) Patent No.: US 12,416,752 B2
(45) Date of Patent: Sep. 16, 2025

(54) POLARIZATION STATE GENERATION WITH A METASURFACE

(71) Applicant: PRESIDENT AND FELLOWS OF HARVARD COLLEGE, Cambridge, MA (US)

(72) Inventors: Noah A. Rubin, Cambridge, MA (US); Federico Capasso, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 97 days.

(21) Appl. No.: 18/528,721

(22) Filed: Dec. 4, 2023

(65) Prior Publication Data
US 2024/0142686 A1    May 2, 2024

Related U.S. Application Data

(63) Continuation of application No. 17/500,913, filed on Oct. 13, 2021, now Pat. No. 11,867,937, which is a continuation of application No. 16/964,058, filed as application No. PCT/US2019/014975 on Jan. 24, 2019, now Pat. No. 11,169,311.

(60) Provisional application No. 62/621,453, filed on Jan. 24, 2018.

(51) Int. Cl.
*G02B 5/30* (2006.01)
*G01J 4/04* (2006.01)

(52) U.S. Cl.
CPC ............. *G02B 5/3025* (2013.01); *G01J 4/04* (2013.01)

(58) Field of Classification Search
CPC .. G02B 5/3025; G02B 5/1809; G02B 27/286; G02B 5/3058; G01J 4/04; G01M 11/00; G02F 2202/30
See application file for complete search history.

(56) References Cited

U.S. PATENT DOCUMENTS

| | | | |
|---|---|---|---|
| 5,085,496 A | 2/1992 | Yoshida et al. | |
| 5,337,146 A | 8/1994 | Azzam | |
| 5,840,447 A * | 11/1998 | Peng | G03F 1/28 430/5 |

(Continued)

FOREIGN PATENT DOCUMENTS

| | | |
|---|---|---|
| CN | 1044991 A | 8/1990 |
| CN | 100476504 C | 4/2009 |

(Continued)

OTHER PUBLICATIONS

Chen et al.: "Integrated plasmonic metasurfaces for spectropolarimetry" Nanotechnology, Institute of Physics Publishing, GB, vol. 27, No. 22; Apr. 26, 2016, 7 pages.

(Continued)

*Primary Examiner* — Roy M Punnoose
(74) *Attorney, Agent, or Firm* — FOLEY & LARDNER LLP

(57) ABSTRACT

The present disclosure provides an optical component, which may be a metasurface grating, including (a) a substrate; and (b) an array of subwavelength-spaced phase-shifting elements, which are tessellated on the substrate to produce, when illuminated with a polarized incident light, a diffracted light beam with a distinct polarization state for each of a finite number of diffraction orders, wherein the finite number is 2 or more.

23 Claims, 48 Drawing Sheets

(56) References Cited

U.S. PATENT DOCUMENTS

| | | |
|---|---|---|
| 6,097,856 A | 8/2000 | Hammond |
| 6,731,839 B2 | 5/2004 | Bhagavatula et al. |
| 6,825,986 B2 | 11/2004 | Ashkinazy et al. |
| 6,924,457 B2 | 8/2005 | Koyama et al. |
| 6,927,922 B2 | 8/2005 | George et al. |
| 7,061,612 B2 | 6/2006 | Johnston |
| 7,061,693 B2 | 6/2006 | Zalevsky |
| 7,171,078 B2 | 1/2007 | Sasaki et al. |
| 7,171,084 B2 | 1/2007 | Izumi et al. |
| 7,186,969 B2 | 3/2007 | Shimomura et al. |
| 7,241,988 B2 | 7/2007 | Gruber et al. |
| 7,324,210 B2 | 1/2008 | De Groot et al. |
| 7,327,468 B2 | 2/2008 | Maznev et al. |
| 7,402,131 B2 | 7/2008 | Mueth et al. |
| 7,450,618 B2 | 11/2008 | Dantus et al. |
| 7,547,874 B2 | 6/2009 | Liang |
| 7,561,264 B2 | 7/2009 | Treado et al. |
| 7,576,899 B2 | 8/2009 | Kanesaka et al. |
| 7,679,830 B2 | 3/2010 | Dowski |
| 7,684,097 B2 | 3/2010 | Fukumoto et al. |
| 7,773,307 B2 | 8/2010 | Shih |
| 7,800,683 B2 | 9/2010 | Zalevsky et al. |
| 7,812,295 B2 | 10/2010 | Zalevsky et al. |
| 7,929,220 B2 | 4/2011 | Sayag |
| 7,965,607 B2 | 6/2011 | Fukumoto et al. |
| 8,009,358 B2 | 8/2011 | Zalevsky et al. |
| 8,040,604 B2 | 10/2011 | Zalevsky et al. |
| 8,107,705 B2 | 1/2012 | Dowski et al. |
| 8,152,307 B2 | 4/2012 | Duelli et al. |
| 8,169,703 B1 | 5/2012 | Mossberg et al. |
| 8,192,022 B2 | 6/2012 | Zalevsky |
| 8,212,866 B2 | 7/2012 | Lemmer et al. |
| 8,318,386 B2 | 11/2012 | Kobrin |
| 8,351,048 B2 | 1/2013 | Millerd |
| 8,351,120 B2 | 1/2013 | Deng et al. |
| 8,390,932 B2 | 3/2013 | Jia et al. |
| 8,430,513 B2 | 4/2013 | Chang et al. |
| 8,451,368 B2 | 5/2013 | Sung et al. |
| 8,472,797 B2 | 6/2013 | Ok et al. |
| 8,558,873 B2 | 10/2013 | Mceldowney |
| 8,649,631 B2 | 2/2014 | Islam et al. |
| 8,687,040 B2 | 4/2014 | Silveira |
| 8,734,033 B2 | 5/2014 | Walters et al. |
| 8,816,460 B2 | 8/2014 | Kalevo et al. |
| 8,876,289 B2 | 11/2014 | Diaz et al. |
| 8,908,149 B2 | 12/2014 | Freimann |
| 9,007,451 B2 | 4/2015 | Rogers et al. |
| 9,212,899 B2 | 12/2015 | Johnson et al. |
| 9,309,274 B2 | 4/2016 | Van Der Boom et al. |
| 9,310,535 B1 | 4/2016 | Greiner et al. |
| 9,329,484 B1 | 5/2016 | Markle et al. |
| 9,330,704 B2 | 5/2016 | Nishimura et al. |
| 9,367,036 B2 | 6/2016 | Pyun et al. |
| 9,369,621 B2 | 6/2016 | Malone et al. |
| 9,392,153 B2 | 7/2016 | Myhre et al. |
| 9,606,415 B2 | 3/2017 | Zheludev et al. |
| 9,609,190 B2 | 3/2017 | Lee et al. |
| 9,766,463 B2 | 9/2017 | Border et al. |
| 9,778,404 B2 | 10/2017 | Divliansky et al. |
| 9,825,074 B2 | 11/2017 | Tian et al. |
| 9,829,700 B2 | 11/2017 | Parent et al. |
| 9,835,870 B2 | 12/2017 | Astratov et al. |
| 9,836,122 B2 | 12/2017 | Border |
| 9,869,580 B2 | 1/2018 | Grossinger et al. |
| 9,880,377 B1 | 1/2018 | Safrani et al. |
| 9,885,859 B2 | 2/2018 | Harris |
| 9,891,393 B2 | 2/2018 | Reece |
| 9,947,118 B2 | 4/2018 | Khare et al. |
| 9,958,251 B1 | 5/2018 | Brock et al. |
| 9,967,541 B2 | 5/2018 | Piestun |
| 9,978,801 B2 | 5/2018 | Park et al. |
| 9,989,680 B2 | 6/2018 | Arbabi et al. |
| 9,995,859 B2 | 6/2018 | Kamali et al. |
| 10,007,118 B2 | 6/2018 | Border |
| 10,054,859 B2 | 8/2018 | Ye et al. |
| 10,108,085 B2 | 10/2018 | Peters et al. |
| 10,126,466 B2 | 11/2018 | Lin et al. |
| 10,149,612 B2 | 12/2018 | Muyo et al. |
| 10,254,454 B2 | 4/2019 | Klug et al. |
| 10,267,957 B2 | 4/2019 | Kamali et al. |
| 10,310,148 B2 | 6/2019 | Stewart et al. |
| 10,310,387 B2 | 6/2019 | Palmer et al. |
| 10,317,667 B2 | 6/2019 | Waller et al. |
| 10,324,314 B2 | 6/2019 | Czaplewski et al. |
| 10,338,275 B1 | 7/2019 | Acosta et al. |
| 10,341,640 B2 | 7/2019 | Shechtman et al. |
| 10,345,246 B2 | 7/2019 | Tian et al. |
| 10,345,519 B1 | 7/2019 | Miller et al. |
| 10,365,416 B2 | 7/2019 | Zhan et al. |
| 10,371,936 B2 | 8/2019 | Didomenico |
| 10,386,620 B2 | 8/2019 | Astratov et al. |
| 10,402,993 B2 | 9/2019 | Han et al. |
| 10,416,565 B2 | 9/2019 | Ahmed et al. |
| 10,440,244 B2 | 10/2019 | Rosenblatt et al. |
| 10,440,300 B2 | 10/2019 | Rephaeli et al. |
| 10,466,394 B2 | 11/2019 | Lin et al. |
| 10,468,447 B2 | 11/2019 | Akselrod et al. |
| 10,481,317 B2 * | 11/2019 | Peroz .................. G02B 6/0036 |
| 10,514,296 B2 | 12/2019 | Han et al. |
| 10,527,832 B2 | 1/2020 | Schwab et al. |
| 10,527,851 B2 | 1/2020 | Lin et al. |
| 10,536,688 B2 | 1/2020 | Haas et al. |
| 10,539,723 B2 | 1/2020 | Iazikov et al. |
| 10,545,323 B2 | 1/2020 | Schwab et al. |
| 10,916,060 B2 * | 2/2021 | West ..................... G06T 19/006 |
| 11,385,516 B2 | 7/2022 | Didomenico |
| 2002/0048727 A1 | 4/2002 | Zhou et al. |
| 2003/0107787 A1 | 6/2003 | Bablumyan |
| 2005/0239003 A1 | 10/2005 | Chiodini et al. |
| 2006/0042322 A1 | 3/2006 | Mendoza et al. |
| 2006/0286488 A1 * | 12/2006 | Rogers ................ G03F 7/70283 |
| | | 355/71 |
| 2007/0024975 A1 * | 2/2007 | McGrew ............ G02B 27/4233 |
| | | 359/569 |
| 2007/0114678 A1 * | 5/2007 | Van Haren ............ G03F 9/7049 |
| | | 257/797 |
| 2009/0128908 A1 | 5/2009 | Nakazawa et al. |
| 2012/0092735 A1 | 4/2012 | Futterer et al. |
| 2012/0140235 A1 | 6/2012 | Lee et al. |
| 2012/0258407 A1 | 10/2012 | Sirat |
| 2013/0075848 A1 * | 3/2013 | Nikolic ................. H10F 30/301 |
| | | 438/37 |
| 2013/0194237 A1 | 8/2013 | Mao et al. |
| 2015/0055745 A1 | 2/2015 | Holzner et al. |
| 2015/0185000 A1 | 7/2015 | Wilson et al. |
| 2015/0219497 A1 | 8/2015 | Johs et al. |
| 2016/0077261 A1 | 3/2016 | Arbabi et al. |
| 2016/0195705 A1 | 7/2016 | Betzig et al. |
| 2016/0331457 A1 | 11/2016 | Varghese et al. |
| 2016/0341859 A1 | 11/2016 | Shvets et al. |
| 2016/0361002 A1 | 12/2016 | Palikaras et al. |
| 2017/0038574 A1 | 2/2017 | Zhuang et al. |
| 2017/0125911 A1 | 5/2017 | Alu et al. |
| 2017/0131460 A1 | 5/2017 | Lin et al. |
| 2017/0250577 A1 | 8/2017 | Ho et al. |
| 2017/0299784 A1 | 10/2017 | Mikkelsen et al. |
| 2017/0329201 A1 | 11/2017 | Arnold |
| 2018/0035101 A1 | 2/2018 | Osterhout |
| 2018/0044234 A1 | 2/2018 | Hokansson et al. |
| 2018/0107015 A1 | 4/2018 | Dümpelmann et al. |
| 2018/0217395 A1 | 8/2018 | Lin et al. |
| 2018/0231700 A1 | 8/2018 | Ahmed et al. |
| 2018/0231702 A1 * | 8/2018 | Lin ........................ G03H 1/0244 |
| 2018/0236596 A1 | 8/2018 | Ihlemann et al. |
| 2018/0248268 A1 | 8/2018 | Shvets et al. |
| 2018/0252857 A1 | 9/2018 | Glik et al. |
| 2018/0259700 A1 | 9/2018 | Khorasaninejad et al. |
| 2018/0259757 A1 | 9/2018 | Urzhumov |
| 2018/0267605 A1 | 9/2018 | Border |
| 2018/0314130 A1 | 11/2018 | Joo et al. |
| 2019/0025463 A1 | 1/2019 | She et al. |
| 2019/0041642 A1 | 2/2019 | Haddick et al. |
| 2019/0044003 A1 * | 2/2019 | Heck ..................... H10F 77/413 |
| 2019/0049632 A1 | 2/2019 | Shin et al. |

(56) References Cited

U.S. PATENT DOCUMENTS

| | | |
|---|---|---|
| 2019/0049732 A1 | 2/2019 | Lee et al. |
| 2019/0057512 A1 | 2/2019 | Han et al. |
| 2019/0064532 A1 | 2/2019 | Riley et al. |
| 2019/0086579 A1 | 3/2019 | Kim et al. |
| 2019/0101448 A1 | 4/2019 | Lee et al. |
| 2019/0113775 A1 | 4/2019 | Jang et al. |
| 2019/0120817 A1 | 4/2019 | Anderson |
| 2019/0121004 A1 | 4/2019 | Ahmed et al. |
| 2019/0137793 A1 | 5/2019 | Luo et al. |
| 2019/0154877 A1 | 5/2019 | Capasso et al. |
| 2019/0170655 A1 | 6/2019 | Smith |
| 2019/0196068 A1* | 6/2019 | Tsai .............. G02B 1/002 |
| 2019/0206136 A1* | 7/2019 | West .............. G02B 27/0172 |
| 2019/0219835 A1 | 7/2019 | Skinner et al. |
| 2019/0235139 A1 | 8/2019 | Chen et al. |
| 2019/0250107 A1 | 8/2019 | Sreenivasan et al. |
| 2019/0369401 A1 | 12/2019 | Rolland-Thompson et al. |
| 2019/0377084 A1 | 12/2019 | Sleasman et al. |
| 2019/0391378 A1 | 12/2019 | Eichelkraut et al. |
| 2020/0025888 A1* | 1/2020 | Jang .............. G01S 7/4861 |
| 2021/0190593 A1 | 6/2021 | Yao et al. |
| 2021/0208469 A1 | 7/2021 | Didomenico |
| 2021/0286188 A1 | 9/2021 | Rubin et al. |
| 2022/0214219 A1 | 7/2022 | Faraon et al. |

FOREIGN PATENT DOCUMENTS

| | | |
|---|---|---|
| CN | 101546002 A | 9/2009 |
| CN | 101510013 B | 6/2010 |
| CN | 101510012 B | 8/2010 |
| CN | 101510011 B | 9/2010 |
| CN | 101241173 B | 8/2011 |
| CN | 202854395 U | 4/2013 |
| CN | 103092049 A | 5/2013 |
| CN | 203799117 U | 8/2014 |
| CN | 204719330 U | 10/2015 |
| CN | 103869484 B | 1/2016 |
| CN | 103257441 B | 10/2016 |
| CN | 205620619 U | 10/2016 |
| CN | 104834079 B | 4/2017 |
| CN | 104834089 B | 6/2017 |
| CN | 106200276 B | 10/2017 |
| CN | 104834088 B | 12/2017 |
| CN | 105676314 B | 1/2018 |
| CN | 107561857 A | 1/2018 |
| CN | 108089325 A | 5/2018 |
| CN | 208270846 U | 5/2018 |
| CN | 207623619 U | 7/2018 |
| CN | 106199997 B | 8/2018 |
| CN | 108507542 A | 9/2018 |
| CN | 207923075 U | 9/2018 |
| CN | 108680544 A | 10/2018 |
| CN | 108761779 A | 11/2018 |
| CN | 109000692 A | 12/2018 |
| CN | 106199956 B | 2/2019 |
| CN | 109360139 A | 2/2019 |
| CN | 106950195 B | 5/2019 |
| CN | 106324832 B | 7/2019 |
| CN | 106526730 B | 7/2019 |
| CN | 106485761 B | 8/2019 |
| CN | 110160685 A | 8/2019 |
| CN | 110678773 A | 1/2020 |
| CN | 213092332 U | 4/2021 |
| CN | 215005942 U | 4/2021 |
| CN | 113050295 A | 6/2021 |
| CN | 110376665 B | 8/2021 |
| CN | 213902664 U | 8/2021 |
| CN | 213903843 U | 8/2021 |
| CN | 214098104 U | 8/2021 |
| CN | 113703080 A | 11/2021 |
| CN | 113791524 A | 12/2021 |
| CN | 113807312 A | 12/2021 |
| CN | 113820839 A | 12/2021 |
| CN | 113834568 A | 12/2021 |
| CN | 113835227 A | 12/2021 |
| CN | 113851573 A | 12/2021 |
| CN | 215010478 U | 12/2021 |
| CN | 110494771 B | 1/2022 |
| CN | 113885106 A | 1/2022 |
| CN | 113899451 A | 1/2022 |
| CN | 113900078 A | 1/2022 |
| CN | 113900162 A | 1/2022 |
| CN | 113917574 A | 1/2022 |
| CN | 113917578 A | 1/2022 |
| CN | 113934004 A | 1/2022 |
| CN | 113934005 A | 1/2022 |
| CN | 113959984 A | 1/2022 |
| CN | 114002707 A | 2/2022 |
| CN | 114019589 A | 2/2022 |
| CN | 114047632 A | 2/2022 |
| CN | 114047637 A | 2/2022 |
| CN | 114112058 A | 3/2022 |
| CN | 114156168 A | 3/2022 |
| CN | 114176492 A | 3/2022 |
| CN | 215932365 U | 3/2022 |
| CN | 114280704 A | 4/2022 |
| CN | 114280716 A | 4/2022 |
| CN | 114296180 A | 4/2022 |
| CN | 114325886 A | 4/2022 |
| CN | 114326163 A | 4/2022 |
| CN | 114354141 A | 4/2022 |
| CN | 114373825 A | 4/2022 |
| CN | 114384612 A | 4/2022 |
| CN | 114397092 A | 4/2022 |
| CN | 114397718 A | 4/2022 |
| CN | 114415386 A | 4/2022 |
| CN | 216345776 U | 4/2022 |
| CN | 216351311 U | 4/2022 |
| CN | 216351591 U | 4/2022 |
| CN | 216355281 U | 4/2022 |
| CN | 216361353 U | 4/2022 |
| CN | 114488365 A | 5/2022 |
| CN | 114543993 A | 5/2022 |
| CN | 114545367 A | 5/2022 |
| CN | 114545370 A | 5/2022 |
| CN | 114554062 A | 5/2022 |
| CN | 114561266 A | 5/2022 |
| CN | 216593224 U | 5/2022 |
| CN | 216605227 U | 5/2022 |
| CN | 216622749 U | 5/2022 |
| CN | 114578642 A | 6/2022 |
| CN | 114593689 A | 6/2022 |
| CN | 114623960 A | 6/2022 |
| CN | 114624878 A | 6/2022 |
| CN | 114660683 A | 6/2022 |
| CN | 114660780 A | 6/2022 |
| CN | 217467439 U | 6/2022 |
| CN | 114690387 A | 7/2022 |
| CN | 114740631 A | 7/2022 |
| CN | 114743714 A | 7/2022 |
| CN | 114779437 U | 7/2022 |
| CN | 216896898 U | 7/2022 |
| CN | 216900930 U | 7/2022 |
| CN | 216901121 U | 7/2022 |
| CN | 216901165 U | 7/2022 |
| CN | 216901317 U | 7/2022 |
| CN | 216901952 U | 7/2022 |
| CN | 216903719 U | 7/2022 |
| CN | 216933177 U | 7/2022 |
| CN | 217034311 U | 7/2022 |
| CN | 217034418 U | 7/2022 |
| CN | 217034466 U | 7/2022 |
| CN | 114859446 A | 8/2022 |
| CN | 114859447 A | 8/2022 |
| CN | 114859570 A | 8/2022 |
| CN | 114935741 A | 8/2022 |
| CN | 217276608 U | 8/2022 |
| CN | 217278911 U | 8/2022 |
| CN | 217278915 U | 8/2022 |
| CN | 217278989 U | 8/2022 |
| CN | 217279003 U | 8/2022 |
| CN | 217279087 U | 8/2022 |
| CN | 217279110 U | 8/2022 |
| CN | 217279168 U | 8/2022 |

(56) References Cited

FOREIGN PATENT DOCUMENTS

| | | |
|---|---|---|
| CN | 217279244 U | 8/2022 |
| CN | 217280797 U | 8/2022 |
| CN | 217280851 U | 8/2022 |
| CN | 217281621 U | 8/2022 |
| CN | 217281623 U | 8/2022 |
| CN | 114995038 A | 9/2022 |
| CN | 115016099 A | 9/2022 |
| CN | 115016150 A | 9/2022 |
| CN | 115032766 A | 9/2022 |
| CN | 115047432 A | 9/2022 |
| CN | 115047653 A | 9/2022 |
| CN | 115061114 A | 9/2022 |
| CN | 115079415 A | 9/2022 |
| CN | 115113174 A | 9/2022 |
| CN | 217456368 U | 9/2022 |
| CN | 217465697 U | 9/2022 |
| CN | 217466052 U | 9/2022 |
| CN | 217466667 U | 9/2022 |
| CN | 217467162 U | 9/2022 |
| CN | 217467176 U | 9/2022 |
| CN | 217467177 U | 9/2022 |
| CN | 217467226 U | 9/2022 |
| CN | 217467326 U | 9/2022 |
| CN | 217467327 U | 9/2022 |
| CN | 217467336 U | 9/2022 |
| CN | 217467338 U | 9/2022 |
| CN | 217467351 U | 9/2022 |
| CN | 217467352 U | 9/2022 |
| CN | 217467353 U | 9/2022 |
| CN | 217467355 U | 9/2022 |
| CN | 217467357 U | 9/2022 |
| CN | 217467358 U | 9/2022 |
| CN | 217467363 U | 9/2022 |
| CN | 217467364 U | 9/2022 |
| CN | 217467367 U | 9/2022 |
| CN | 217467368 U | 9/2022 |
| CN | 217467395 U | 9/2022 |
| CN | 217467396 U | 9/2022 |
| CN | 217467399 U | 9/2022 |
| CN | 217467452 U | 9/2022 |
| CN | 115164714 A | 10/2022 |
| CN | 115166876 A | 10/2022 |
| CN | 115166958 A | 10/2022 |
| CN | 115185082 A | 10/2022 |
| CN | 115211799 A | 10/2022 |
| CN | 115236795 A | 10/2022 |
| CN | 217639515 U | 10/2022 |
| CN | 217639519 U | 10/2022 |
| CN | 217639539 U | 10/2022 |
| CN | 217639544 U | 10/2022 |
| CN | 217639611 U | 10/2022 |
| CN | 217639612 U | 10/2022 |
| CN | 217639613 U | 10/2022 |
| CN | 217639715 U | 10/2022 |
| CN | 217639718 U | 10/2022 |
| CN | 217639719 U | 10/2022 |
| CN | 217639720 U | 10/2022 |
| CN | 217639722 U | 10/2022 |
| CN | 217639723 U | 10/2022 |
| CN | 217639724 U | 10/2022 |
| CN | 217639725 U | 10/2022 |
| CN | 217639726 U | 10/2022 |
| CN | 217639763 U | 10/2022 |
| CN | 217639765 U | 10/2022 |
| CN | 217639767 U | 10/2022 |
| CN | 217639768 U | 10/2022 |
| CN | 217639769 U | 10/2022 |
| CN | 217639770 U | 10/2022 |
| CN | 217639771 U | 10/2022 |
| CN | 217639772 U | 10/2022 |
| CN | 217639773 U | 10/2022 |
| CN | 217639774 U | 10/2022 |
| CN | 217639776 U | 10/2022 |
| CN | 217639777 U | 10/2022 |
| CN | 217639778 U | 10/2022 |
| CN | 217639903 U | 10/2022 |
| CN | 217639920 U | 10/2022 |
| CN | 115268058 A | 11/2022 |
| CN | 115327865 A | 11/2022 |
| CN | 115332917 A | 11/2022 |
| CN | 115343795 A | 11/2022 |
| CN | 115390176 A | 11/2022 |
| CN | 217809433 U | 11/2022 |
| CN | 217818613 U | 11/2022 |
| CN | 217819022 U | 11/2022 |
| CN | 217820828 U | 11/2022 |
| CN | 217820829 U | 11/2022 |
| CN | 217820831 U | 11/2022 |
| CN | 217820834 U | 11/2022 |
| CN | 217820838 U | 11/2022 |
| CN | 217820839 U | 11/2022 |
| CN | 217820840 U | 11/2022 |
| CN | 217820943 U | 11/2022 |
| CN | 217820944 U | 11/2022 |
| CN | 217820945 U | 11/2022 |
| CN | 217820971 U | 11/2022 |
| CN | 217821058 U | 11/2022 |
| CN | 217821068 U | 11/2022 |
| CN | 217821071 U | 11/2022 |
| CN | 217821091 U | 11/2022 |
| CN | 217821110 U | 11/2022 |
| CN | 217821111 U | 11/2022 |
| CN | 217821113 U | 11/2022 |
| CN | 217821122 U | 11/2022 |
| CN | 217821160 U | 11/2022 |
| CN | 217821236 U | 11/2022 |
| CN | 217821680 U | 11/2022 |
| CN | 217821696 U | 11/2022 |
| CN | 217822825 U | 11/2022 |
| CN | 217823690 U | 11/2022 |
| CN | 217825178 U | 11/2022 |
| CN | 217885960 U | 11/2022 |
| CN | 217902220 U | 11/2022 |
| CN | 217902222 U | 11/2022 |
| CN | 115421295 A | 12/2022 |
| CN | 115453754 A | 12/2022 |
| CN | 115524768 A | 12/2022 |
| CN | 115524775 A | 12/2022 |
| CN | 115524874 A | 12/2022 |
| CN | 217981833 U | 12/2022 |
| CN | 217981857 U | 12/2022 |
| CN | 217981991 U | 12/2022 |
| CN | 217981992 U | 12/2022 |
| CN | 217982020 U | 12/2022 |
| CN | 217982038 U | 12/2022 |
| CN | 217982089 U | 12/2022 |
| CN | 217982120 U | 12/2022 |
| CN | 217983382 U | 12/2022 |
| CN | 217984044 U | 12/2022 |
| DE | 10 2007 058 558 A1 | 6/2009 |
| DE | 10 2012 212 753 A1 | 1/2014 |
| DE | 10 2015 221 985 A1 | 5/2017 |
| DE | 10 2016 218 996 A1 | 9/2017 |
| EP | 1 251 397 A2 | 10/2002 |
| EP | 1 252 623 B1 | 10/2002 |
| EP | 2 338 114 B1 | 6/2011 |
| EP | 3 226 042 A1 | 10/2017 |
| EP | 3 385 770 A1 | 10/2018 |
| GB | 2 499 869 A | 9/2013 |
| JP | 2017-062373 A | 3/2017 |
| KR | 100144569 B1 | 11/1998 |
| KR | 20080099452 A | 11/2008 |
| KR | 20080103149 A | 11/2008 |
| KR | 20090002583 A | 1/2009 |
| KR | 101493928 B1 | 3/2015 |
| KR | 20170015109 A | 2/2017 |
| KR | 20180121309 A | 11/2018 |
| KR | 101905444 B1 | 12/2018 |
| KR | 102036640 B1 | 10/2019 |
| WO | WO-2007/141788 A2 | 12/2007 |
| WO | WO-2009/124181 A2 | 10/2009 |
| WO | WO-2012/172366 A1 | 12/2012 |
| WO | WO-2015/077926 A1 | 6/2015 |
| WO | WO-2016/051325 A1 | 4/2016 |

(56) References Cited

FOREIGN PATENT DOCUMENTS

| WO | WO-2016/191142 | A2 | 12/2016 |
|----|----------------|-----|---------|
| WO | WO-2017/005709 | A1 | 1/2017 |
| WO | WO-2018/118984 | A1 | 6/2018 |
| WO | WO-2018/134215 | A1 | 7/2018 |
| WO | WO-2018/142339 | A1 | 8/2018 |
| WO | WO-2018/204856 | A1 | 11/2018 |
| WO | WO-2018/218063 | A1 | 11/2018 |
| WO | WO-2018/219710 | A1 | 12/2018 |
| WO | WO-2018/222944 | A1 | 12/2018 |
| WO | WO-2019/015735 | A1 | 1/2019 |
| WO | WO-2019/039241 | A1 | 2/2019 |
| WO | WO-2019/043016 | A1 | 3/2019 |
| WO | WO-2019/057907 | A1 | 3/2019 |
| WO | WO-2019/075335 | A1 | 4/2019 |
| WO | WO-2019/101750 | A2 | 5/2019 |
| WO | WO-2019/108290 | A1 | 6/2019 |
| WO | WO-2019/116364 | A1 | 6/2019 |
| WO | WO-2019/118646 | A1 | 6/2019 |
| WO | WO-2019/119025 | A1 | 6/2019 |
| WO | WO-2019/136166 | A1 | 7/2019 |
| WO | WO-2019/148200 | A1 | 8/2019 |
| WO | WO-2019/164542 | A1 | 8/2019 |
| WO | WO-2019/164849 | A1 | 8/2019 |
| WO | WO-2019/173357 | A1 | 9/2019 |
| WO | WO-2019/198568 | A1 | 10/2019 |
| WO | WO-2019/204667 | A1 | 10/2019 |
| WO | WO-2019/206430 | A1 | 10/2019 |
| WO | WO-2020/001938 | A1 | 1/2020 |

OTHER PUBLICATIONS

Extended European Search Report for EP Appl. No. 19744012.6, dated Dec. 16, 2021 (10 pages).
International Search Report and Written Opinion for International Patent Application No. PCT/US2019/014975, issued Jul. 8, 2019, 11 pages.
Khorasaninejad et al.: "Silicon nanofin grating as a miniature chirality-distinguishing beam-splitter" Nature Communications; Nov. 12, 2014; vol. 5, pp. 1-6.
Khorasaninejad et al.: "Silicone nanofin grating as a miniature chirality-distinguishing beam-splitter" Nature Communications; vol. 5; Nov. 12, 2014, 6 pages.
Maguid et al.: "Multifunctional interleaved geometric-phase dielectric metasurfaces" Nature Light Science & Applications; vol. 6, E17027; Aug. 11, 2017, 7 pages.
Mueller et al.: "Ultracompact metasurface in-line polarimeter" Optica, vol. 3, No. 1; Jan. 8, 2016, 6 pages.
Mueller, J.P. Balthasar et al., "Metasurface Polarization Optics: Independent Phase Control of Arbitrary Orthogonal States of Polarization", Physical Review Letters, vol. 118, No. 113901, Mar. 14, 2017, pp. 1-5.
Non-Final Office Action for U.S. Appl. No. 17/500,913, issued Mar. 31, 2023, 6 pages.
Notice of Allowance for U.S. Appl. No. 16/964,058, issued Jun. 17, 2021, 11 pages.
Notice of Allowance for U.S. Appl. No. 17/500,913, issued Aug. 23, 2023, 8 pages.
Office Action with English translation for corresponding Chinese Patent Application No. 201980017024.9, issued Jun. 30, 2023, 14 pages.
Pors et al.: "Plasmonic metagratings for simultaneous determination of stokes parameters" Optica; vol. 2, No. 8; Aug. 6, 2015, pp. 716-723.
Search Report for corresponding Singapore Appl. No. 11202006952X, dated Nov. 24, 2021, 2 pages.
Search Report with English translation for corresponding Chinese Patent Application No. 201980017024.9, issued Jun. 30, 2023, 5 pages.
Supplementary Partial European Search Report for EP Appl. No. 19744012.6, dated Sep. 15, 2021, 12 pages.
Wei et al.: "Design of ultracompact polarimeters based on dielectric metasurfaces" Optics Letters; vol. 42, No. 8; Apr. 15, 2017, pp. 1580-1583.
Written Opinion for corresponding Singapore Appl. No. 11202006952X, dated Nov. 24, 2021, 7 pages.
Notice of Preliminary Rejection with English translation for corresponding Korean Patent Appl. No. 10-2020-7024142, dated Mar. 26, 2024, 13 pages.

* cited by examiner

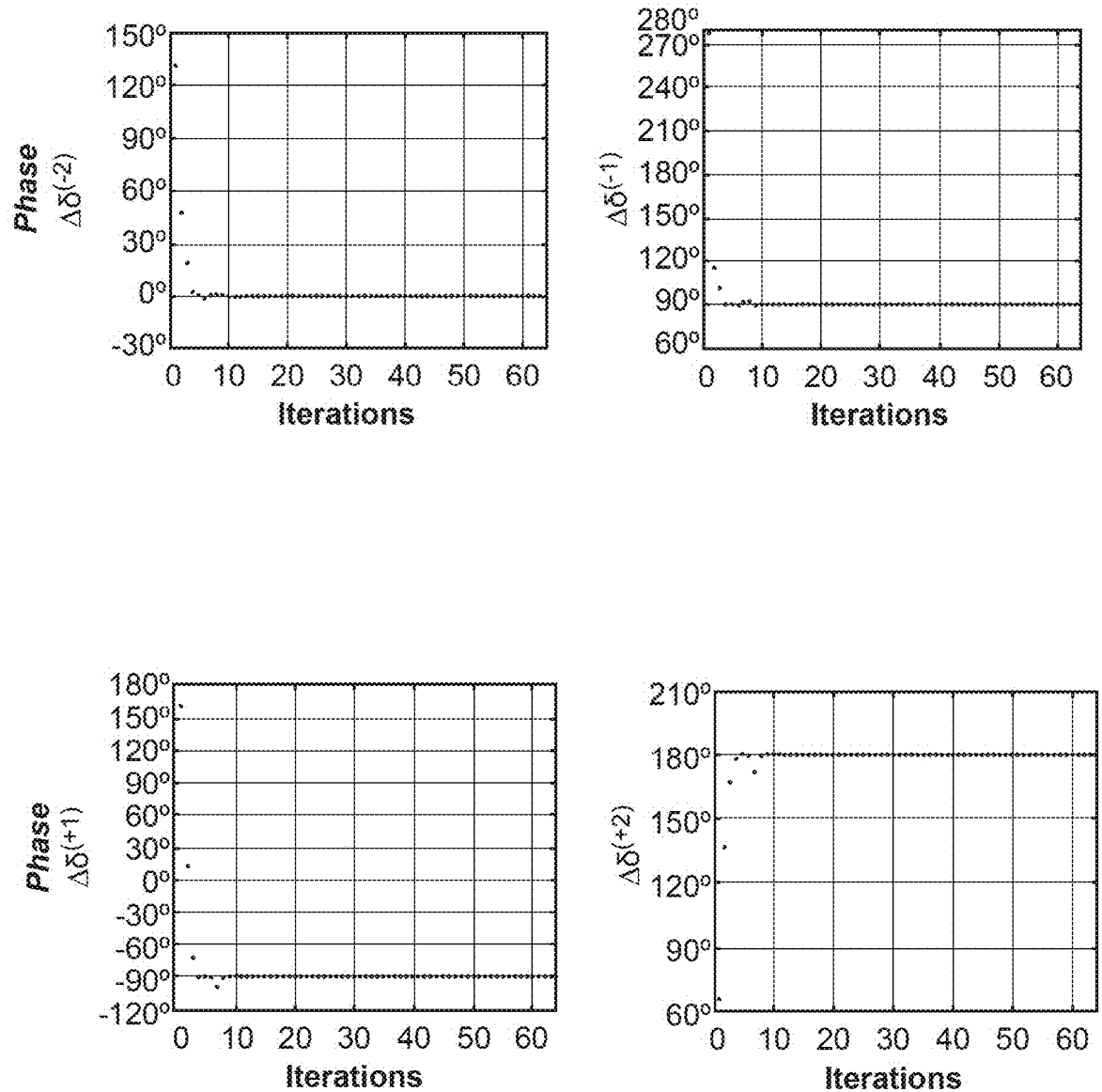
FIG. 7 (Cont. 1)

Varying offset: Varying scale:

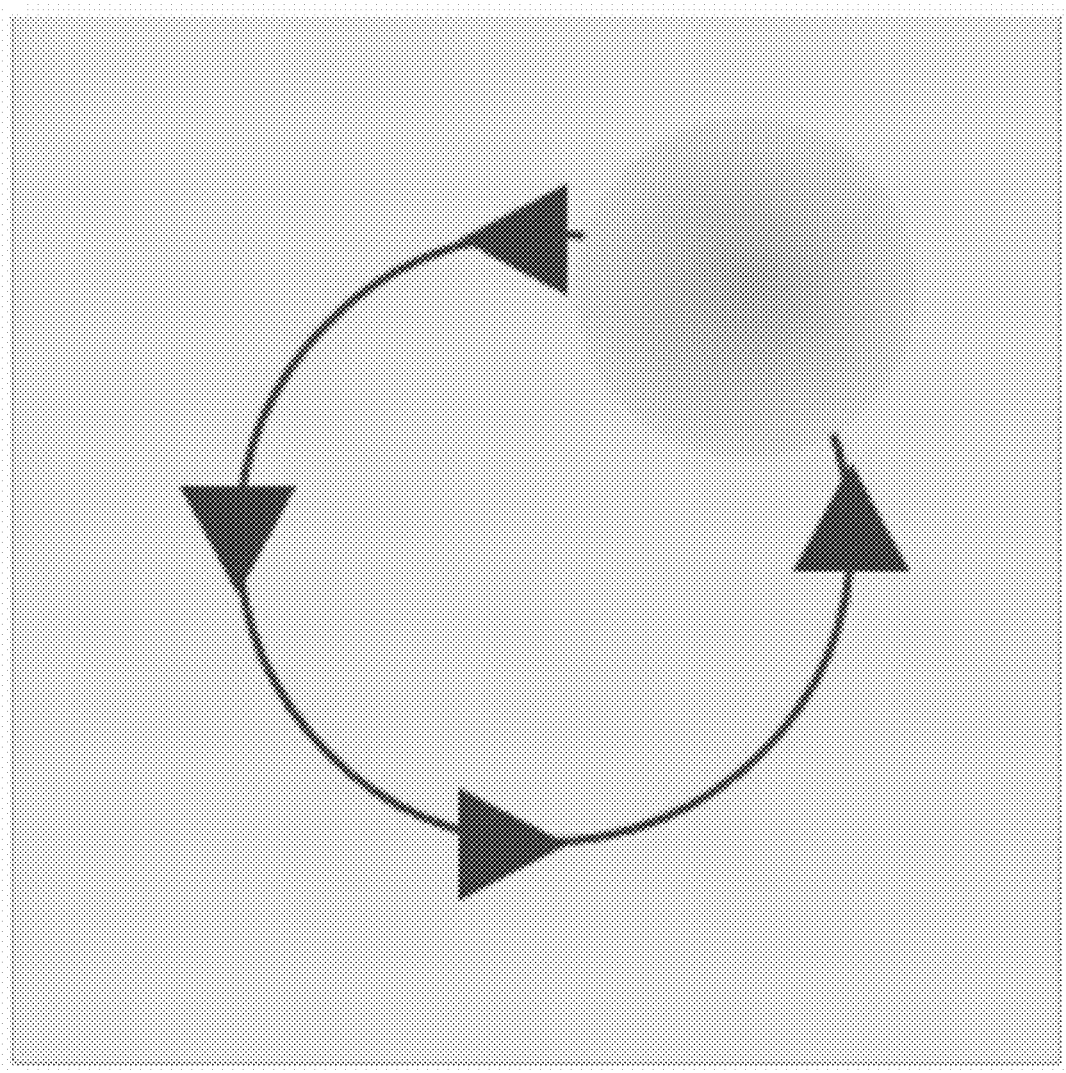
Fig. 14
1.5 mm

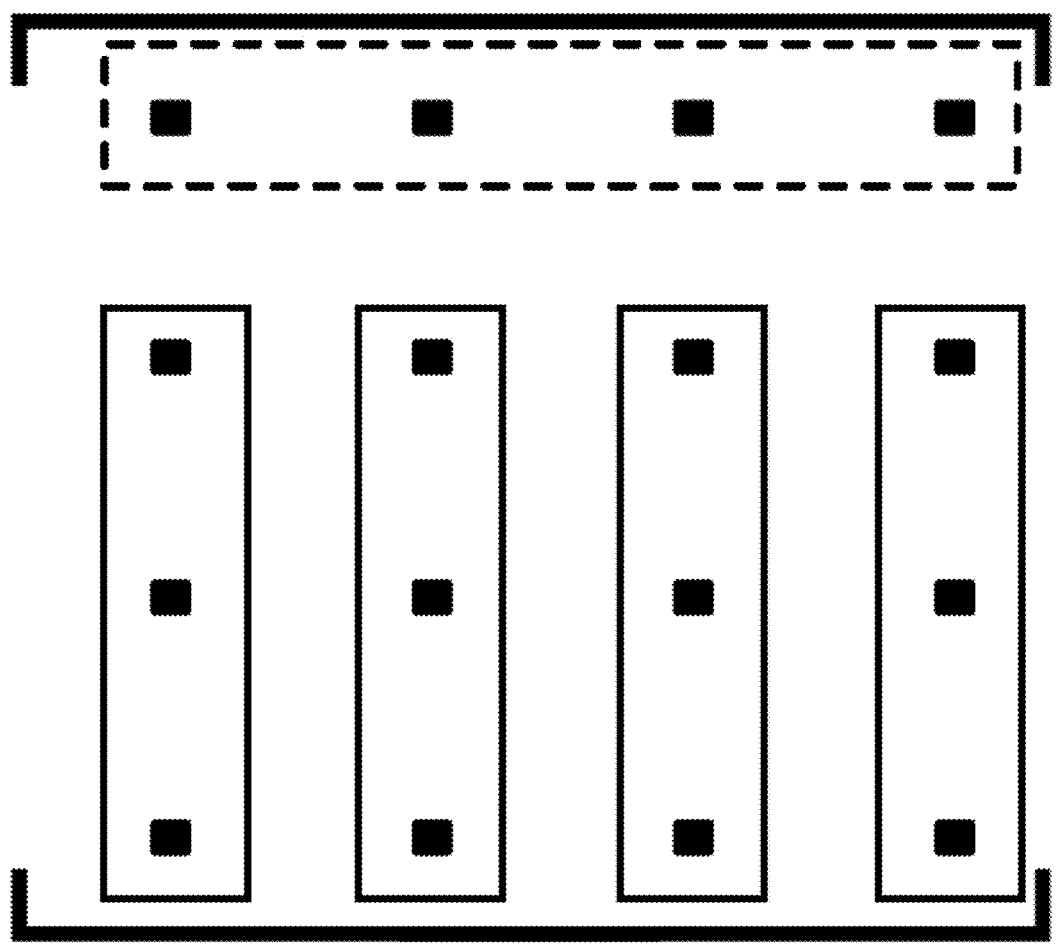
Fig. 22
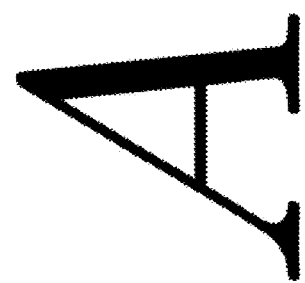

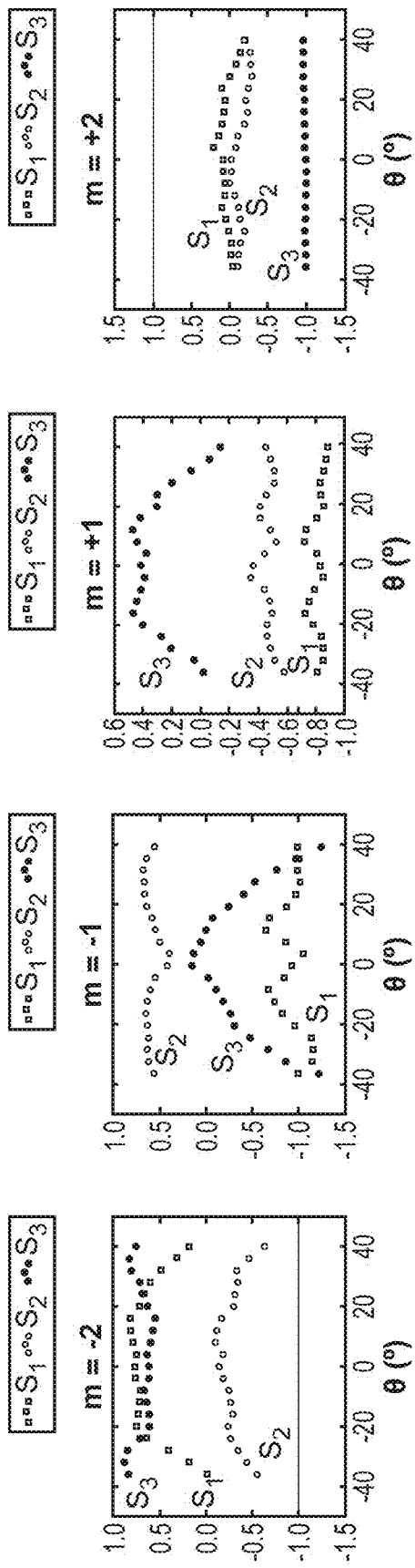
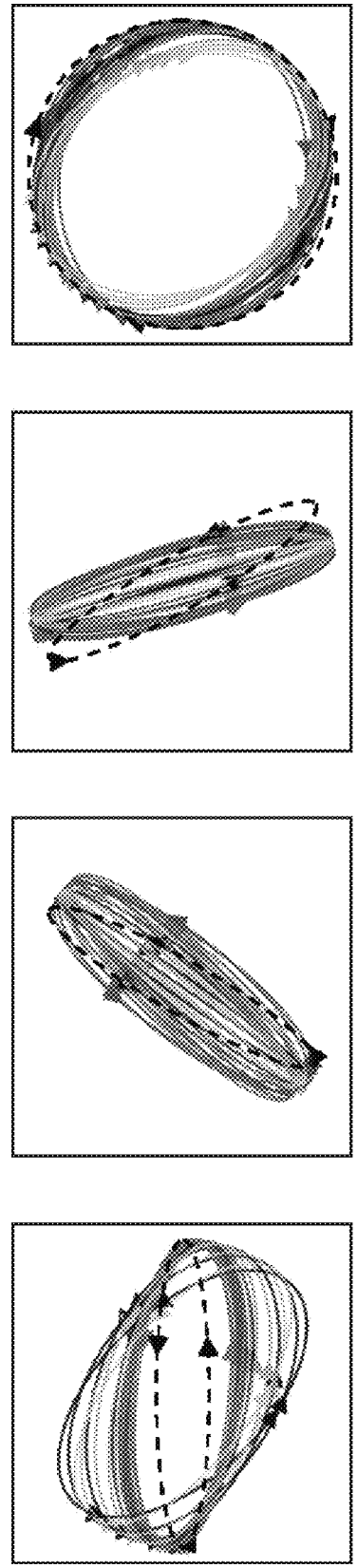
FIG. 29 (a)
FIG. 29 (b)

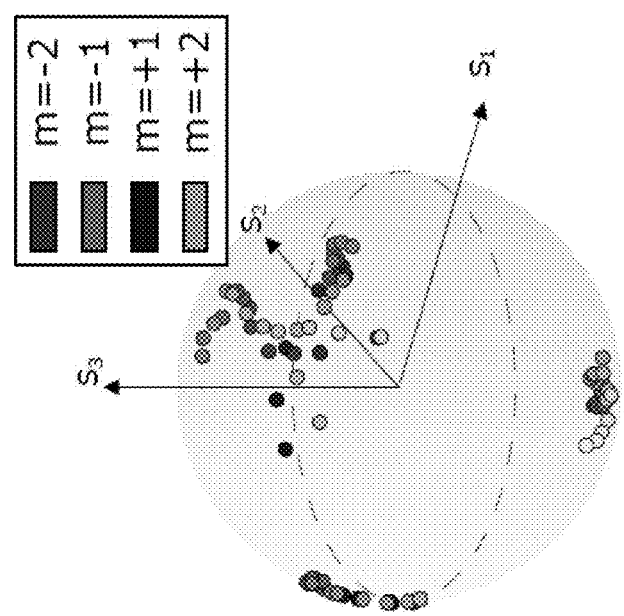
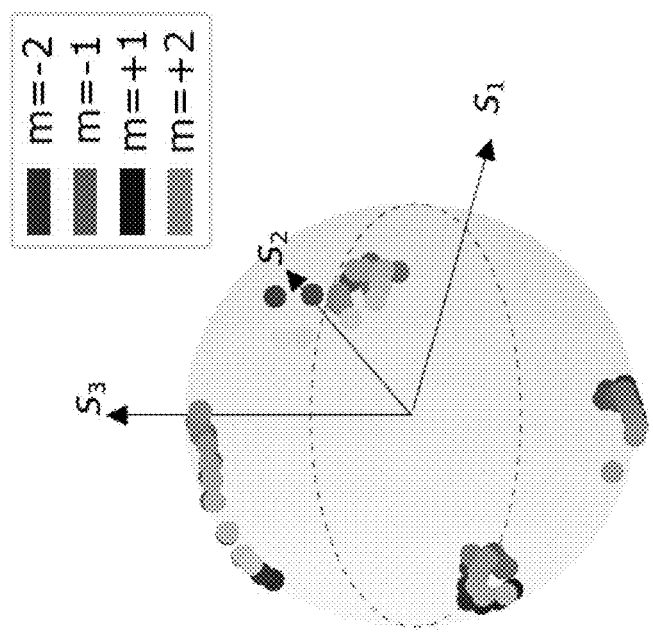
Fig 30 (b)
Fig 30 (a)

POLARIZATION STATE GENERATION WITH A METASURFACE

CROSS REFERENCE TO RELATED APPLICATION

This application is a continuation of U.S. patent application Ser. No. 17/500,913, filed Oct. 13, 2021, which is a continuation of U.S. patent application Ser. No. 16/964,058, filed Jul. 22, 2020, now U.S. Pat. No. 11,169,311, which is a National Stage Entry of International Application No. PCT/US2019/0014975, filed on Jan. 24, 2019, which claims the benefit of and priority to U.S. Provisional Patent Application No. 62/621,453, filed on Jan. 24, 2018, the contents of which are incorporated herein by reference in their entirety.

STATEMENT OF FEDERALLY SPONSORED RESEARCH OR DEVELOPMENT

This invention was made with Government support under the National Science Foundation grants nos. DGE1144152 and Air Force Office of Scientific Research (MURI, Grants No. FA9550-14-1-0389 and No. FA9550- 16-1-0156). The Government has certain rights in the invention.

FIELD

The present disclosure relates to the field of optics and more particularly, to polarization state generation with a metasurface.

SUMMARY

One embodiment provides for an optical component including (a) a substrate; and (b) an array of subwavelength-spaced phase-shifting elements, which are tessellated on the substrate to produce, when illuminated with a polarized incident light, a diffracted light beam with a distinct polarization state for each of a finite number of diffraction orders, wherein the finite number is 2 or more.

Another embodiment provides for an optical instrument including (A) an optical component including (a) a substrate; and (b) an array of subwavelength-spaced phase-shifting elements, which are tessellated on the substrate to produce, when illuminated with a polarized incident light, a diffracted light beam with a distinct polarization state for each of a finite number of diffraction orders, wherein the finite number is 2 or more and (B) one or more detecting elements, each configured to detect the diffracted light beam for one of the diffraction orders.

Yet another embodiment provides for a polarization testing method including illuminating the above optical component with a test light; and measuring a light intensity of a beam diffracted from the optical component for each of the finite number of the diffraction orders.

onto a number of analysis Stokes vectors $$\{\vec{s}_n\}.$$

If the analysis vectors are known and linearly independent, $$\vec{s}_{inc}$$

may be removed.

Figure 2A:
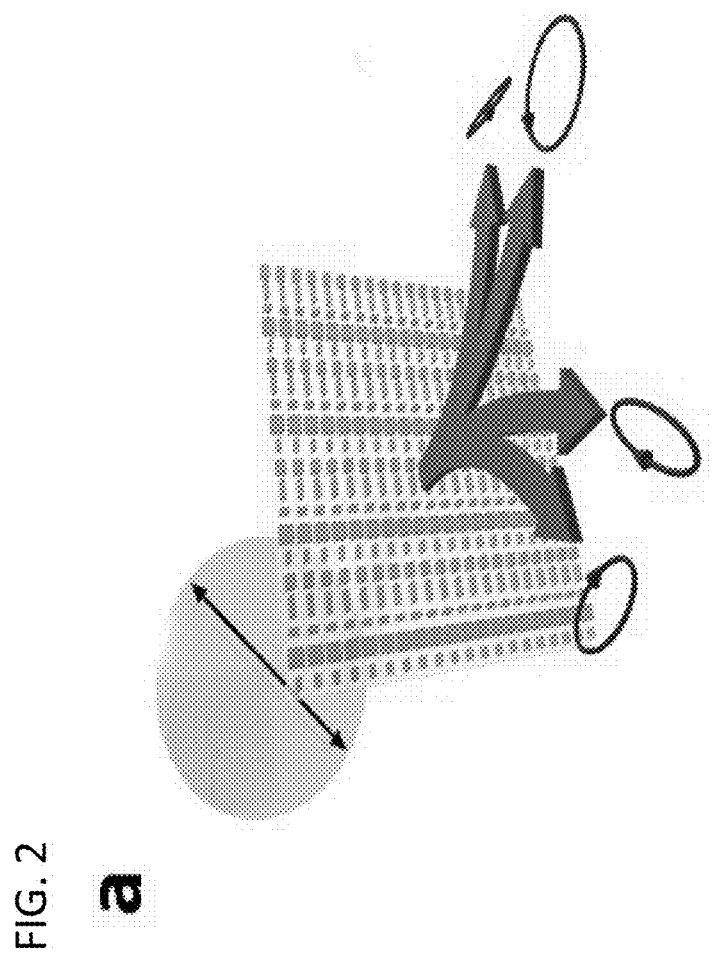
Figure 2:
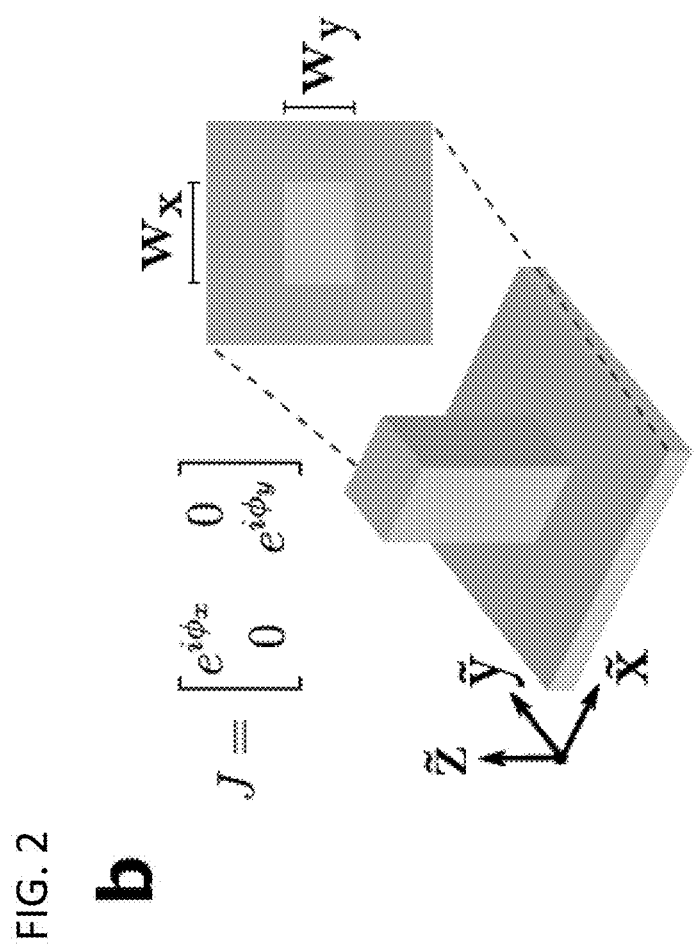
Figure 2:
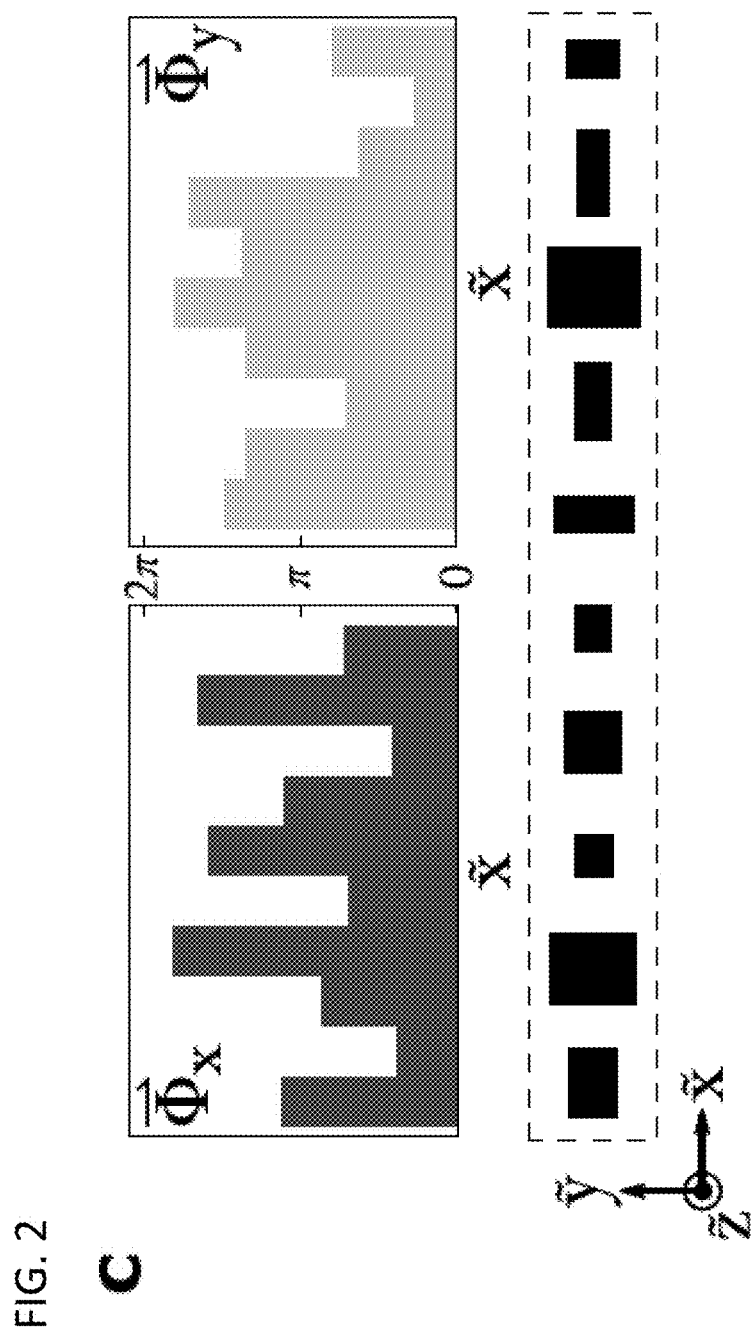
Figure 2:
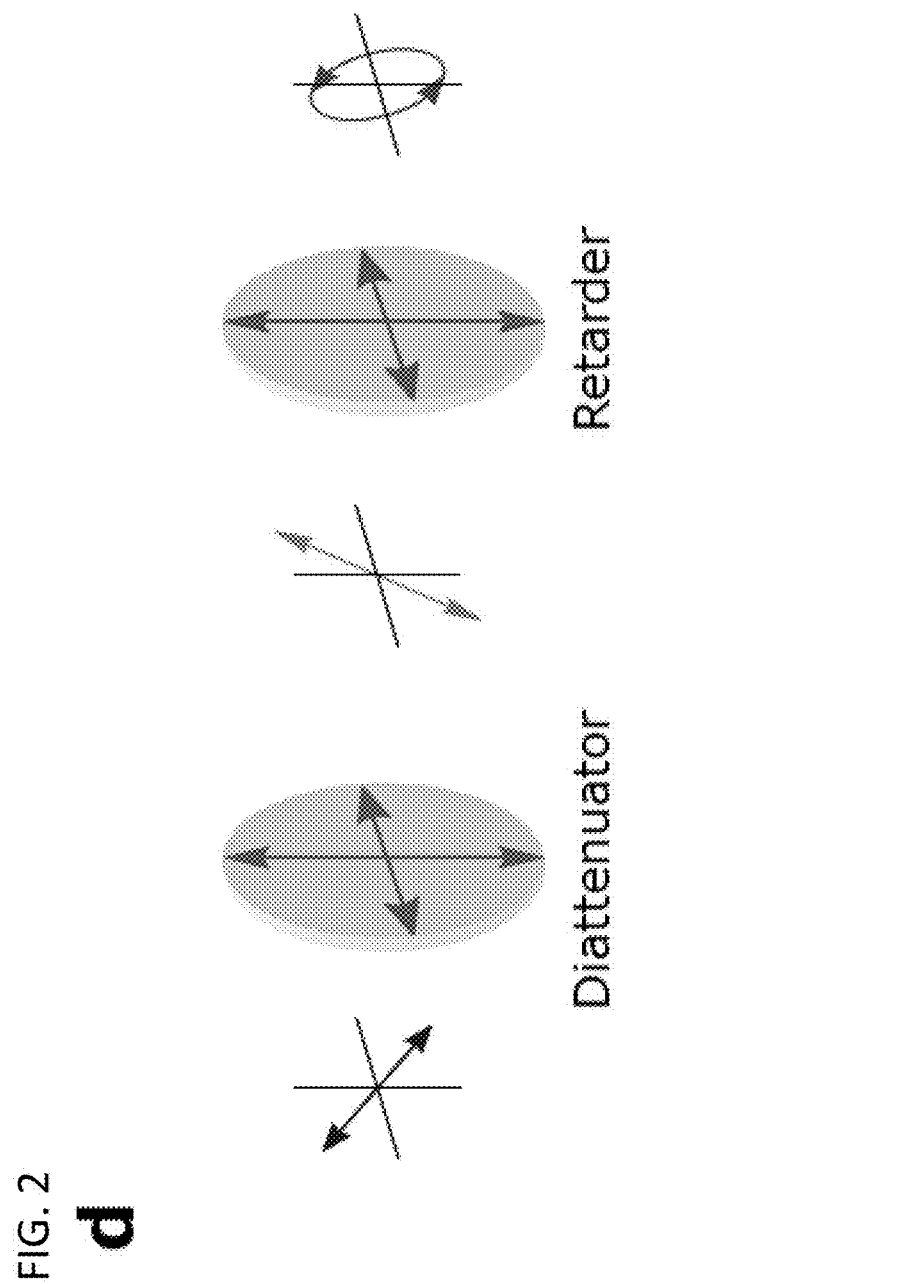
Figure 2:
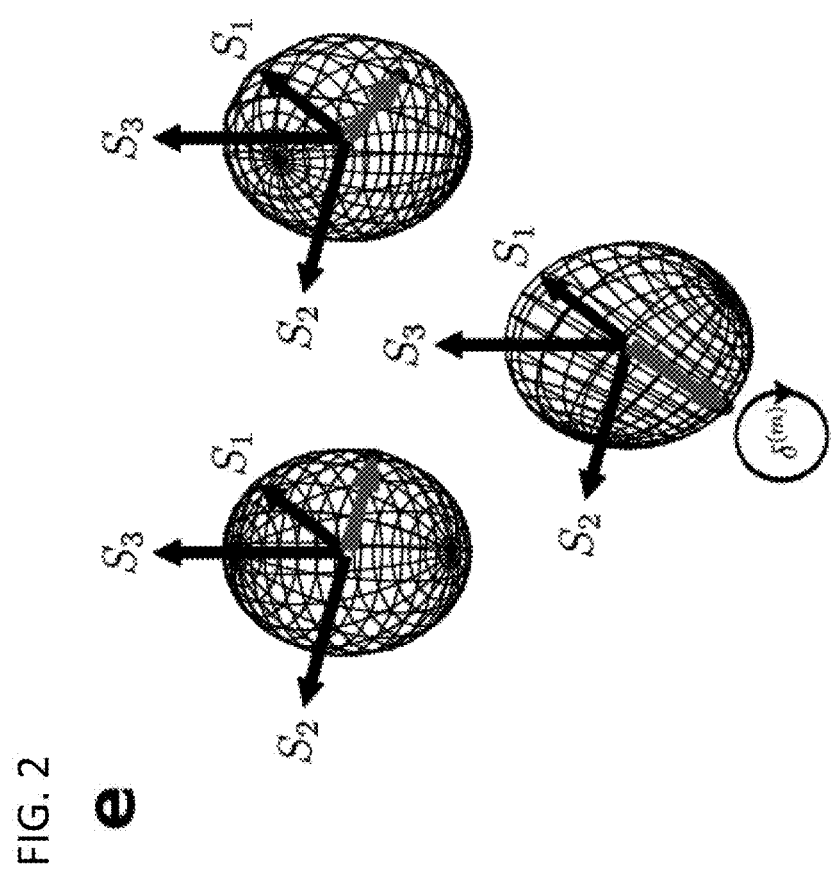
Figure 2:
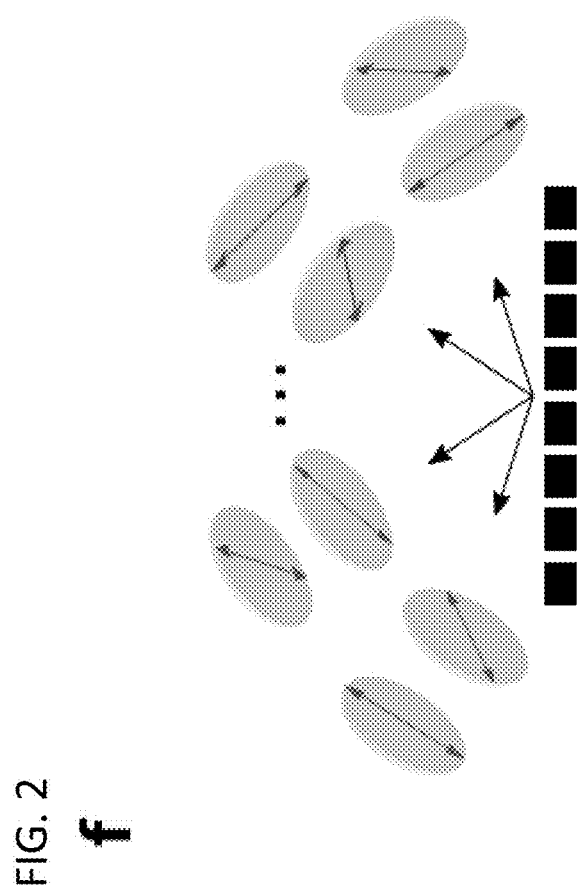

FIG. 2.: a, exemplary schematic: a metasurface diffraction grating may be designed to produce arbitrarily specified polarization states on its diffraction orders. The same device may also act as a parallel polarimeter. b, such a metasurface may be composed of pillar-like phase-shifting elements with two perpendicular mirror symmetry axes (e.g., rectangles) whose orthogonal dimensions $w_x$ and $w_y$ may be adjusted to allow for independent and tunable phase delays $\Phi_x$ and $\Phi_y$ on x and y polarized light. c, if N such elements of varying dimensions are arranged into a periodic unit cell along the $\bar{x}$ direction, a 1D metasurface diffraction grating may be formed. At each point in the unit cell, constant phases are imparted on x and y polarized light. Then described are the phase profiles experienced by these polarizations in the form of N-vectors $\Phi_x$ and $\Phi_y$. d, Each diffraction order of the grating is corresponding to a bulk optic cascade of a diattenuator and a phase retarder, each oriented along x/y. These elements enact the polarization transformations producing some polarization on the order when a given polarization is incident. e, the Poincare sphere may aid in understanding the behavior of the diffraction order for general input polarization. A standard Poincare sphere (upper left) represents the set of all possible incident polarizations. After passing through the diattenuator, the sphere is distorted along the $S_1$ axis to a degree dependent on the extinction ratio of the diattenuator (upper right). Finally, the phase retarder enacts a precession of the sphere along the $S_1$ axis by an angle equal to its retardance $\delta^{(m)}$ (bottom). On each sphere, the red arrow and blue dot denote the polarization ellipses depicted in (d). The power of the output beam is polarization dependent (not shown). f, in general, the functionality contained in a single metasurface (c) would involve a half- and quarter-waveplate on each order, that is, 2P birefringent plates, in addition to a grating.

Figure 3:
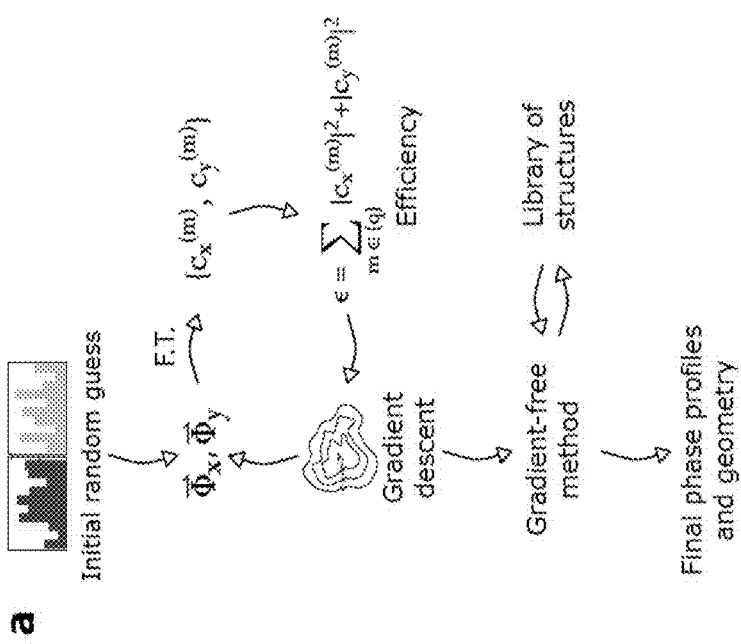
Figure 3:
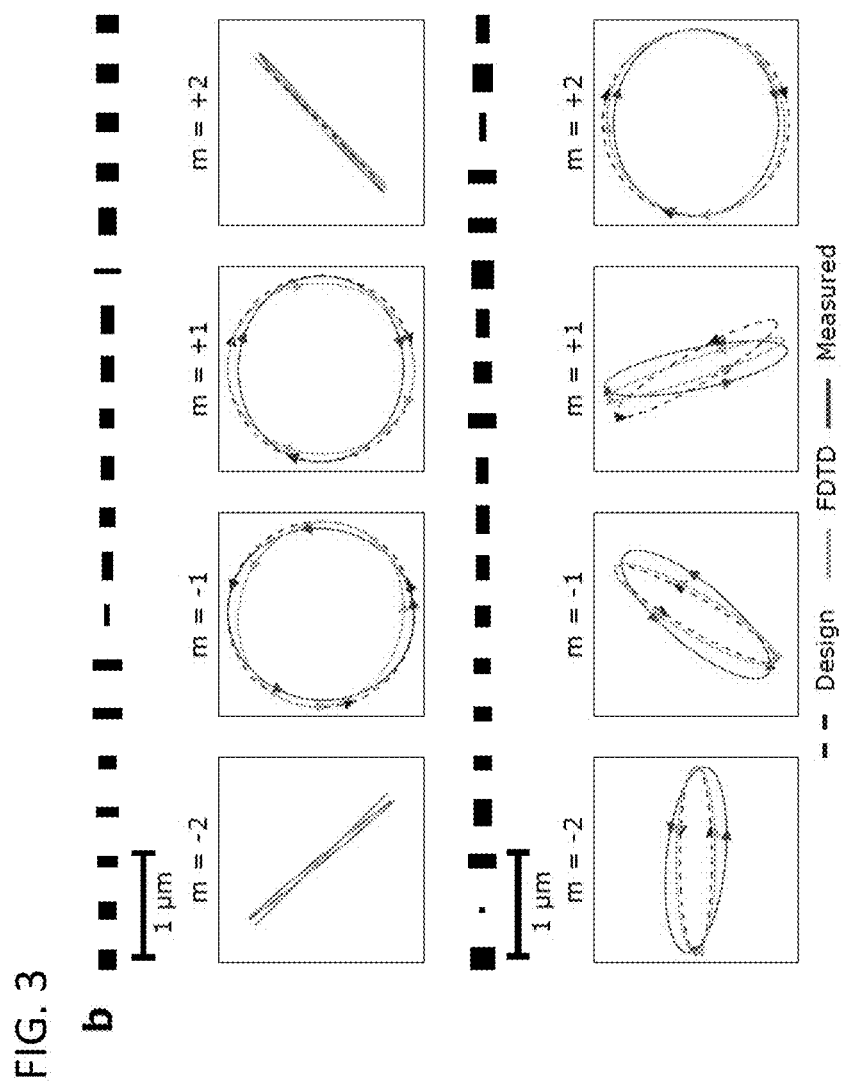

FIG. 3.: a, exemplary schematic of optimization routine used to design metasurface polarization gratings. An initial guess for the phase profiles $\vec{\Phi}_x$ and $\vec{\Phi}_y$ is optimized to direct as much light as possible into the diffraction orders of interest using gradient descent under the constraints of the desired polarization states. This guess may be improved by a gradient-free method that accounts for simulated properties of the phase shifters used, and a final geometry is generated. These geometries are realized in $TiO_2$ for operation at $\lambda=532$ nm. b, the scheme in (a) is used to generate two gratings, one for four polarizations of general interest (top) and one for a tetrahedron configuration of polarization states (bottom). Each grating generates four polarization states, and the target ellipse, expectation from FDTD simulation, and experimentally observed polarization ellipse on each grating order are shown. c, design (black) and electron micrographs as-fabricated of the "four polarization" (top) and "tetrahedron" (bottom) gratings. In the tetrahedron grating the exceedingly small pillar has not survived fabrication. d, a representation of the results in (b) on the Poincare sphere. Dashed lines represent the designed polarizations and the solid shapes denote experimental measurements.

Figure 4A:
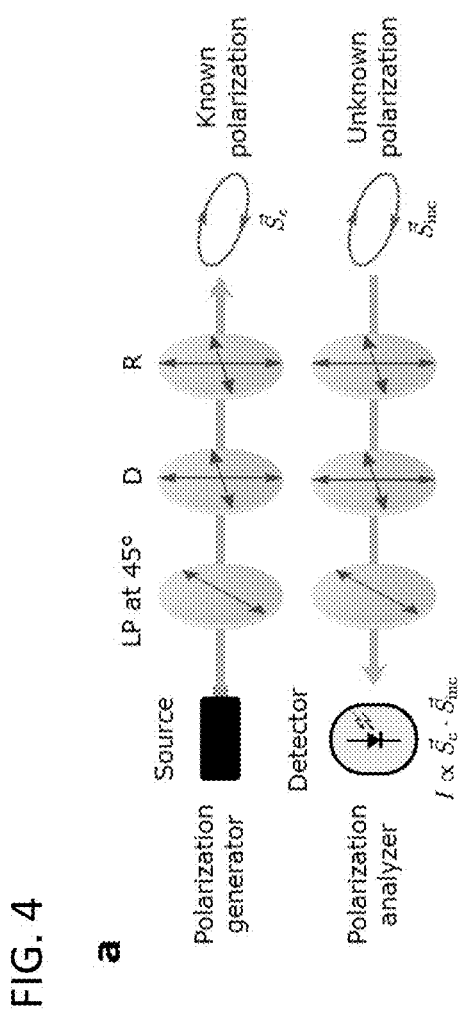
Figure 4:
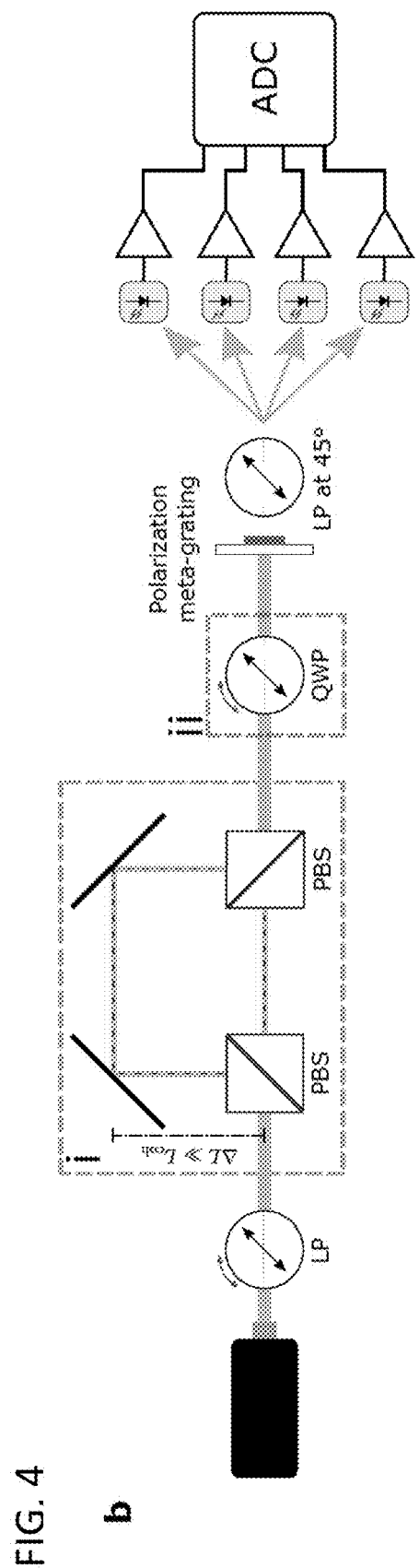

FIG. 4.: a, as each diffraction order may be thought of as a cascade of a diattenuator and a retarder (FIG. 2d), when light from a source of known polarization (in this case, linearly polarized at 45°) is incident, a characteristic polarization $\vec{S}_c$ is produced. If light of unknown polarization $\vec{S}_{inc}$ is incident in the reverse direction and if the source is replaced with a detector, the measured intensity $I \propto \vec{S}_{inc} \cdot \vec{S}_c$ is obtained by time-reversal symmetry. b, this fact allows the meta-grating to function as a parallel polarimeter. Each of the four diffraction orders of the tetrahedron grating may be used as a separate analyzer. Light incident on the metasurface passes through a linear polarizer at 45° and diffracts onto four photodiodes whose photocurrents are amplified and digitized through an analog-to-digital converter (ADC). For testing and calibration purposes, light passes through various polarization optics in front of the meta-grating. The role of the boxed components (i) and (ii) are described in the text. c, As the linear polarizer is rotated in front of a polarization Mach-Zehnder interferometer ((i) in (b)) whose path length difference is larger than the laser coherence length $L_{coh}$, the degree of polarization (DOP) varies. Plotted is the DOP reported by the meta-grating polarimeter which nearly identically follows the theoretically expected curve. At 45° (inset), when the light is maximally decohered, a DOP of p=0.2±0.176% is measured.

Figure 5A:
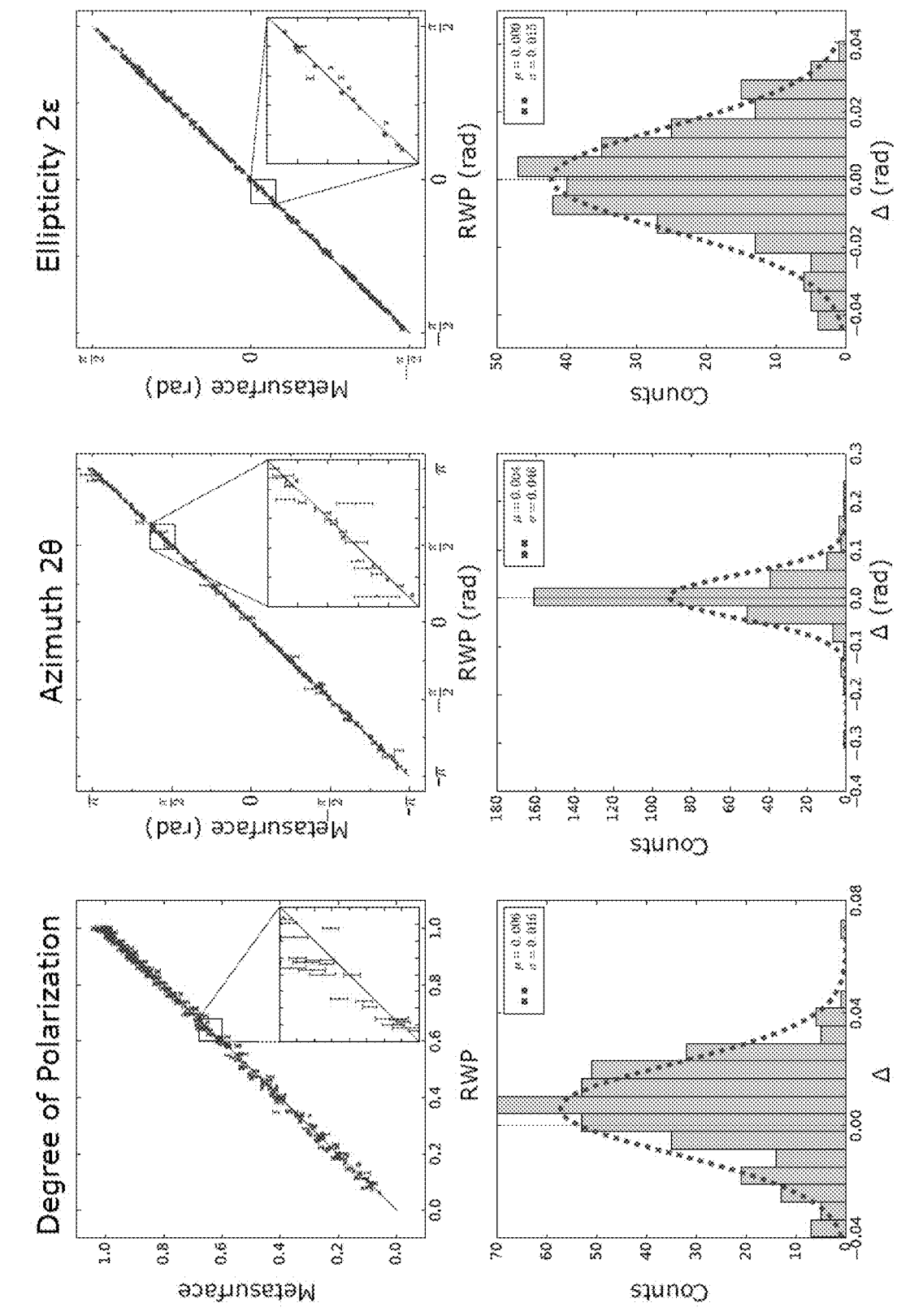
Figure 5:
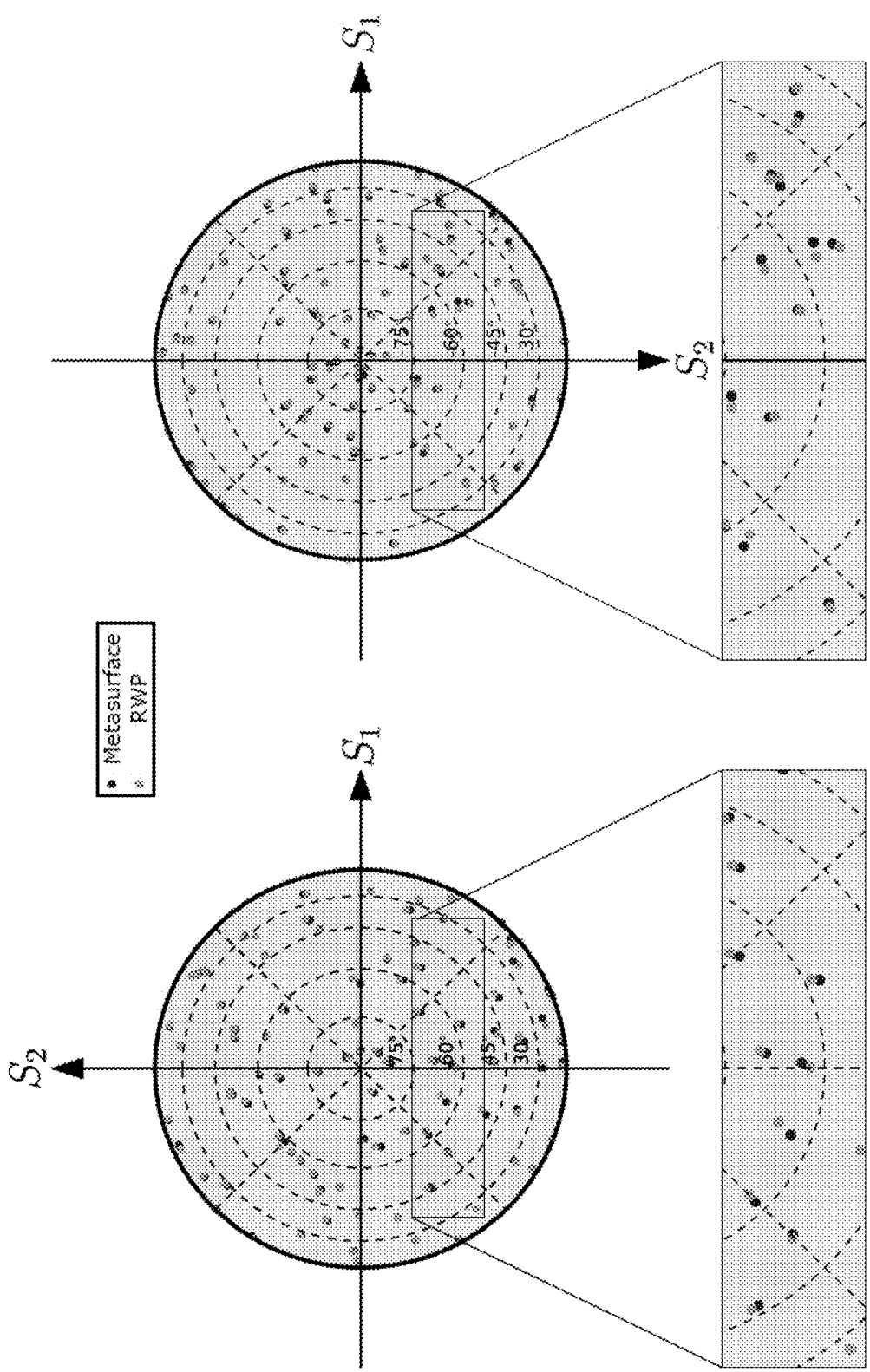

FIG. 5.: In each column, the metasurface grating polarimeter (metasurface) and the commercial rotating waveplate polarimeter (RWP) are compared using different polarimetric quantities. In the top row of graphs, values reported by each polarimeter are plotted against one another (in the case of perfect correspondence all values would lie along the 1:1 line). Insets of each plot are shown. Error bars are given for the metasurface values since precision is not known for the commercial RWP. In the bottom row of plots, the differences between the values reported by each polarimeter are computed and plotted in a histogram. Each distribution is fitted with a normal distribution and the mean μ and variance σ are given for each. The quantities examined are the degree of polarization (DOP), the azimuth double angle 2θ, and the ellipticity double angle 2∈. The latter two are parameters of the polarization ellipse that give the spherical coordinates of the polarization state on the Poincare sphere.

Figure 6:
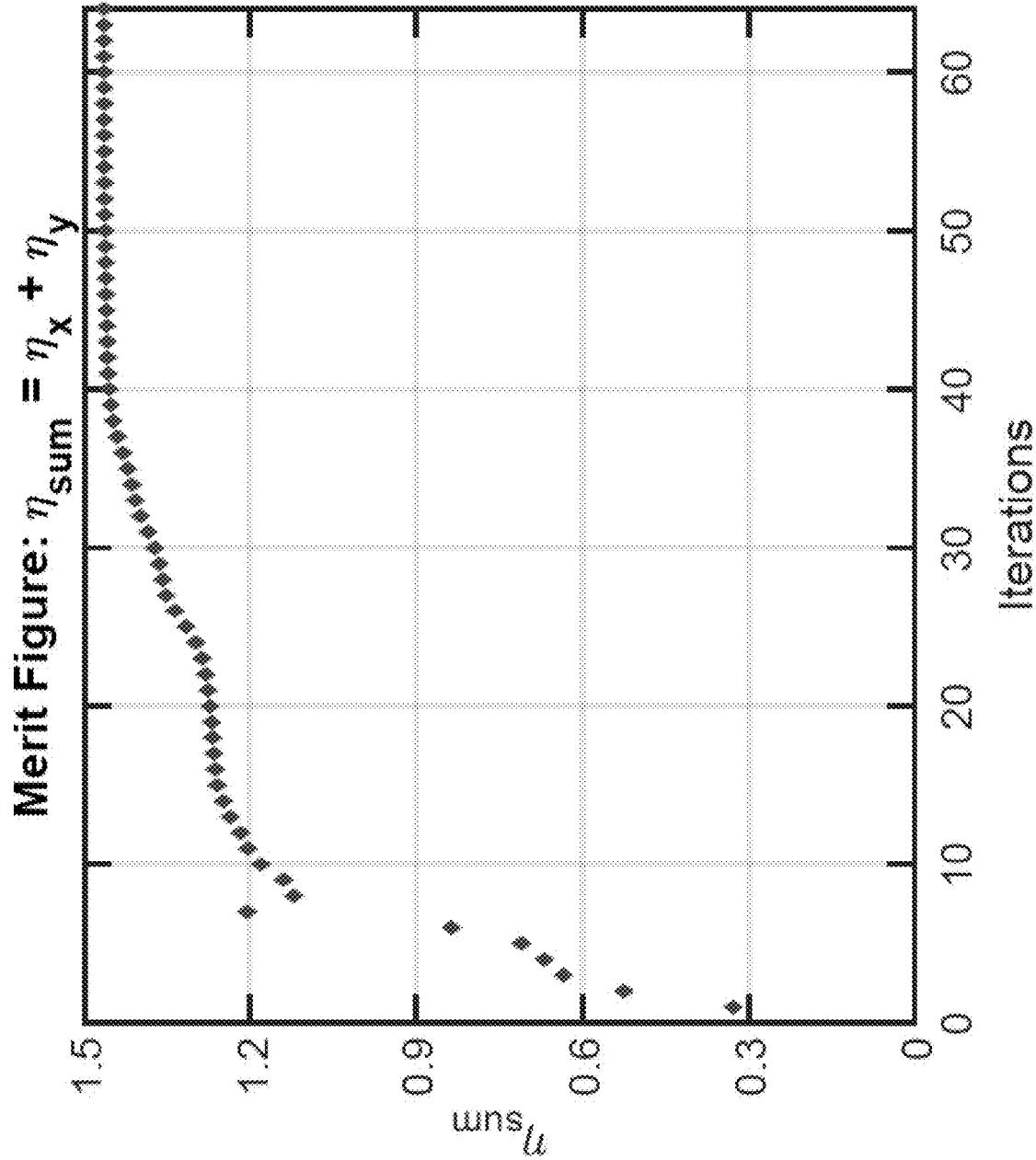

FIG. 6.: Evaluation of the merit criterion over 64 iterations. Shown here is the sum merit criterion, e.g. the amount of each of x- and y-polarized light that are directed into the orders of interest. Since in this case the incident polarization is 45°, $\eta_x = \eta_y$. The efficiency converges to a peak value of $\eta_{sum} = 1.4639$, meaning that the overall efficiency $$\eta = \frac{\eta_{sum}}{2} = 73.1\%.$$

Figure 7:
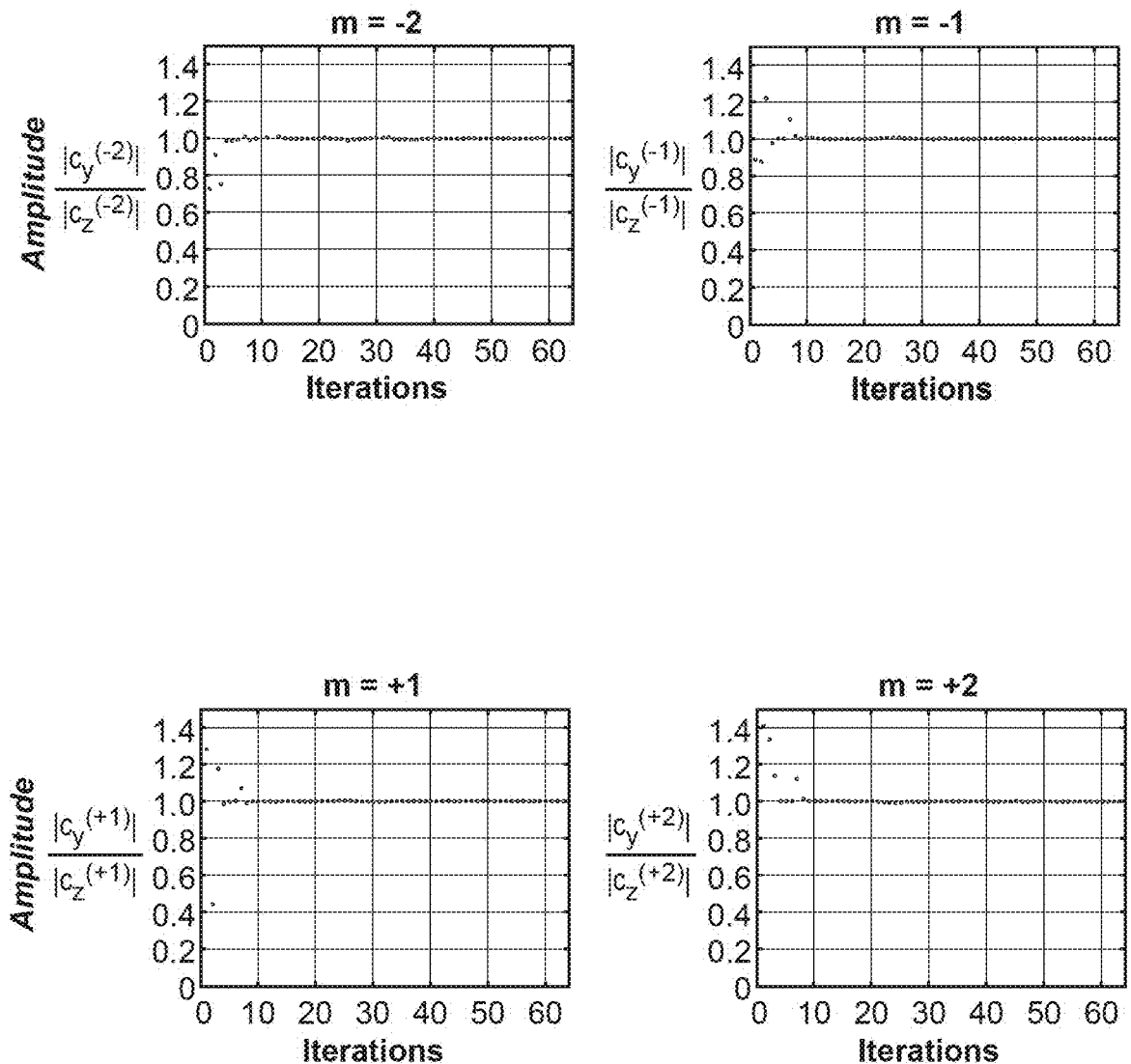

FIG. 7.: Convergence of constraints results for the four-polarization grating in the text over 64 iterations.

Figure 8:
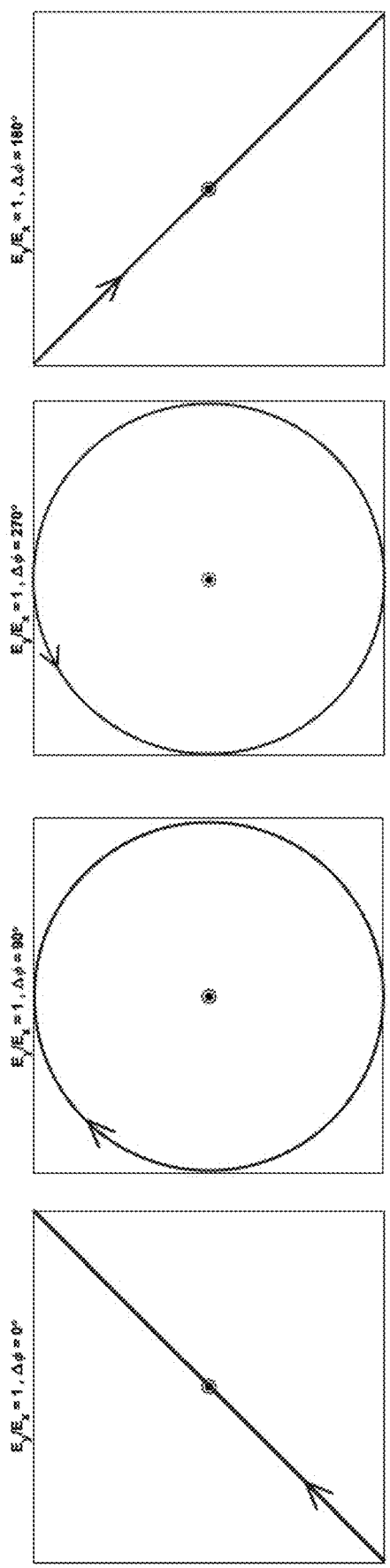

FIG. 8.: Polarization ellipses obtained on the four diffraction orders from direct Fourier transform of the optimized phase profiles $\phi_x(\tilde{x})$ and $\phi_y(\tilde{x})$.

Figure 9:
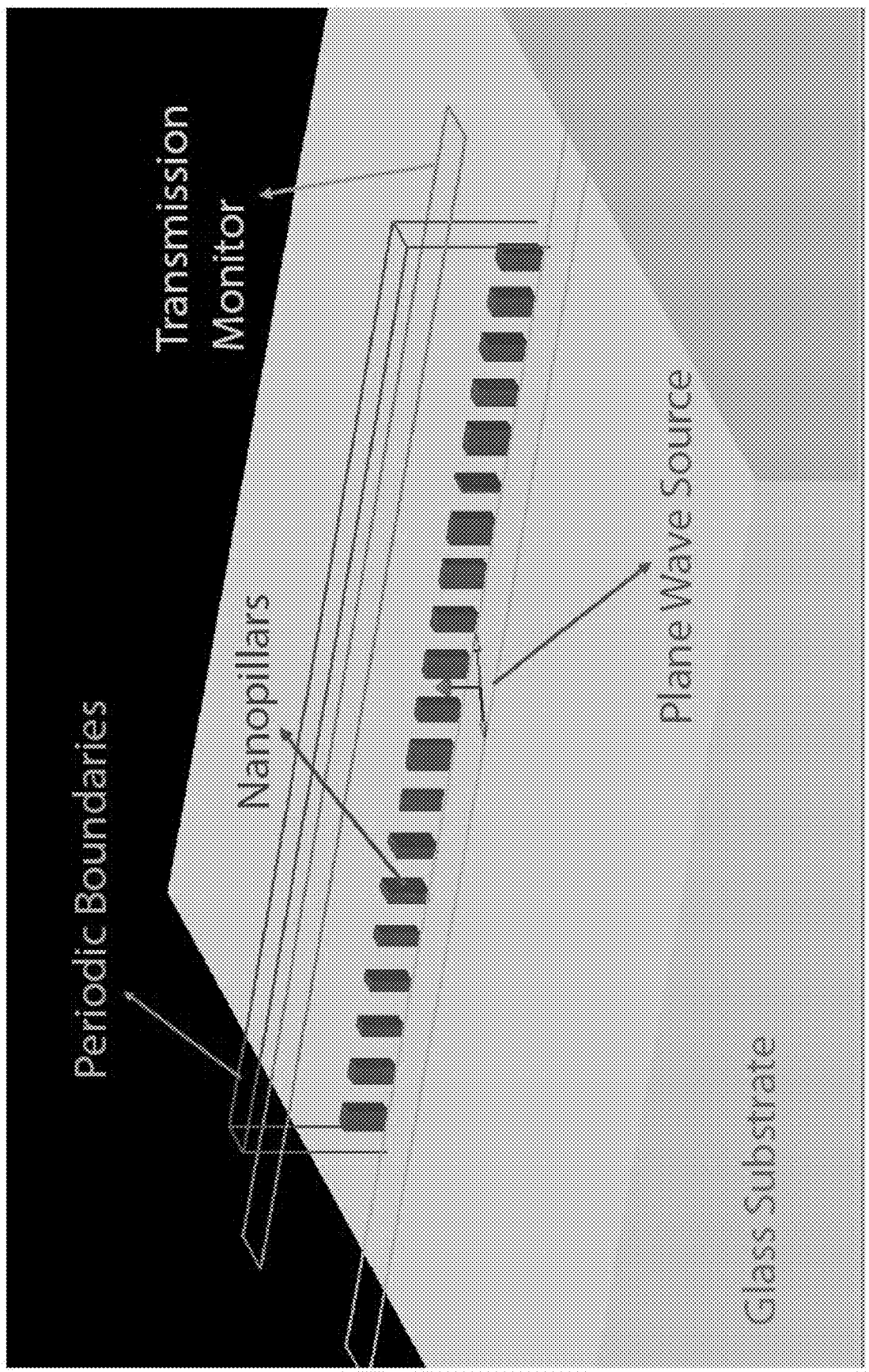

FIG. 9.: Schematic of an FDTD simulation of a designed grating in Lumerical FDTD®.

Figure 10:
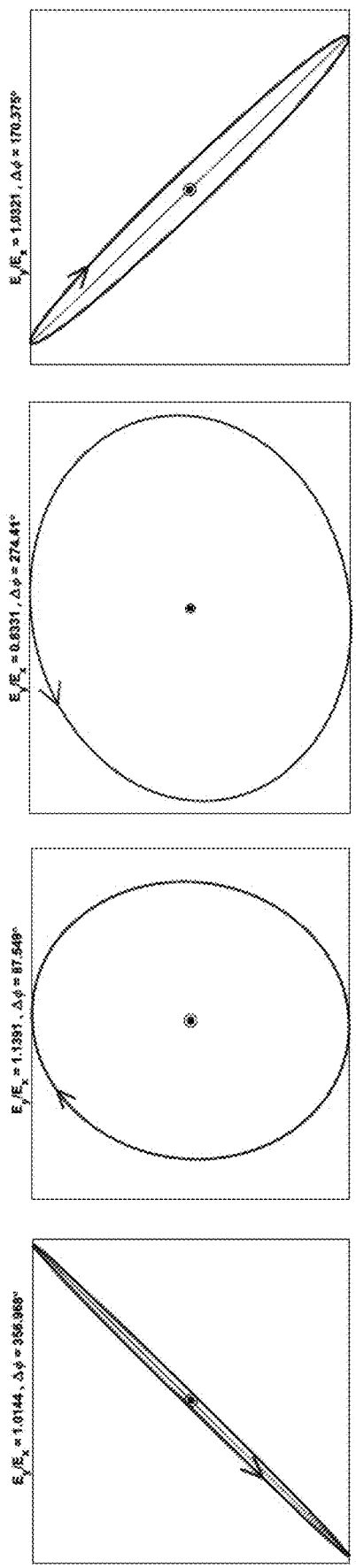

FIG. 10.: Polarization ellipses on diffraction orders predicted from FDTD simulation of designed diffraction grating.

Figure 11:
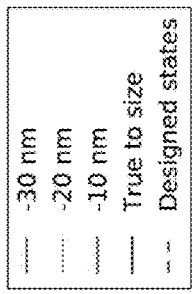
Figure 11:
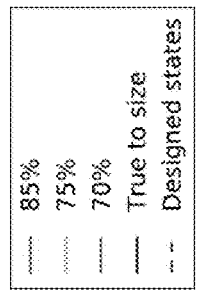
Figure 11:
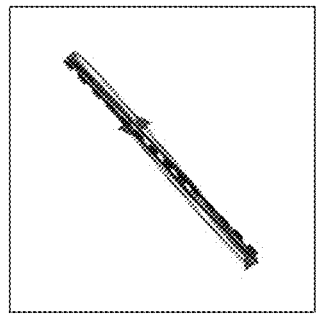
Figure 11:
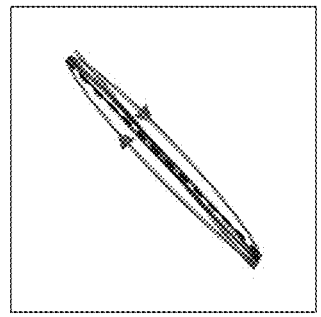
Figure 11:
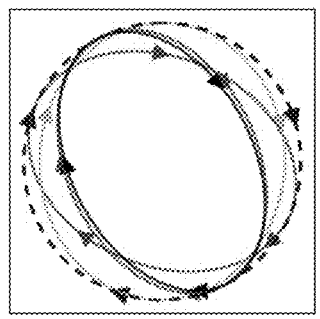
Figure 11:
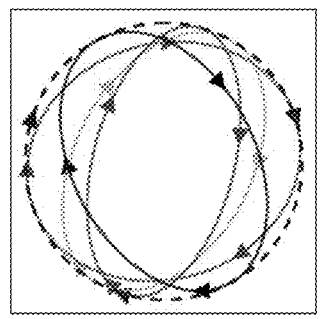
Figure 11:
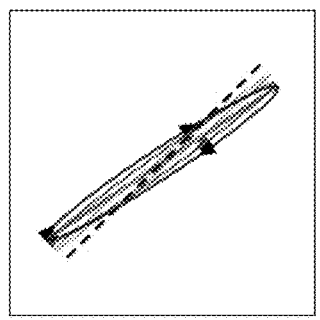
Figure 11:
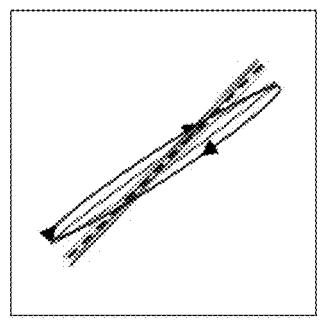

FIG. 11.: Effect of changing nominal fabrication CAD given to e-beam system on polarization ellipses produced on the m=−2, −1, +1, and +2 on the four-polarization grating.

Figure 12:
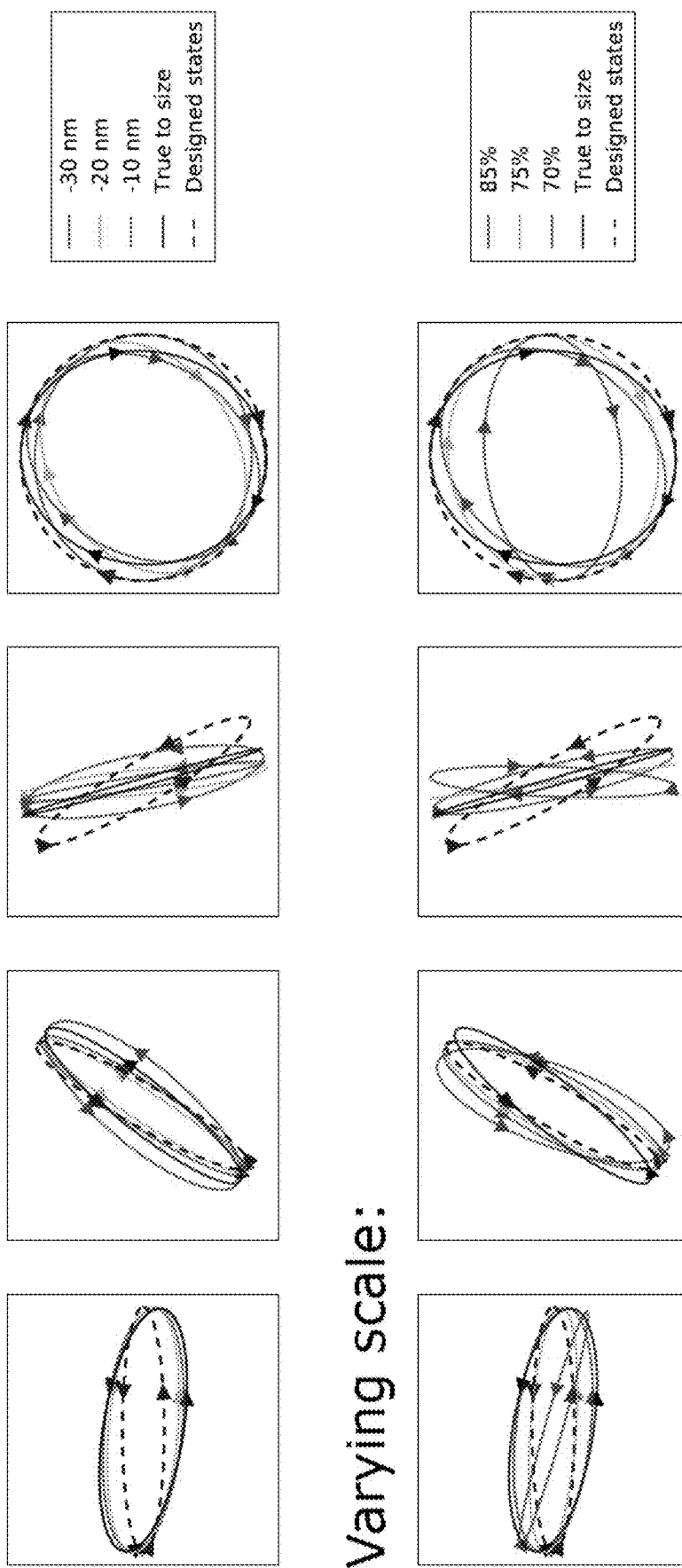

FIG. 12.: Effect of changing nominal fabrication CAD given to e-beam system on polarization ellipses produced on the m=−2, −1, +1, and +2 on the tetrahedron grating.

Figure 13:
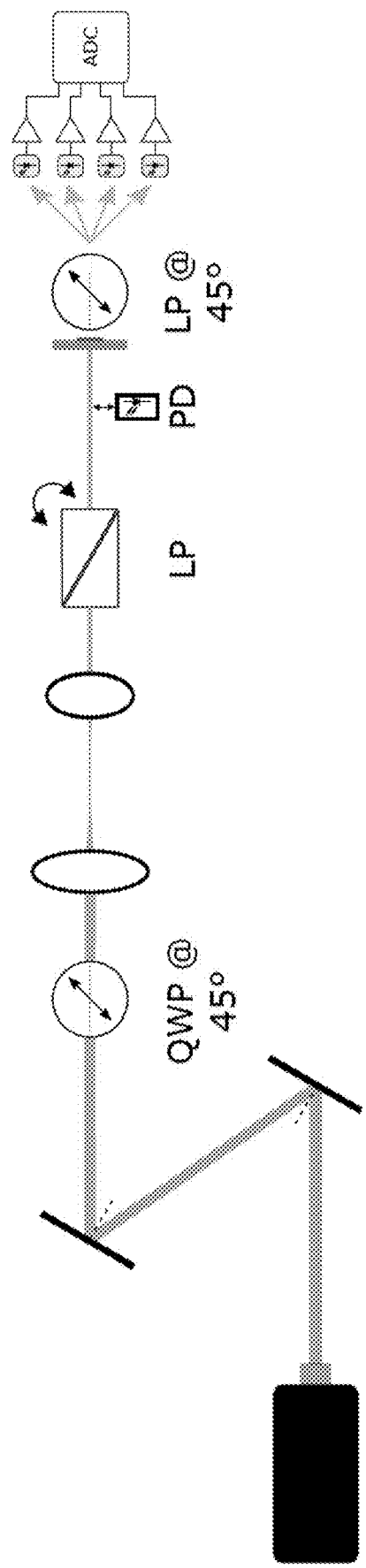

FIG. 13.: Schematic of the optical setup used during the first stage of the calibration of the metasurface grating polarimeter.

FIG. 14.: Visualization: As the linear polarizer is rotated, the incident laser beam traces out a circular path on the metasurface.

Figure 15:
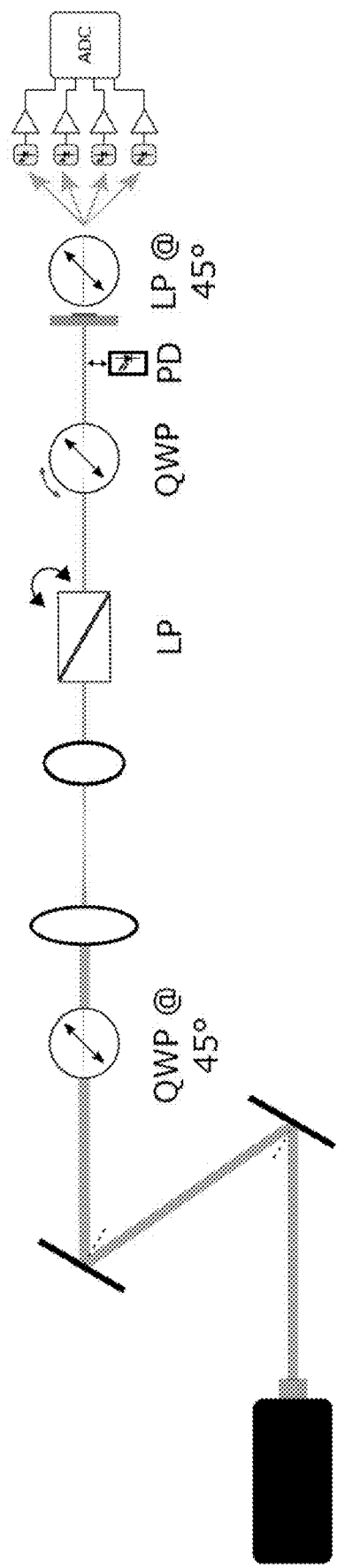

FIG. 15.: Schematic of the optical setup used during the second stage of the calibration of the metasurface grating polarimeter.

Figure 16:
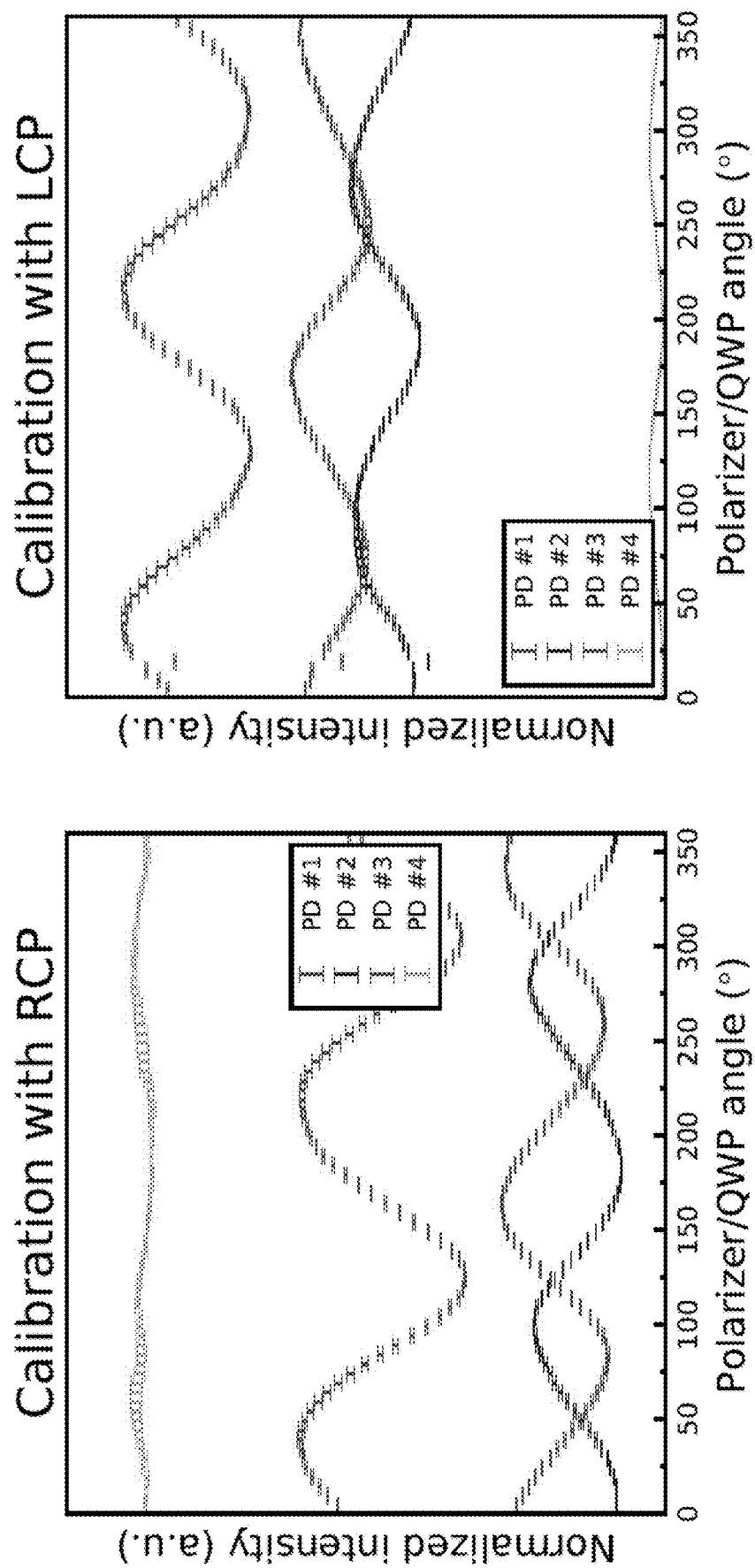

FIG. 16.: Calibration data obtained from the exposing the polarimeter to RCP and LCP light. Averaging the values obtained on each channel yields $\vec{I}_{RCP}$ and $\vec{I}_{LCP}$. Note that for one circular polarization, Photodiode I is nearly extinguished, while for the other it is maximal, as would be expected from the designed polarization state.

Figure 17:
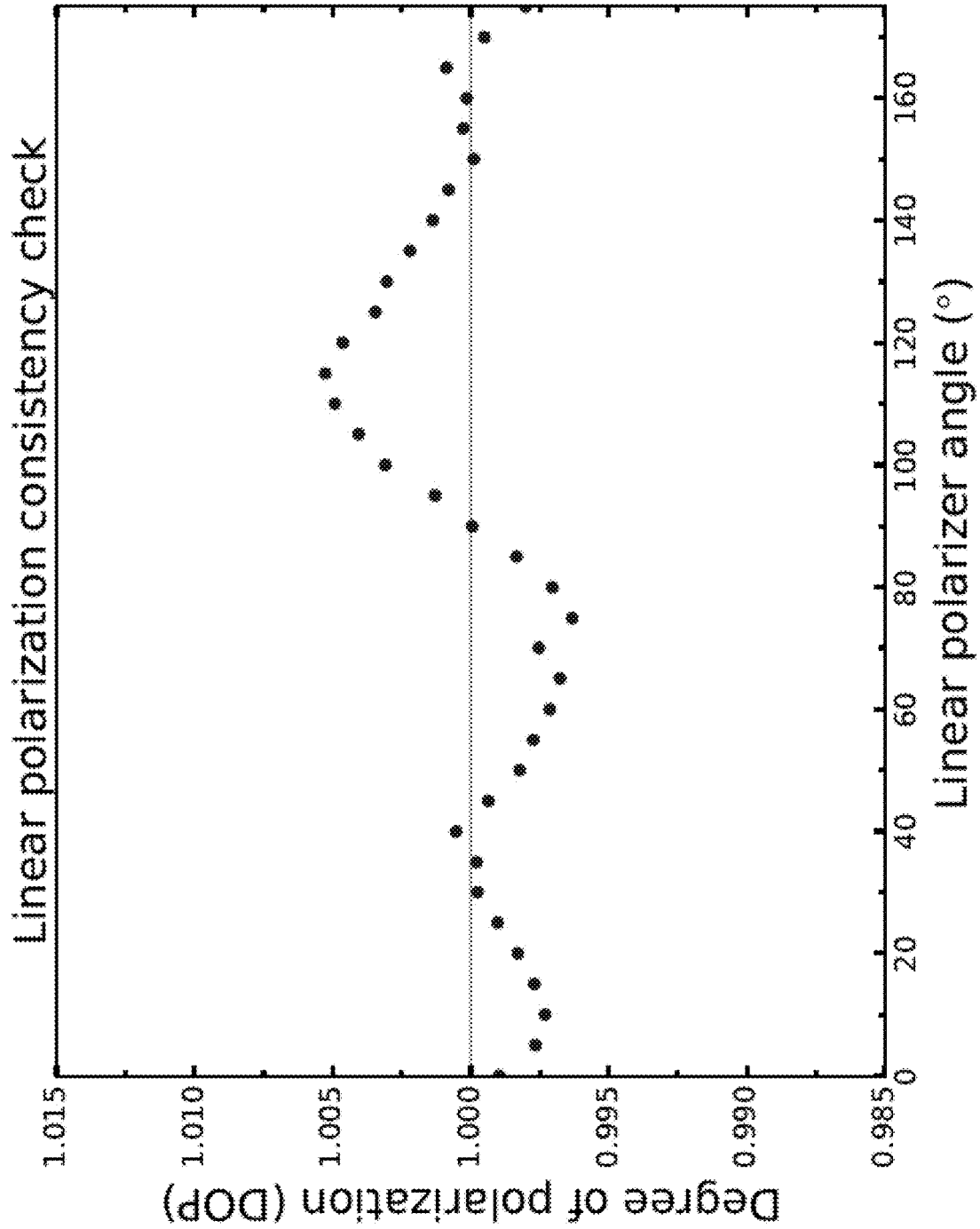

FIG. 17.: The DOP of the linear polarization states used during calibration, as determined with the final instrument matrix A. The fact that these DOPs never differ by more than about 0.5% indicates that the calibration was self-consistent and that the resultant instrument matrix A can be trusted.

Figure 18:
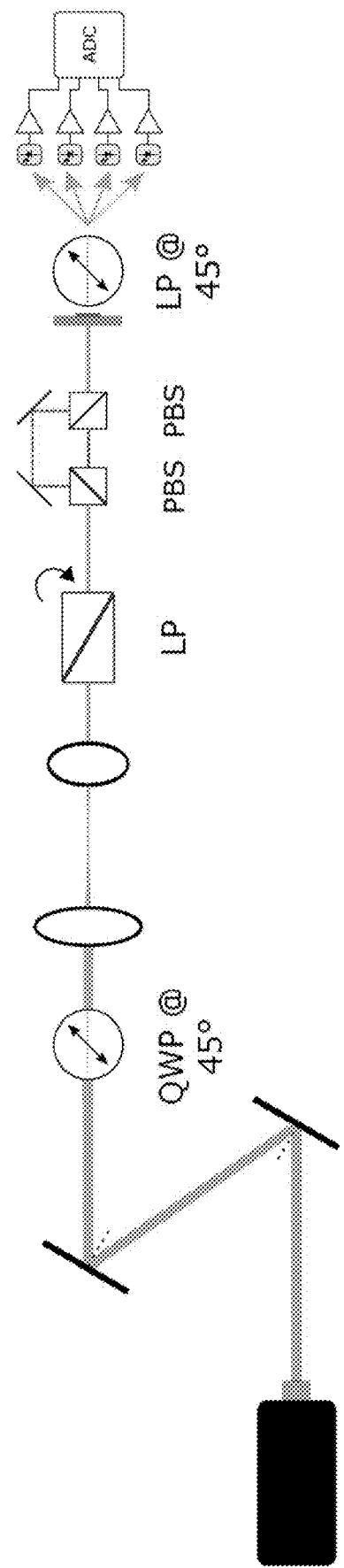

FIG. 18.: Schematic of the setup used to produce and quantify partially polarized light with the metasurface-grating polarimeter.

Figure 19:
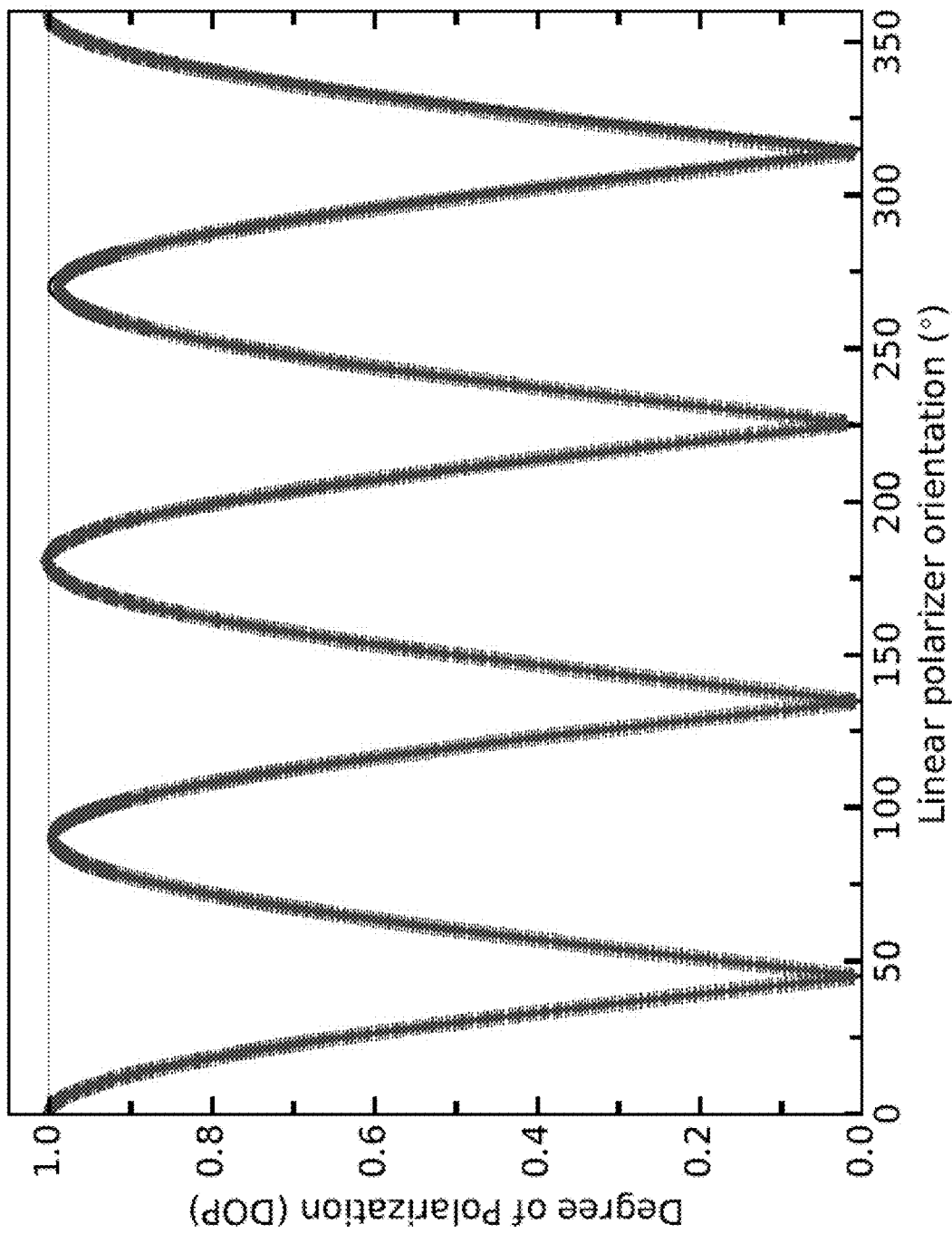

FIG. 19.: Full dataset presented for partially polarized light. Data points are taken every 0.25° and are shown, partially obscuring the theoretical fit.

Figure 20:
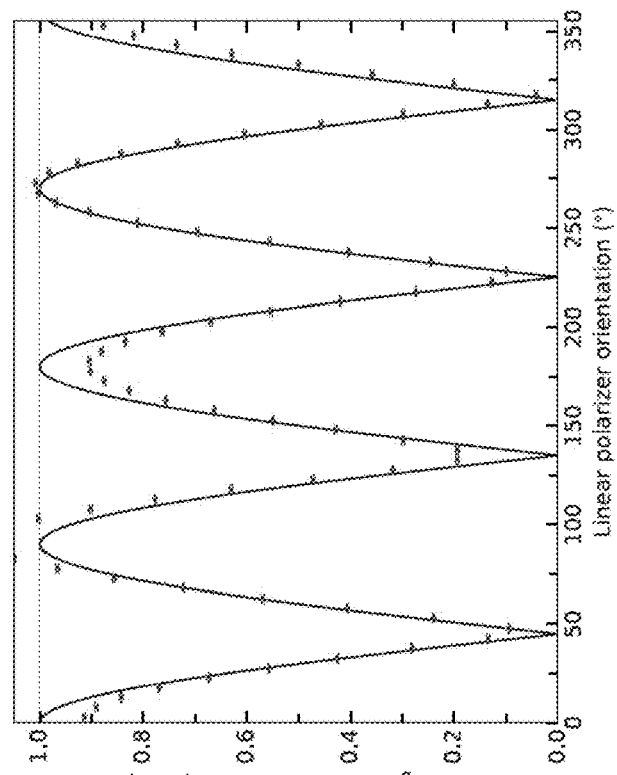
Figure 20:
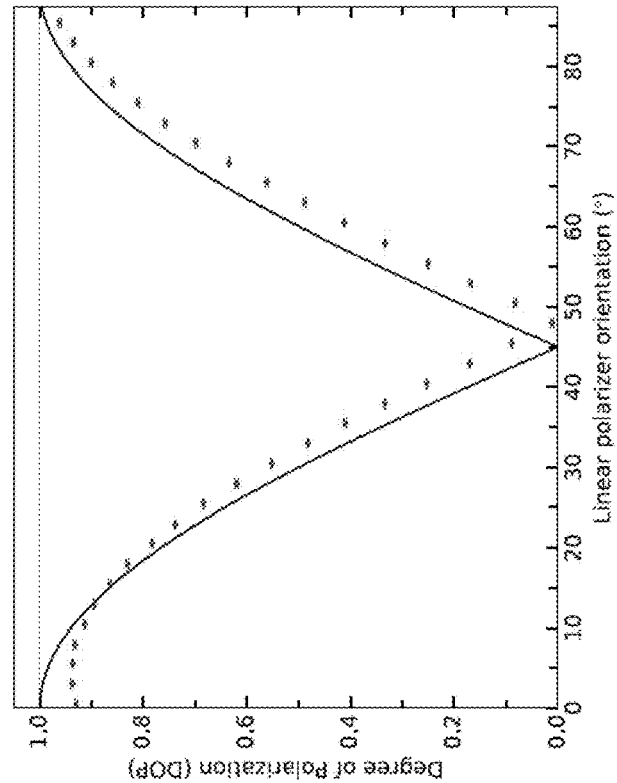

FIG. 20.: A smattering of unusual results obtained in different iterations of the same experiment. We discuss possible causes of these trends.

Figure 21:
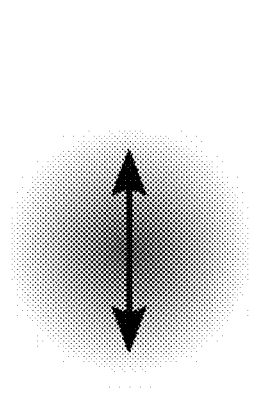
Figure 21:
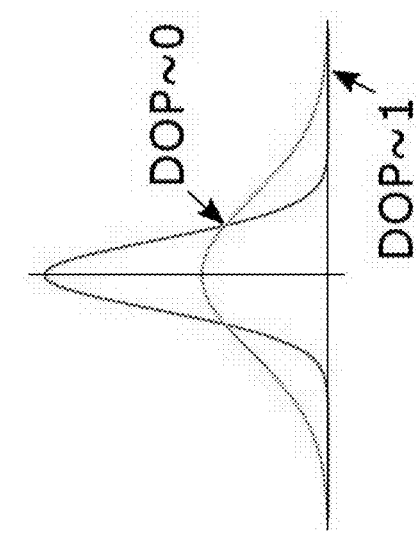
Figure 21:
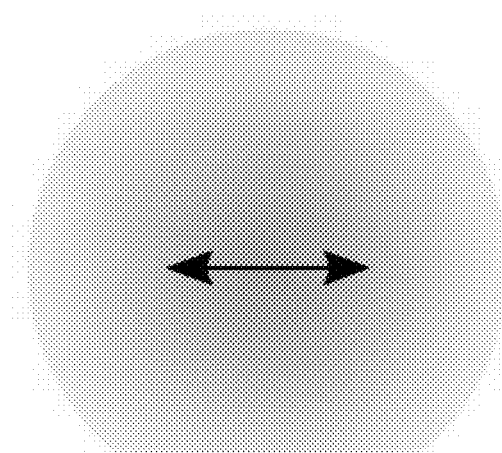
Figure 21:
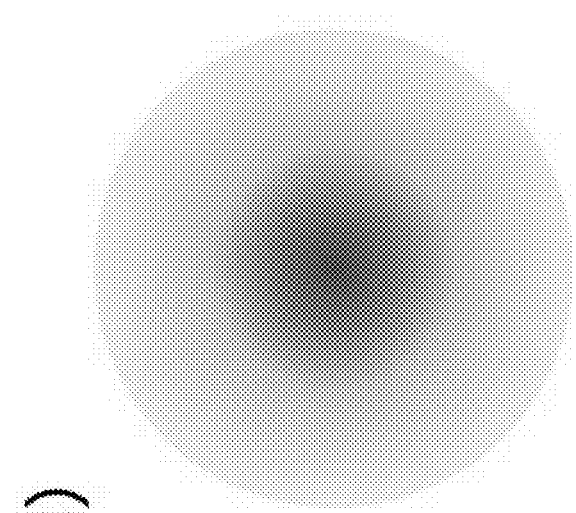

FIG. 21.: Two beams from the polarization beamsplitter interferometer emerge having diverged by different amounts. These beams (shown in a and b) are orthogonally linearly polarized and have no phase memory of one another. When these beams—of equal overall intensity—overlap, the DOP varies across the beam profile, rather than being 0 everywhere as intended. At the points where their intensities are equal, the DOP is 0, and it is nearly 1 at points where one beam dominates. Note here that the two beams are of the same wavelength, and that color is used here for illustrative purpose. The difference in the sizes of the beams is exaggerated here.

FIG. 22.: The 4 x 4 instrument matrix. The elements in the leftmost three columns are determined from the linear polarizer-only portion of the calibration and are enclosed in solid boxes. The fourth column is determined from the linear polarizer plus quarter-waveplate portion of the calibration and is enclosed in a dotted box. We can obtain estimates for covariances between elements in the same box. We cannot easily estimate the covariance for elements between boxes. Thus, we make the assumption that the 16×16 covariance matrix of A is diagonal.

Figure 23:
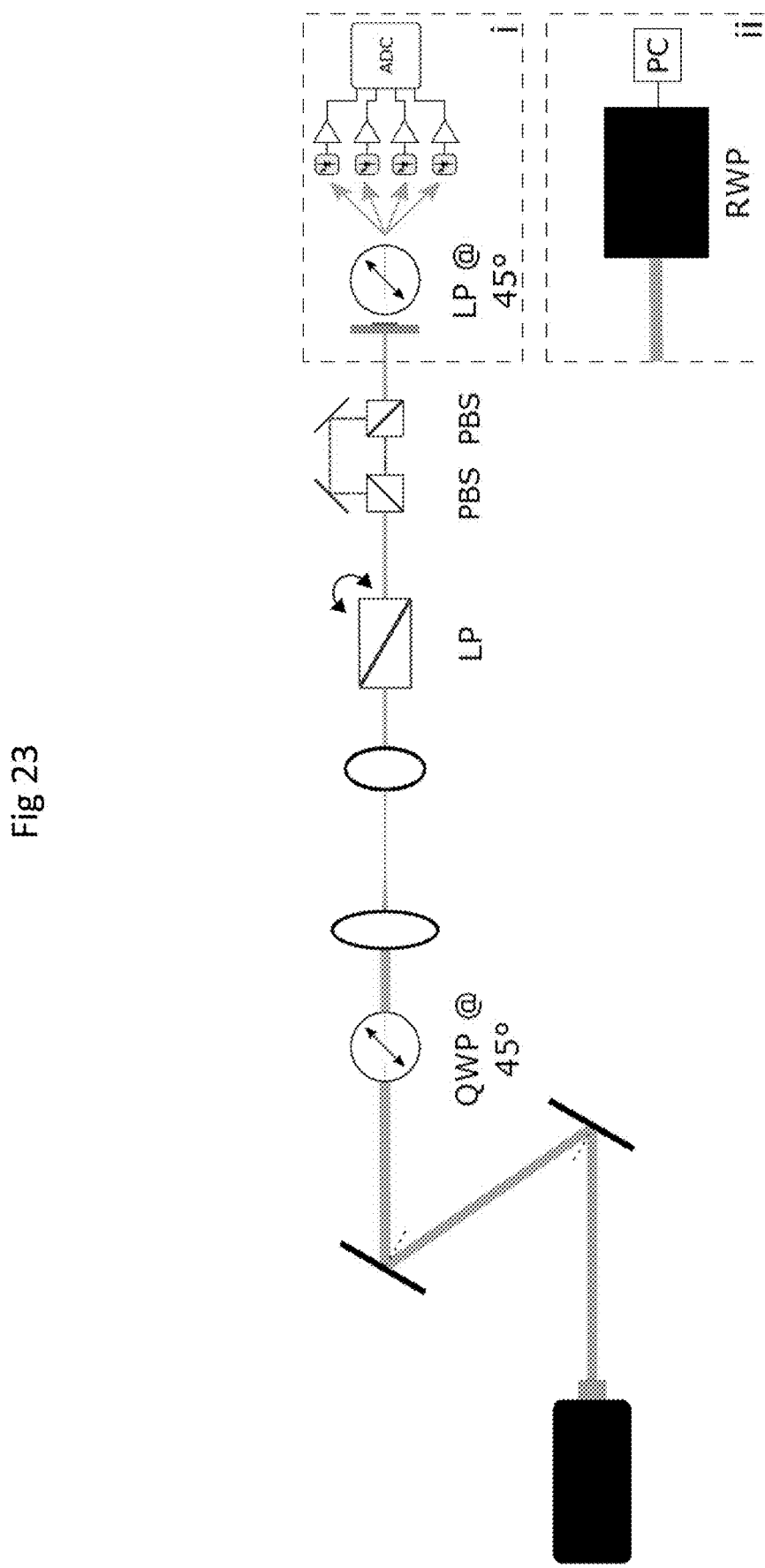

FIG. 23.: Setup used for comparison of degree of polarization measurements (DOP) between polarimeters.

Figure 24:
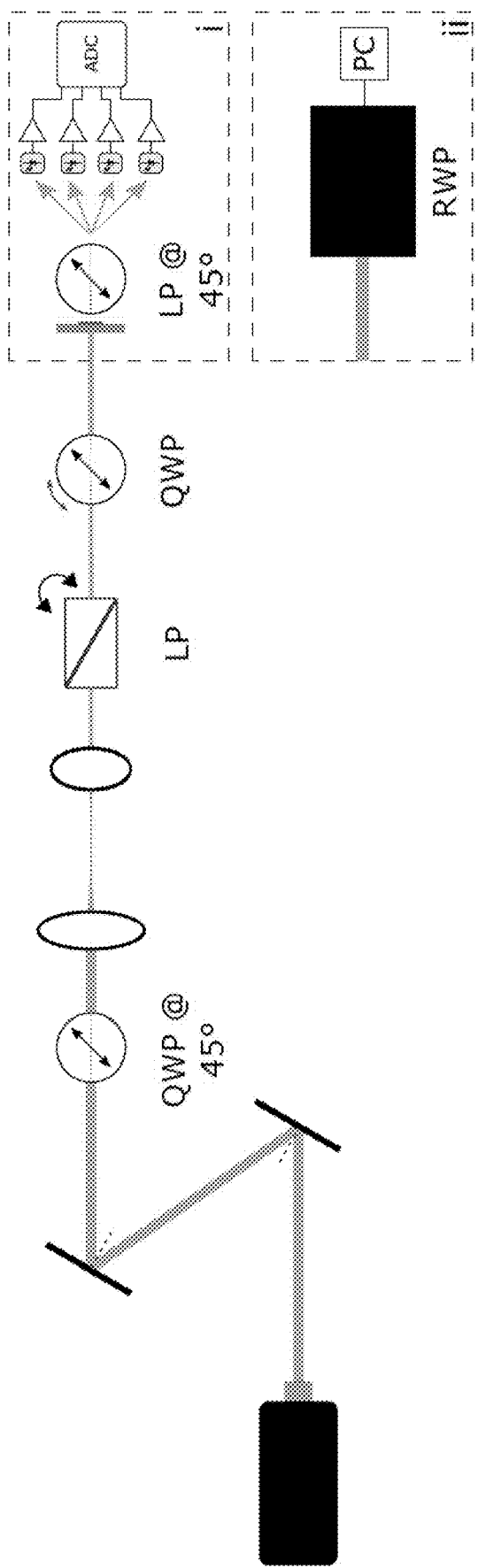

FIG. 24.: Setup used for comparison of azimuth and ellipticity between polarimeters.

Figure 25:
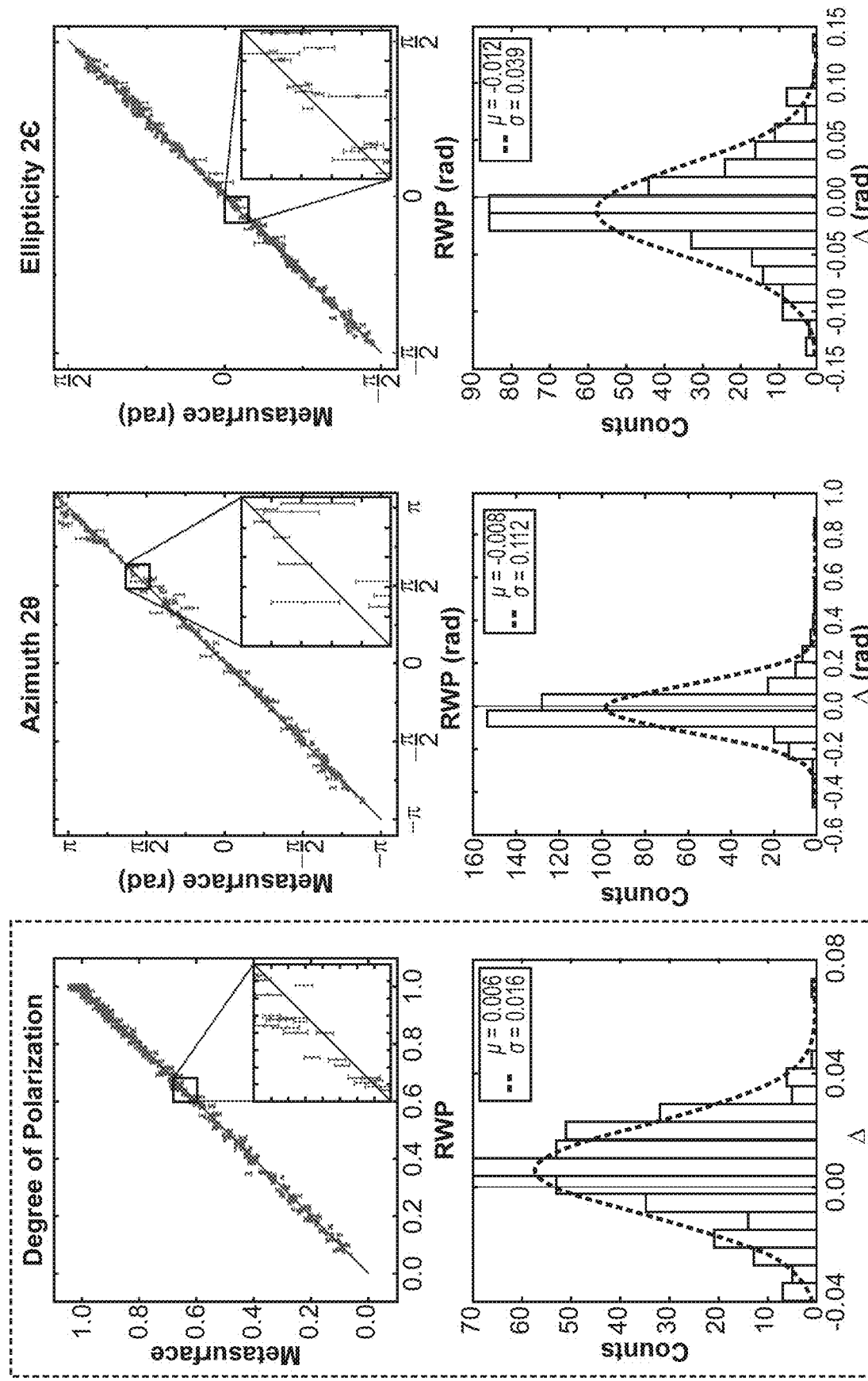

FIG. 25.: Full results for all polarimetric parameters obtained using the setup in FIG. 23, which includes a polarization Mach-Zehnder interferometer for the generation of partial polarization states. The portion of this figure included in FIG. 4a is outlined with a dotted line.

Figure 26:
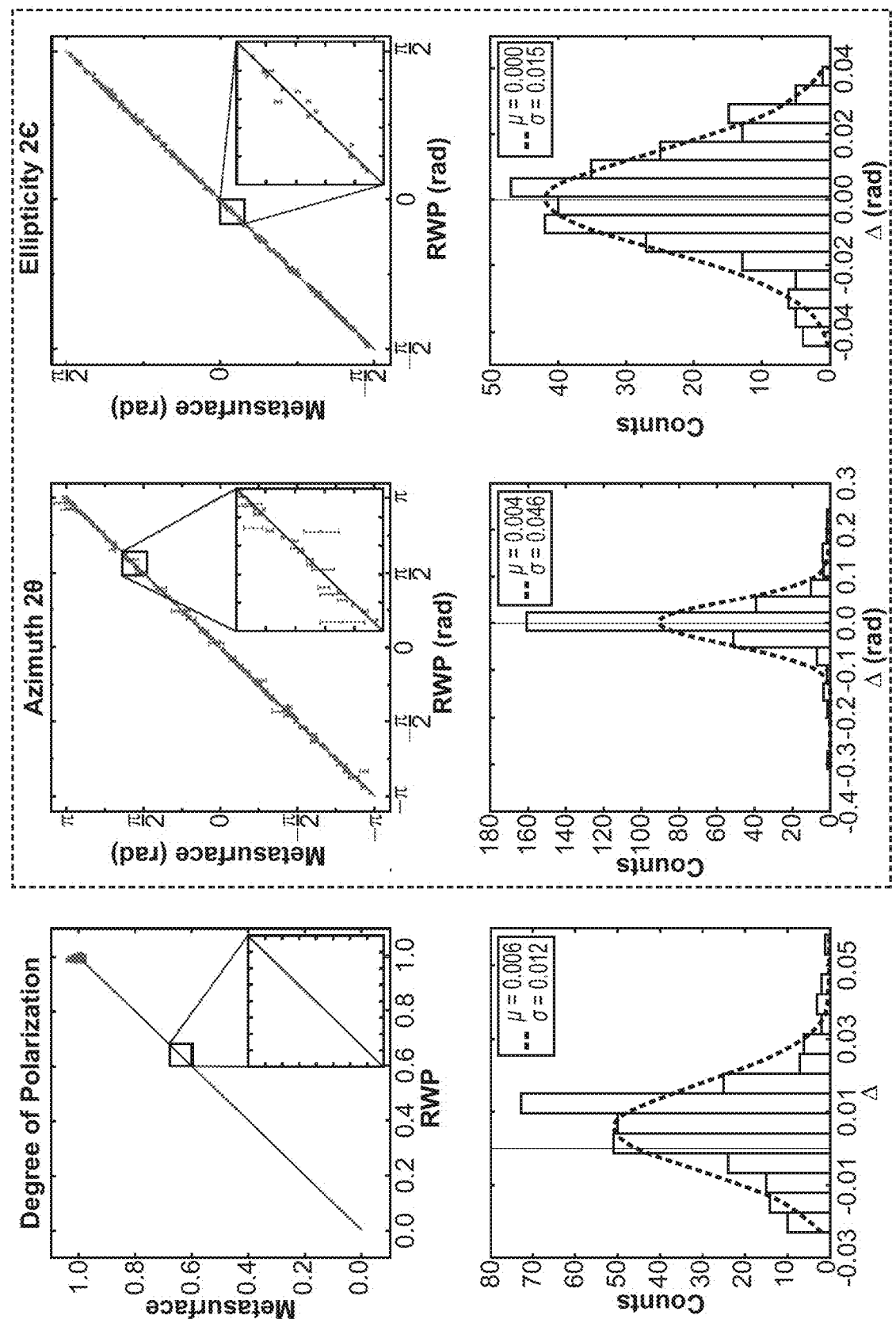

FIG. 26.: Full results for all polarimetric parameters obtained using the setup in FIG. 19, which has a LP and QWP but no Mach-Zehnder interferometer. The portion of this figure included in FIG. 4a is outlined with a dotted line. Note that here, due to the absence of the Mach-Zehnder interferometer, all the measured DOPs are clustered around 1.0 (as expected). The standard deviations of the differences in azimuth and ellipticity in this case are about half the size as in FIG. 25.

Figure 27:
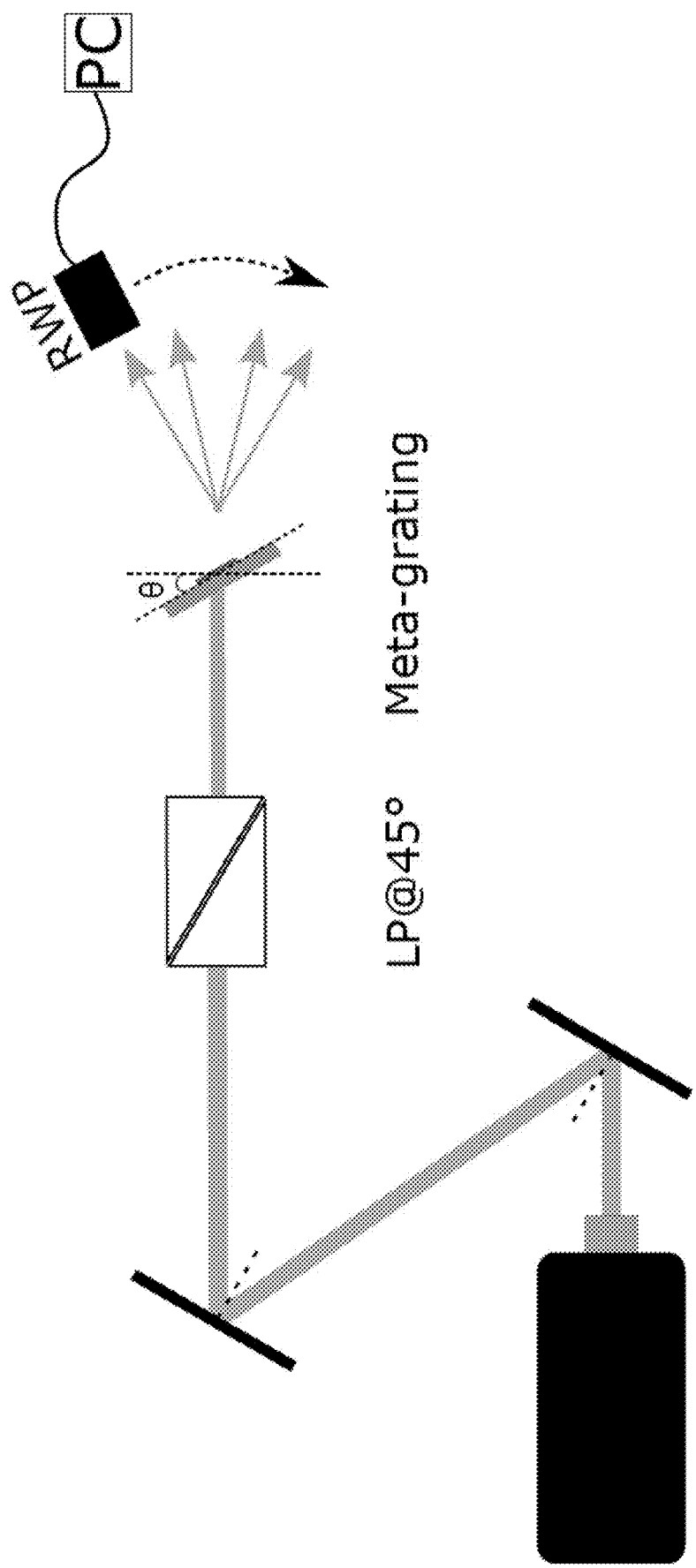

FIG. 27.: Experiment to characterize angle-dependence of polarization-state production. A laser, aligned to the table with two mirrors, is incident on a linear polarizer at 45°. The light impinges on the meta-grating which is on a mount so that it can be rotated by an angle of θ. A rotating waveplate polarimeter (RWP) is placed in front of each order in succession and the polarization data is recorded.

Figure 28:
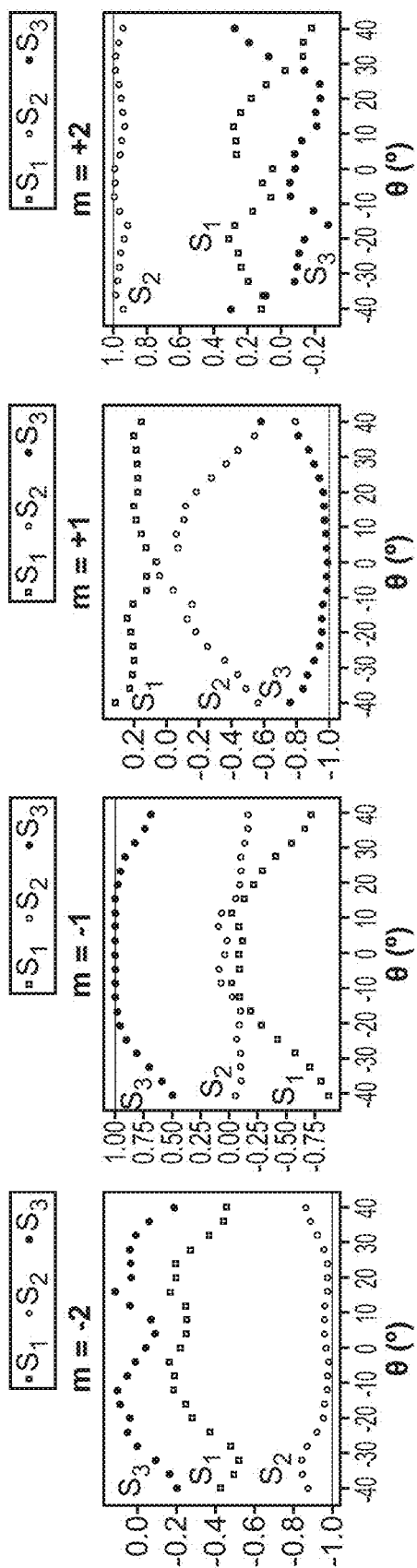
Figure 28:
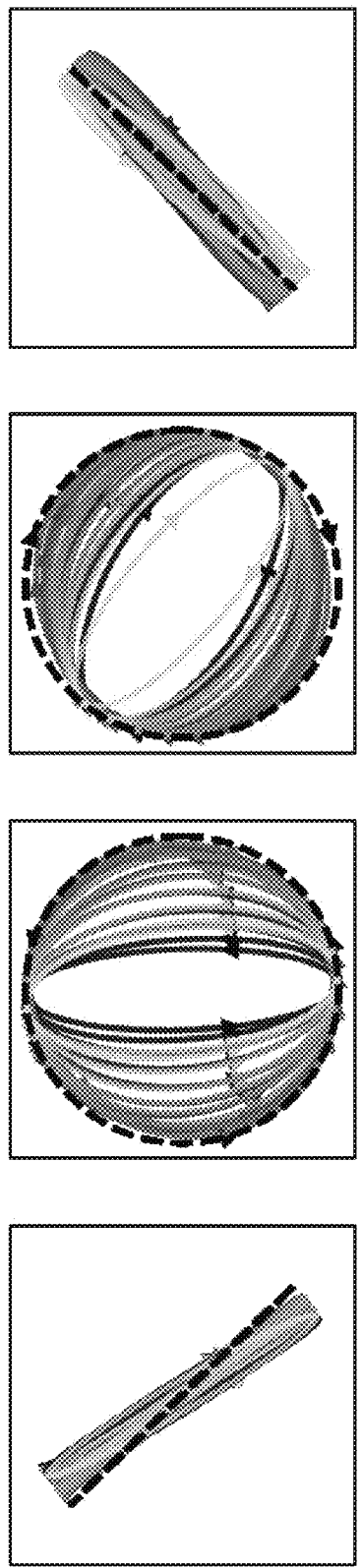

FIG. 28.: Incident-angle dependent study for meta-grating designed to generate a tetrahedron of Stokes vectors. In (a), for each diffraction order, the three Stokes parameters $\{S_1, S_2, S_3\}$ that dictate the polarization ellipse are plotted as a function of θ. In (b), the resultant polarization ellipses are for all incident angles studied.

FIG. 29.: Incident-angle dependent study for meta-grating designed to generate +45°/RCP/LCP/−45°. In (a), for each diffraction order, the three Stokes parameters $\{S_1, S_2, S_3\}$ that dictate the polarization ellipse are plotted as a function of θ. In (b), the resultant pollarization ellipses are for all incident angles studied.

FIG. 30.: This plot shows the same results as FIGS. 28 and 29 in the Poincare sphere representation. The more transparent the point, the higher the angle of incidence.

Figure 31:
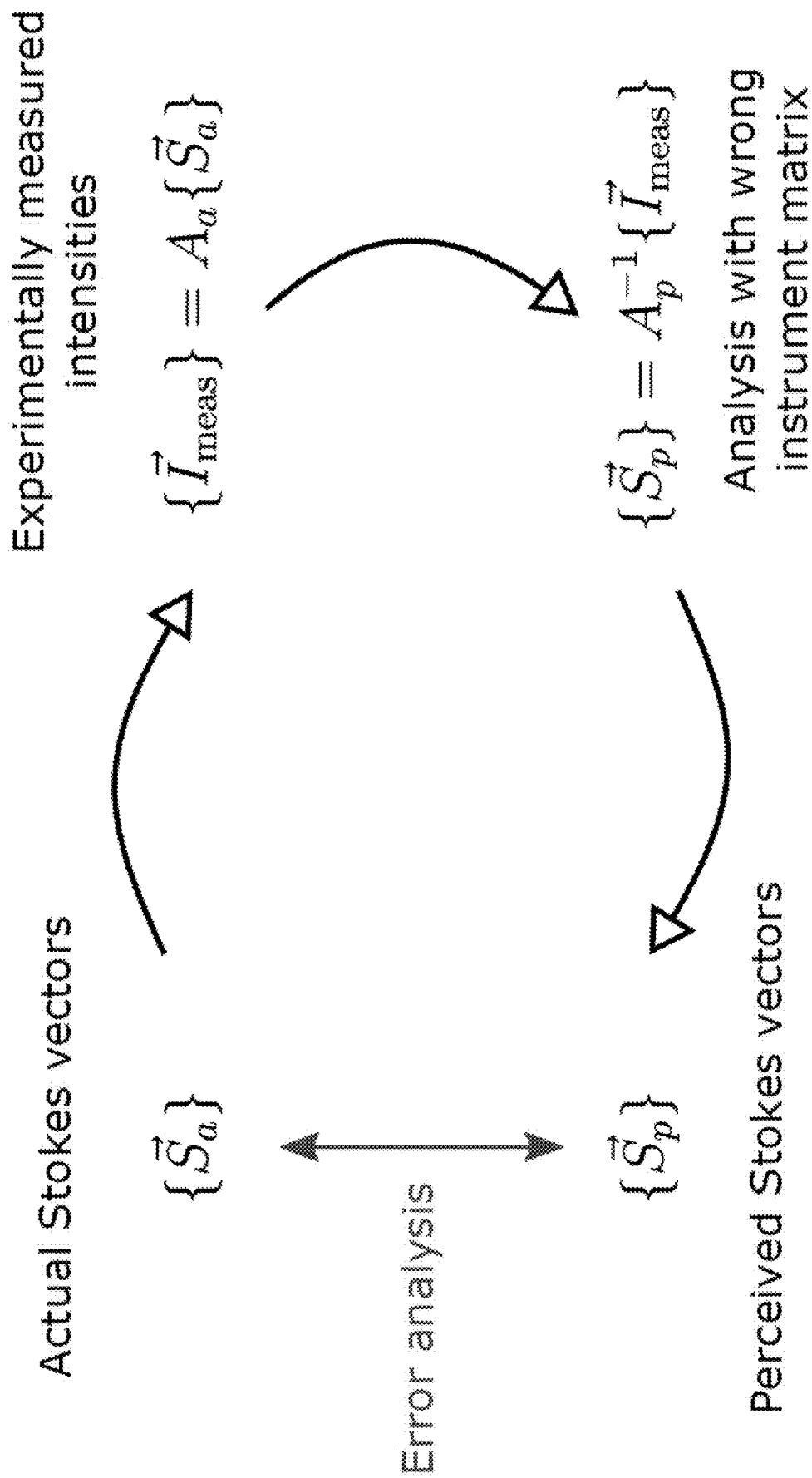

FIG. 31.: A schematic of the procedure used to analyze the effect of errors in the angle of incidence, or more generally of any effect that contributes to error in the instrument matrix, on reported Stokes vectors from the polarimeter.

Figure 32:
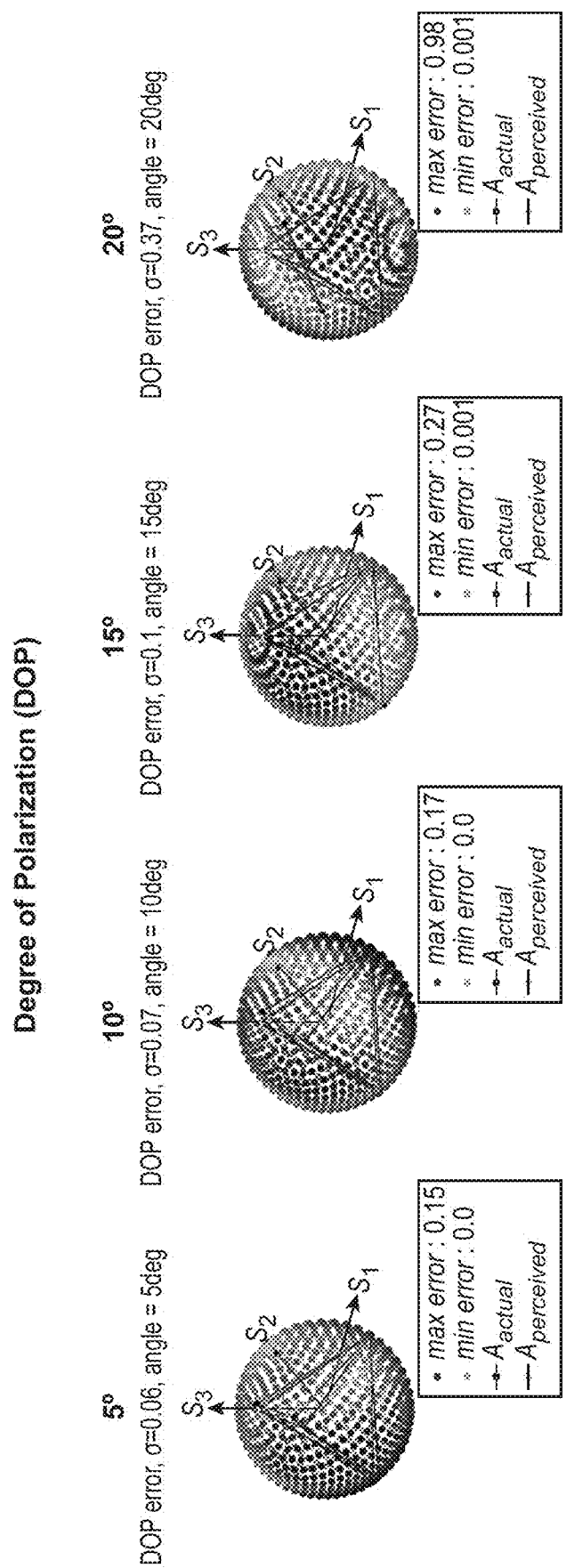
Figure 32:
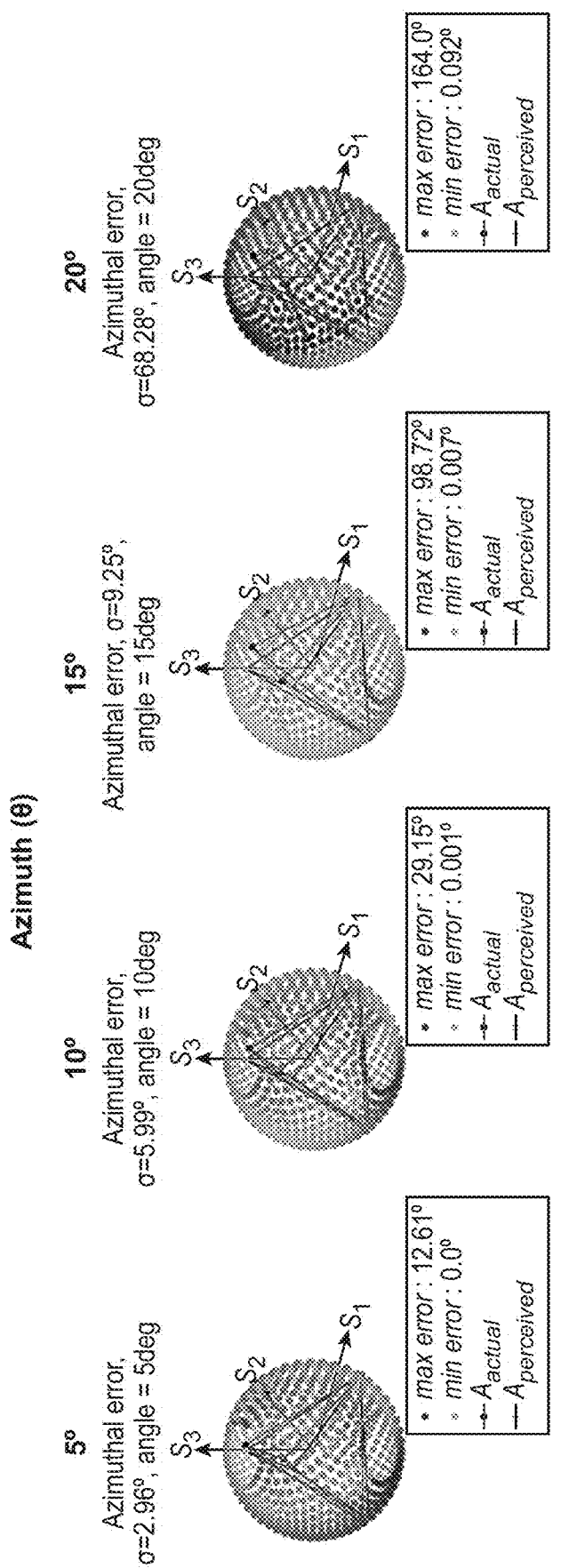
Figure 32:
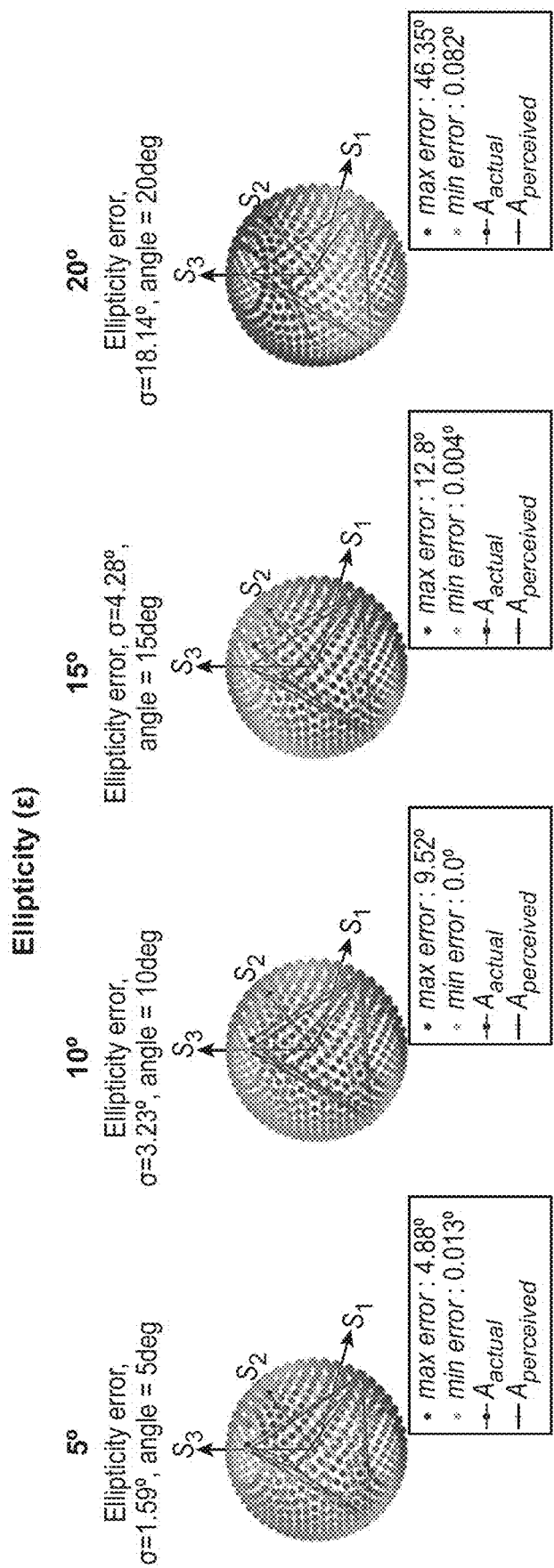

FIG. 32 a-c: Results of angle-dependent polarimetry study. Note that DOP errors are expressed in absolute terms (e.g., not in %).

Figure 33:
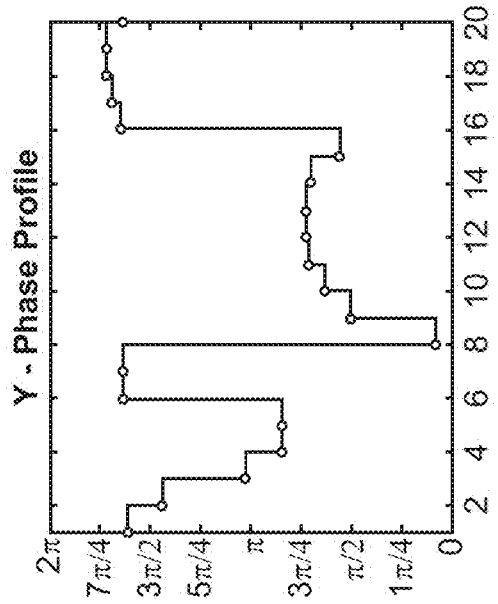
Figure 33:
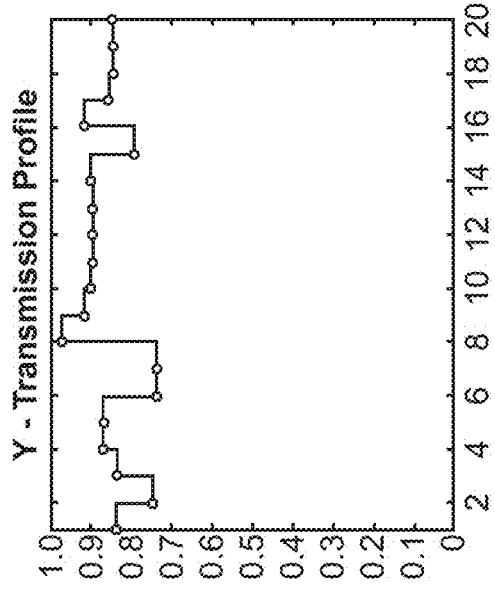
Figure 33:
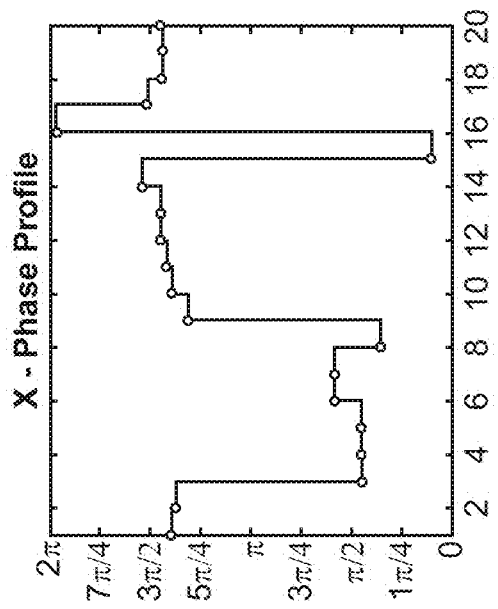
Figure 33:
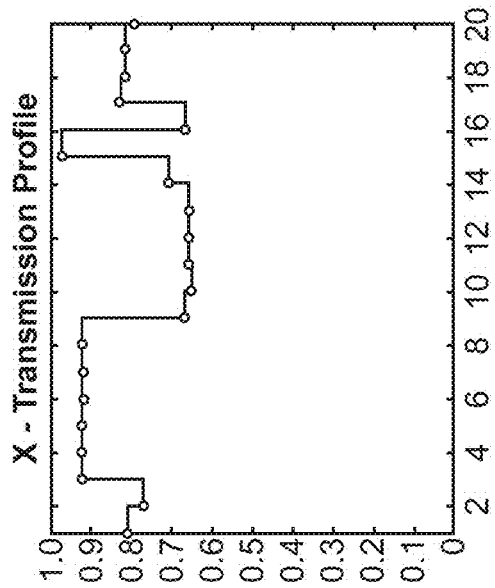

FIG. 33 a-d: A plot of -x and -y (top) and tx and ty (bottom), the amplitude transmission at each position. It can be seen that the library of structures used does not afford sufficient freedom to realize the desired, optimized phases for x- and y-polarizations at each point with highly uniform amplitude transmission.

Figure 34:
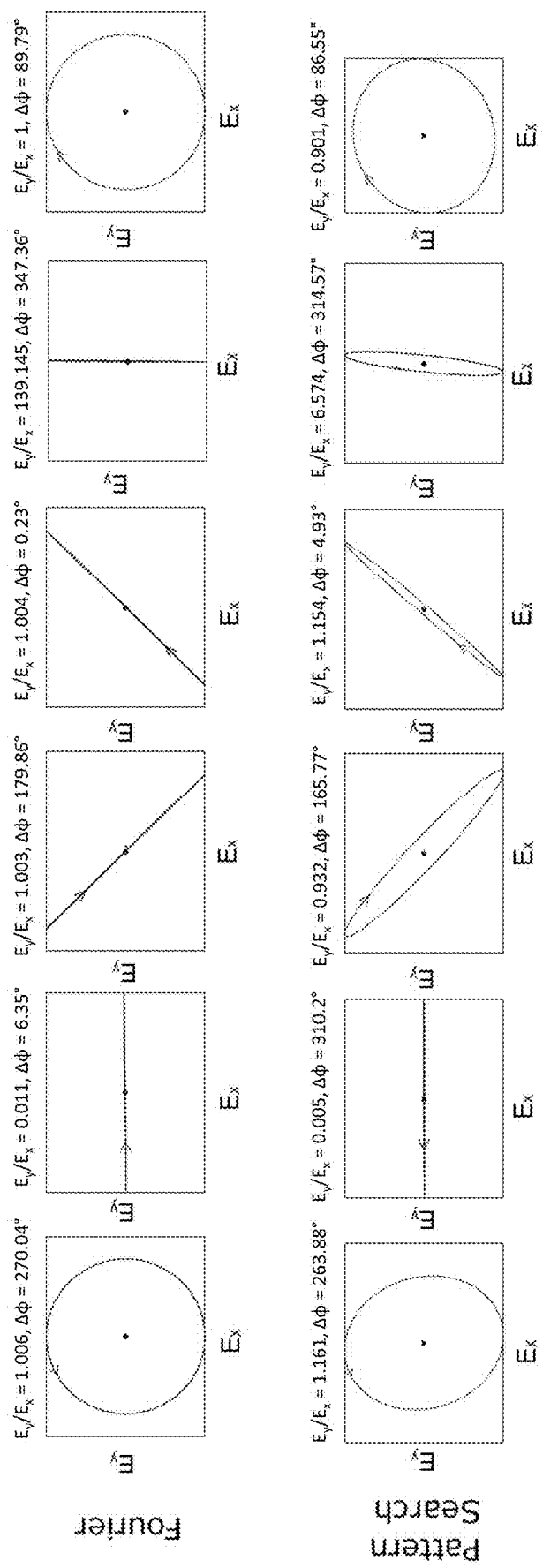

FIG. 34: Design of a grating controlling six diffraction orders' polarization states simultaneously. The aim was to produce LCP, x, 135, 45, y, and RCP light on the innermost six diffraction orders. In the top row, polarization ellipses from the result of a purely mathematical, Fourier transform phase profile optimization are shown. In the bottom row, simulation results of a grating designed using two-step optimization described above (including the pattern search step). The polarization ellipses are notably distorted.

DETAILED DESCRIPTION

Unless otherwise specified, "a" or "an" refers to one or more.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

An optical component is developed, which will also referred to as a metasurface grating, such that when illuminated with an incident light beam with a known polarization, it produces a diffraction beam with a distinct polarization state for each of a finite number (or set) of diffraction orders, which number is at least 2.

The optical component may include a substrate and an array of phase-shifting elements positioned on the substrate in a specific manner. The array may be a one-dimensional array or a two-dimensional array. Each of the phase shifting element may have each of its lateral dimensions, e.g. its dimensions parallel to a surface of the substrate, having subwavelength values, e.g. values no greater or smaller than a wavelength of the incident light. A dimension of the phase shifting perpendicular to the substrate's surface may be at least the same or greater than a wavelength of the incident light. A number of phase-shifting elements in the array may vary. In some embodiments, the number of phase-shifting elements may be from 8 to 100 or from 10 to 60 or from 10 to 40 or any integer number or subrange within these ranges. Preferably, a lateral spacing between individual phase-shifting elements has subwavelength values, e.g. is no greater or smaller than a wavelength of the incident light.

The substrate may be made of a number of materials. In some embodiments, the substrate may be a glass substrate or a quartz substrate.

The substrate may have relatively small lateral dimensions. In some embodiments, each lateral dimension of the substrate may be no more than 2 mm or no more than 1.5 mm or no more than 1 mm or no more than 0.75 mm or no more than 0.5 mm or no more than 0.4 mm or no more than 0.3 mm or no more than 0.2 mm or no more than 0.15 mm or no more than 0.1 mm.

Phase-shifting elements are made of a material, which provides a sufficiently strong contrast with a surrounding medium, such as air, at a particular wavelength, while not absorbing a light at that length. Thus, a selection of a material may depend on a particular wavelength value or range, at which the optical element will be used. The sufficiently strong contrast at a particular wavelength may mean that a material of phase-shifting elements has a refractive index value significantly greater than that of a surrounding medium, such as air. Thus, a material of phase-shifting elements may have a refractive index for a particular wavelength of at least 2.0, or at least 2.1 or at least 2.2 or at least 2.3 or at least 2.4 or at least 2.5 or at least 2.6 or at least 2.7 or at least 2.8 or at least 2.9 or at least 3.0 or at least 3.1 or at least 3.2 or at least 3.3 or at least 3.4 or at least 3.5.

Preferably, a material of phase-sifting elements does not absorb at a wavelength of the incident light.

In some embodiments, the phase-shifting elements may comprise titanium dioxide, silicon nitride, an oxide, a nitride, a sulfide, a pure element, or a combination of two or more of these.

In some embodiments, the phase-shifting elements may comprise metal or non-metal oxides, such as, alumina (e.g. $Al_2O_3$), silica (e.g. $SiO_2$), hafnium oxide (e.g. $HfO_2$), zinc oxide (e.g. ZnO), magnesium oxide (e.g. MgO), titania (e.g. $TiO_2$), metal or non-metal nitrides, such as nitrides of silicon (e.g. $Si_3N_4$), boron (e.g. BN) or tungsten (e.g. WN), metal or non-metal sulfides, pure elements (e.g. Si or Ge, which may be used for longer wavelengths, such near IR or mid-IR wavelengths).

Certain comparative methods of fabricating metasurfaces are described in R. C. Devlin, et al., Proc. Natl. Acad. Sci. 113, 10473 (2016).

The number of diffraction orders may be any preselected number. For example, the number of diffraction orders may be any integer from 2 to 20 or from 2 to 12 or from 2 to 8. Optical component with a smaller number of diffraction orders, such 2, 3, 4, 5 or 6, may have more applications.

The phase shifting elements are configured (e.g., positioned on the substrate) such that when illuminated with an incident polarized light, light intensities for each of the pre-selected diffraction orders (the finite number of diffraction orders) are approximately equal to each other, while light intensities for any other possible diffraction orders are much smaller, preferably at least one or at least orders of magnitude less than light intensities for the preselected diffraction orders, and more preferably below a limit of detection for a detecting element.

In some embodiments, the phase shifting elements are configured to produce four distinct polarization states.

For example, in some embodiments, the phase shifting elements are configured so that when the phase shifting elements are illuminated with a +45° linear polarized (relative to the surface of the substrate) light, the grating produces diffraction beams at −2, −1, +1 and +2 diffraction orders with a +45° linear polarized state, a right circular polarized state, a left circular polarized state and a −45° linear polarized state, respectively.

In some embodiments, the phase-shifting elements are configured to produce at −2, −1, +1 and +2 diffraction orders four polarization states corresponding to vertices of a tetrahedron inscribed in the Poincare sphere when illuminated with an incident light which is +45° linear polarized relative to a surface of the substrate.

In some embodiments, polarization states for different diffraction orders may be linearly independent.

Yet in some embodiments, two or more of polarization states for different diffraction orders may be linearly dependent.

The optical component (metasurface grating) may be used in an optical instrument, which may further comprise one or more detecting elements each configured to detect a diffracted light beam for one of the diffracting orders of the grating. The optical instrument may be a polarimeter.

Due to the finite number of diffraction orders, the optical instrument may include a finite number of detecting elements, which may correspond to the number of the diffraction orders.

In some embodiments, a detecting element used in the optical instrument may be a single wave detector, e.g. a detector configured to measure an intensity of light at a particular single wavelength. In some embodiments, the single wavelength detector may be a detector, which has a linear response to a light intensity at the wavelength of the incident light. The single wave length detector may be a DC detector or an AC detector.

In some embodiments, a detecting element in the optical instrument may be a multi-wavelength detector, e.g. a detector configured to measure an intensity of light in a range of wavelengths. The optical instrument equipped with multi-wavelength detectors may function as a spectroscopic polarimeter.

In some embodiments, a detecting elements used in the optical instrument may be an imaging sensor. The optical instrument equipped with imaging sensors may function as a polarization imaging instrument.

Preferably, the optical instrument does not include any birefingent optical element.

Preferably, the metasurface grating is the only metasurface component of the optical instrument, e.g. the optical instrument does not include any metasurface component other than the metasurface grating.

In some embodiments, the optical instrument may comprise a first polarizer positioned on an optical path of an incident test light towards the optical component. The first polarizer may have an extinction coefficient between 1000 and 200000 or between 5000 and 150000 or between 5000 and 120000 or any value or subrange within these ranges.

In some embodiments, the optical instrument may comprise a second polarizer positioned on an optical path of diffracted beam(s) towards the detecting elements. The second polarizer may have an extinction coefficient between 500 and 200000 or between 1000 and 150000 or between 5000 and 120000 or any value or subrange within these ranges. In certain embodiments, the second polarizer may have a lower extinction coefficient, such as between 500 and 20000 or between 5000 and 12000 or between 600 and 8000 or between 600 and 5000 or between 600 and 4000 or between 600 and 3000 or any value or subrange within these ranges.

In some embodiments, the optical instrument may comprise a lens positioned on an optical path of the diffracted beam(s) towards the detecting element(s). The lens may allow reducing the size of the optical instrument.

The metasurface grating may be used for testing a polarization of a test light with unknown polarization. For example, the metasurface grating may be illuminated with the test light; and then a light intensity of a beam diffracted from the metasurface grating may be measured for each of the finite number of the diffraction orders. In some embodiments, the test light may be a partially polarized or an unpolarized light.

In some embodiments, when the metasurface grating is used in a polarimeter, the grating may be calibrated for a particular incident angle of a calibration incident polarized light. In some embodiments, the metasurface grating may be used in a polarimeter for testing a polarization of a test light with unknown polarization even when an incident angle of the test light slightly differs from the calibration incident angle of the calibration incident polarized light. For example, in some embodiments, the incident angle of the test light may be within ±7° or ±6° or ±5° or ±4° of the calibration incident angle of the calibration incident polarized light.

Embodiments described herein are further illustrated by, though in no way limited to, the following working examples.

Working Examples

Polarization State Generation and Measurement in Parallel With a Single Metasurface The constituent elements of metasurfaces may be designed with explicit polarization-dependence, making metasurfaces a platform for new polarization optics. This disclosure shows that a metasurface grating can be designed producing arbitrarily specified polarization states on a set of defined diffraction orders given that the polarization of the incident beam is known. Also demonstrated is that, when used in a reverse configuration, the same grating may be used as a parallel snapshot polarimeter, including a minimum of bulk polarization optics. This disclosure demonstrates its use in measuring partially polarized light, and shows that it performs favorably in comparison to a commercial polarimeter. The results of this disclosure may be used in a number of applications, which may involve lightweight, compact, and low cost polarization optics, polarimetry, or polarization imaging.

Introduction

Polarization holds a role of importance in countless areas of science and technology, in areas as diverse as atomic physics and fundamental light/matter interaction, to fiber-optic telecommunications and polarization-resolved imaging. The latter has found application in remote sensing, aerosol characterization, non-invasive cancer pathology, and astrophysics. Methods of producing, measuring, and manipulating polarized light, then, are of significant scientific and technological interest. The basic units of polarization optics in free space usually include polarizers and/or phase retarders (waveplates). Various polarizer technologies exist, including wire-grids, dichroic crystals, birefringent crystal prisms, and polarizing sheets. Phase retarders are commonly formed of bulk bi/uniaxial crystals. Their birefringent properties allow for polarization conversion and led to the original discovery of light's polarization. These plates, however, may be difficult to fabricate and/or process and challenging to integrate, especially with minituarized optics.

Figure 1:
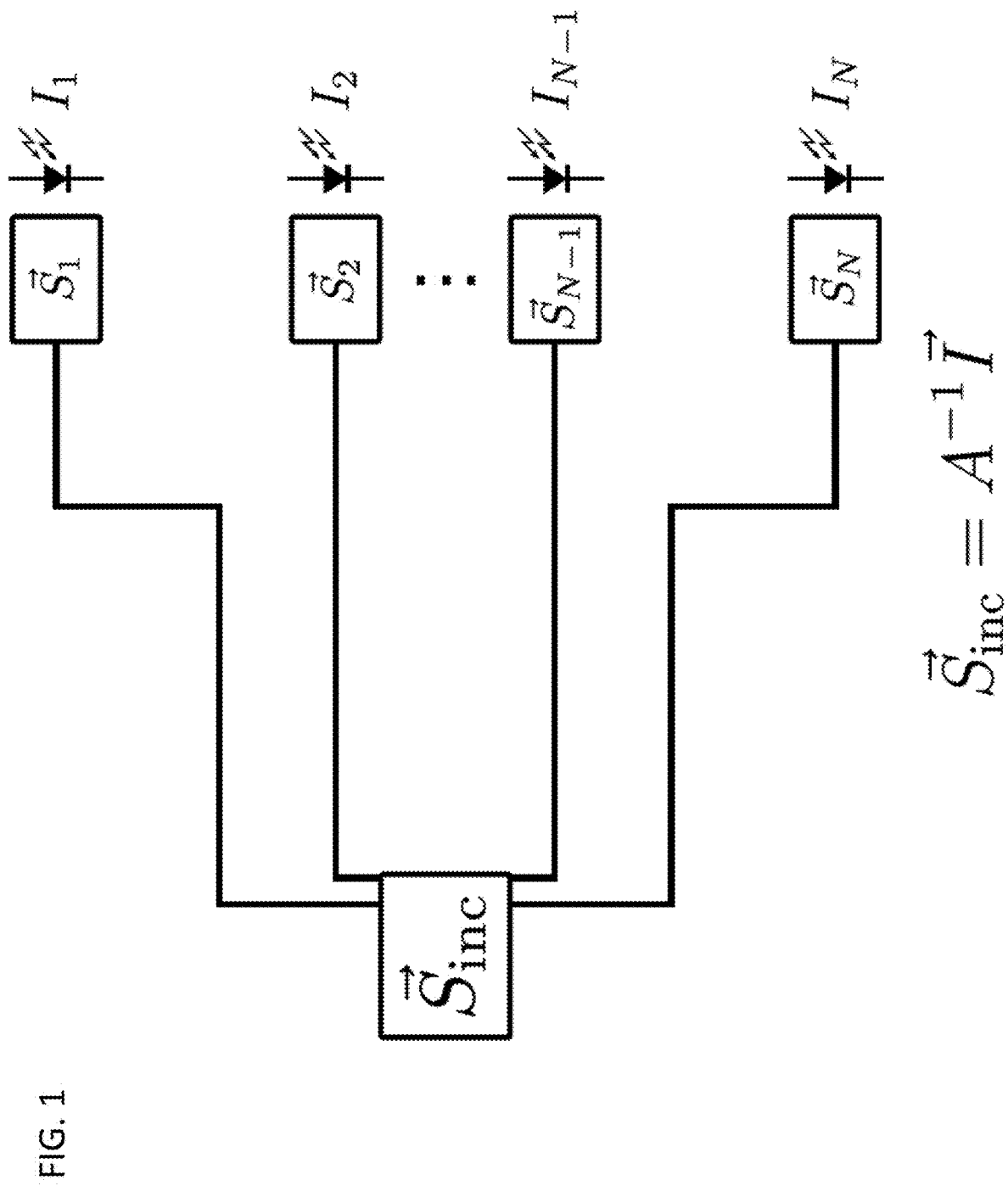
FIG. 1. Polarimetry amounts to several projective measurements of an incident Stokes vector, $$\vec{s}_{inc},$$

The measurement of polarization is usually referred to as polarimetry [12]. Stokes polarimetry in particular refers to the determination of the full, four-component polarization Stokes vector $\vec{S}=[S_0\ S_1\ S_2\ S_3]^T$, which quantifies the shape, orientation, intensity, and degree of polarization of the polarization ellipse. Polarization generation and analysis are conjugate; any configuration of polarization optics serving as a polarization state generator may be an analyzer, if used in reverse. If an unknown Stokes vector $\vec{S}_{inc}$ is incident on an analyzer, a detector would observe, as a consequence of this symmetry, $I_{meas} \propto \vec{S}_{inc} \vec{S}_c$, where $\vec{S}_c$ is the characteristic polarization produced by the analyzer, were it used as a generator. Polarimetry amounts to several such projective measurements of the Stokes vector (FIG. 1). This may be formalized in the matrix equation $$A \vec{S} = \vec{I} \quad (1)$$

A is an N×4 matrix known as the instrument matrix, $\vec{S}_{inc}$ is an incident Stokes vector, and $\vec{I}$ is a list of N measured intensities. A links the parameters of the Stokes vector with N measured intensities $\vec{I}$ on N analyzer channels. In the special case where N=4 the Stokes vector can be directly written as $\vec{S}_{inc}=A^{-1}\vec{I}$ (in the over-determined case where N>4, one finds a least-squares solution for $\vec{S}_{inc}$) [12].

Several broad categories of Stokes polarimeters exist which vary in how the N desired projective measurements are implemented. In the division-of-time approach, N measurements are taken sequentially in time as a configuration of polarization optics changes. While this reduces the number of necessary components, time resolution is limited by the speed at which the polarization optics may be readjusted. In the case of mechanical rotation, this may represent a severe handicap. Active polarization optics, such as liquid-crystal variable retarders, may ameliorate this issue somewhat, though here too, time resolution is limited to the ms range, at great expense [5]. In the division-of-amplitude (also known as parallel, or snapshot, polarimetry) approach, on the other hand, the wavefront is divided among N parallel channels each of which contains a different analyzer. This may be accomplished, for example, by the use of birefringent (e.g., Wollaston) prisms and beamsplitters [13], or by employing a diffraction grating to split the beam into N orders containing unique polarization optics and a detector [14, 15]. Division-of-amplitude may be desirable because the time-resolution of polarization determination may be limited only by the detection electronics. A major drawback of the division-of-amplitude approach, however, may be the demand for distinct polarization optics on each channel, which increases complexity and bulk.

The basic units of these polarization optics (in free space, at least) may be polarizers and phase retarders (waveplates). Retarders are commonly formed from bulk bi/uniaxial crystals whose birefringent properties allow for polarization conversion; these led to the original discovery of light's polarization. These plates are, however, difficult to fabricate and process and challenging to integrate [2, 16].

Meanwhile, metasurfaces[17]—which may be defined as subwavelength-spaced arrays of nanophotonic phase-shifting elements—have attracted significant interest and may hold promise for miniaturization of a variety of bulk optics. The elements of a metasurface may possess tailored structural birefringence [18, 19].

This disclosure presents a scheme for designing of a metasurface grating that, when light of a known polarization is incident, may produce arbitrarily specified states of polarization in parallel on its diffraction orders (FIG. 2a). This disclosure experimentally characterizes two gratings designed with this scheme. The same grating, by the symmetry described above, may act as a parallel full-Stokes polarimeter requiring no bulk birefringent optics. This disclosure characterizes such a polarimeter and compares its performance to a commercial rotating-waveplate instrument. The results of this disclosure may be used in a number of applications, which may involve lightweight, compact, and low cost polarization optics, polarimetry, or polarization imaging.

Principle of Operation

A subwavelength metasurface element with two perpendicular symmetry axes (e.g., a rectangle, but other conceivable examples are encompassed) can function as a waveplate-like phase shifter, imparting independent phase shifts $\phi_x$ and $\phi_y$ on x and y polarized light [18, 19]. The values of $\phi_x$ and $\phi_y$ may be arbitrarily adjusted between 0 and a by changing the perpendicular dimensions $w_x$ and $w_y$ (FIG. 2b).

If Q such birefringent phase shifters are arranged with subwavelength spacing in a 1D periodic grating unit cell (FIG. 2c), the phase shift experienced by x polarized light at the $q^{th}$ position in the unit cell can be denoted by $\phi_x^{(q)}$. That is, approximation of the phase shift acquired by the wavefront at each position in the unit cell can be made as constant. This discrete phase function $\Phi_x(\tilde{x})$ experienced by x polarized light, as a function of the spatial coordinate $\tilde{x}$ (not to be confused with x polarized light), can be written as a vector, $\vec{\phi}_x = \{\phi_x^{(1)}, \ldots \phi_x^{(Q)}\}$ with $\vec{\phi}_y$ holding an analogous meaning for y polarized light. If the periodic unit cell is tessellated, a metasurface phase grating is formed that implements independent and arbitrary periodic phase profiles for orthogonal x and y polarizations.

Being periodic, the grating's angular spectrum is discrete. Given the phase profiles $\phi_x(\tilde{x})$ and $\phi_y(\tilde{x})$ (which are contained in $\vec{\phi}_x$ and $\vec{\phi}_y$, the Fourier decomposition can be computed of each phase grating onto the $m^{th}$ grating order, given by $$c_x^{(m)} = \langle m | e^{i\phi_x(\tilde{x})} \rangle = \frac{1}{2\pi} \int_0^d e^{i\phi_x(\tilde{x})} e^{i\frac{2\pi m \tilde{x}}{d}} d\tilde{x}$$

$$\text{and } c_y^{(m)} = \langle m | e^{i\phi_y(\tilde{x})} \rangle = \frac{1}{2\pi} \int_0^d e^{i\phi_y(\tilde{x})} e^{i\frac{2\pi m \tilde{x}}{d}} d\tilde{x}$$

where d is the length of the periodic unit cell and $\{c_x^{(m)}\}\{c_y^{(m)}\}$ are the Fourier coefficients of the gratings experienced by x and y polarizations, respectively. Each coefficient is in general complex, so we may write $c_x^{(m)} = |c_x^{(m)}| e^{i\delta_x^{(m)}}$ and $|c_y^{(m)}| e^{i\delta_y^{(m)}}$. Then, one can ascribe to each order a Jones matrix $J^{(m)}$:

$$J(m) = \begin{bmatrix} c_x^{(m)} & 0 \\ 0 & c_y^{(m)} \end{bmatrix} = \begin{bmatrix} |c_x^{(m)}| & 0 \\ 0 & |c_y^{(m)}| \end{bmatrix} \begin{bmatrix} e^{i\delta_x^{(m)}} & 0 \\ 0 & e^{i\delta_y^{(m)}} \end{bmatrix}$$

The polarization properties of order m contained in $J^{(m)}$ may be seen as corresponding to a cascade of two bulk optical elements (FIG. 2d): the first Jones matrix in the product is that of a diattenuator—that is, an imperfect polarizing element selectively attenuating light along the x and y directions, while the second Jones matrix is that of a phase retarder—a waveplate—with retardance $\delta^{(m)} = \delta_x^{(m)} - \delta_y^{(m)}$. Both have their eigenaxes mutually oriented along x and y (FIG. 2d).

If, for instance, a beam linearly polarized at 45° with electric field amplitude $E_0$ is incident on the grating, the electric field on the $m^{th}$ grating order will be:

$$\vec{E}^{(m)} = \frac{E_0}{\sqrt{2}} \begin{bmatrix} c_x^{(m)} \\ c_y^{(m)} \end{bmatrix}$$

In the special case of 45° polarized light, then, the complex grating coefficients $\{c_x^{(m)}\}$ and $\{c_y^{(m)}\}$ directly yield the polarization state of order m. For a general input polarization, the output polarization state on each order can be understood with aid of the Poincare sphere (FIG. 2e, see caption).

Optimization

Given a grating with known $\vec{\phi}_x$ and $\vec{\phi}_y$ an incident beam of known polarization, the polarization state and power on each diffraction order m may be computed with Fourier optics. Conversely, can one deduce the $\vec{\phi}_x$ and $\vec{\phi}_y$ that produce diffraction orders with specified states of polarization, for a given incident polarization? This would allow for the straight-forward engineering of such gratings, embedding in a single metasurface a functionality that would otherwise involve, in the most general case, an ordinary diffraction grating with 2P half- and quarter-crystalline waveplates, where P is the number of diffraction orders to be controlled (FIG. 2f).

Suppose that for each diffraction order in a set {l} desired output polarization states can be specified. These polarizations directly dictate $\{c_x^m\}$ and $\{c_y^m\}$, the Fourier coefficients. The grating could be found by simply inverting the Fourier transform. In the case of incident light polarized at 45°, the holographic mask is given by:

$$\sum_{m \in \{l\}} \left( c_x^{(m)} \begin{bmatrix} 1 \\ 0 \end{bmatrix} + c_y^{(m)} \begin{bmatrix} 0 \\ 1 \end{bmatrix} \right) e^{-i\frac{2\pi m \tilde{x}}{d}}$$

However, Eq. 6, being the sum of many spatial harmonics of the grating, involves both amplitude and phase modulation. In the realm of metasurfaces, this may be undesirable. One may generally hope to obtain a range of phase-shifter geometries with nearly uniform amplitude transmission that yield phase shifts ranging between 0 and $2\pi$ [18]. It is generally difficult—at least, drawing from a finite set of possible geometries of streamlined design—to assemble a library of structures yielding arbitrarily shape-tunable phase shift and transmission simultaneously. In the present case, it is desired that this be achievable for both x and y polarizations, simultaneously and independent of one another. This is, without resorting to a very large range of simulated geometries, untenable.

It is desired, then, a phase-only grating. It can be shown, however, that a phase-only grating may have one or infinitely many diffraction orders, so the exact solution (Eq. 6) is in general not phase-only [21]. Thus, optimization may be necessary in order to concentrate as much diffracted light in the orders of interest, while taking on the desired target polarization states.

More formally, it is desired to design a grating that, when light linearly polarized at 45° is incident, produces desired polarization states on a set of grating orders { $\ell$ }. The target Jones vector on each order $m \in \{\ell\}$ is given as $$\vec{J}^{(m)} = \begin{bmatrix} \cos \chi^{(m)} \\ \sin \chi^{(m)} e^{i\phi^{(m)}} \end{bmatrix}$$

Light will generally be diffracted into all orders, not just those in { $\ell$ }. In order to direct as much of the incident power as possible into these desired orders, it is sought to maximize $$\eta(\vec{\Phi}_x, \vec{\Phi}_y) = \sum_m \sqrt{\left(c_x^{(m)}(\vec{\Phi}_x)\right)^2 + \left(c_y^{(m)}(\vec{\Phi}_y)\right)^2}$$

under the constraints $$\frac{|c_y^{(m)}|}{|c_x^{(m)}|} = \tan \chi^{(m)}$$

and $$\delta_x^{(m)} - \delta_y^{(m)} = \phi^{(m)}$$

The constraints provide for the desired polarization on each order, and the phase profile vectors $\vec{\Phi}_x$ and $\vec{\Phi}_y$ are the quantities to be optimized. If the grating has Q constituent elements, the optimization will involve 2Q parameters. Q and the inter-element separation dictate the grating period d which, along with the operating wavelength $\lambda$, specifies the angular separation of the grating orders. Once optimized $\vec{\Phi}_x$ and $\vec{\Phi}_y$ are obtained, the power in the desired orders and correspondence with the target polarization can be mathematically evaluated (cf. Eqns. 8, 9, and 10).

A gradient descent optimization is performed of $\eta(\vec{\Phi}_x, \vec{\Phi}_y)$ under the above constraints, with randomly generated initial conditions (FIG. 3a). This may be a purely mathematical exercise and is independent of any particular material implementation or wavelength. Once optimized $\{\vec{\Phi}_x, \vec{\Phi}_y\}$ are found, appropriate phase shifting geometries in the material of interest may be deduced.

For reasons pertaining to the choice of material implementation (detailed herein), a second step may be added to the optimization in which the results from gradient descent are improved by use of a gradient-free method that explicitly uses the simulated properties of the $TiO_2$ pillar phase shifters used in this disclosure at a wavelength of $\lambda=532$ nm (FIG. 3a).

Polarization State Generation

Using this two-step optimization strategy two gratings were designed for operation at $\lambda=532$ nm, chosen owing to the scientific and technological ubiquity of the visible range. For each element in the optimized $\vec{\Phi}_x$ and $\vec{\Phi}_y$, a rectangular $TiO_2$ pillar, 600 nm in height whose dimensions best impart the desired phases on x and y polarized light is selected from a library of simulated structures. The designed gratings are then fabricated on a glass substrate.

A first grating is designed to produce +45° linear, right-circular, left-circular, and -45° linear polarizations on the m=-2, -1, +1, and +2 diffraction orders, respectively, all with equalized intensities, when 45° linear polarized light is incident. These represent a set of polarizations commonly encountered in optics experiments and are thus of general interest. This is referred to as the "four polarization" grating. A second grating is designed to produce four polarization states corresponding to the vertices of a tetrahedron inscribed in the Poincare sphere on the same orders with equalized intensities for the same incident polarization. This set of polarizations is of significance in polarimetry (discussed below) [23, 24]. This is referred to as the "tetrahedron grating".

Both gratings contained Q=20 individual elements, so each involved the optimization of 2Q=40 parameters. This Q was found, heuristically, to produce results that achieve both high efficiency $\eta$ and good correspondence with the desired polarization ellipses—both mathematically and from FDTD simulation—while minimizing the number of optimization parameters. However, larger or smaller number of elements may be also used.

Figure 3C:
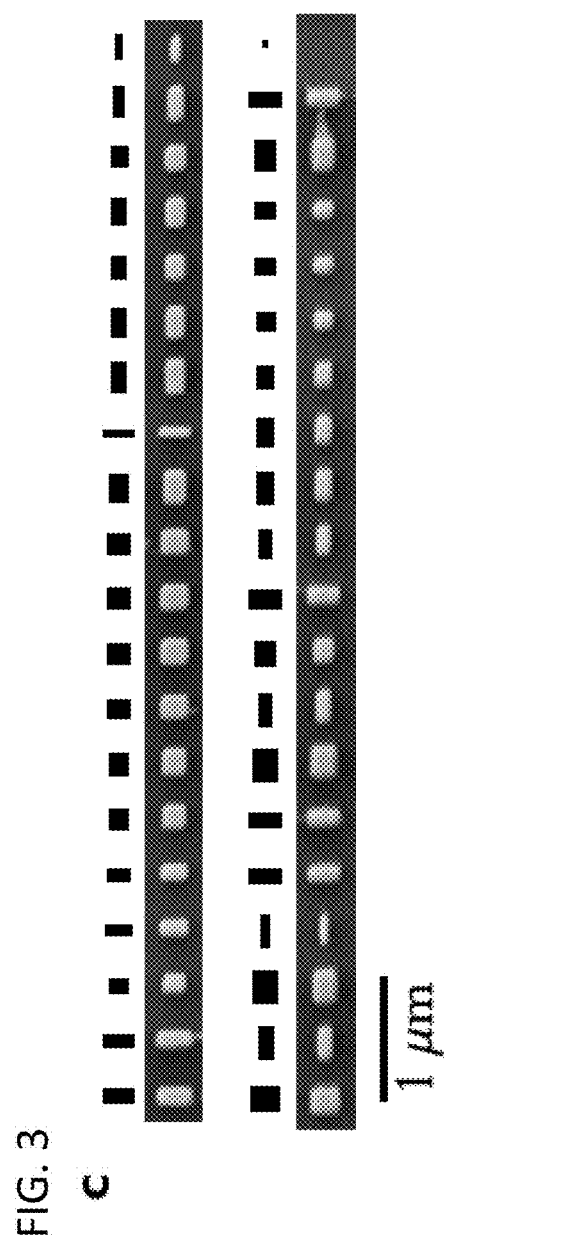

The unit cell geometries implementing the optimized phase profiles for each grating are shown in FIG. 3c alongside corresponding electron micrographs. Each unit cell was tessellated into bulk metasurface gratings each 250×250 μm in size.

Each grating was illuminated with laser light at $\lambda=532$ nm linearly polarized at 45° relative to the axes of the grating. The polarization state of the light on each of the diffraction orders of interest was then measured with a commercial rotating waveplate polarimeter (further details about this measurement are deferred to the supplement).

In FIG. 3b, for each grating, the measured polarization ellipses on each order are plotted alongside the desired target ellipses as well as the ellipses predicted by an FDTD simulation of the grating geometry. A qualitatively close correspondence between the desired target, simulated, and observed polarization states was observed.

Metasurface Polarimetry

Figure 3D:
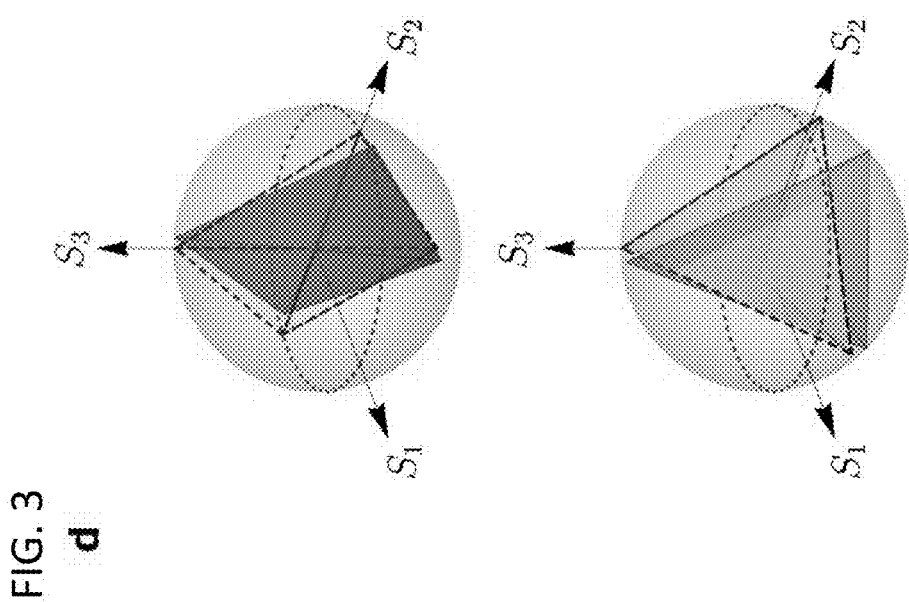

Each order of the metasurface polarization grating may be thought of as a diattenuator in series with a phase retarder, each oriented along x/y (Eqn. 4 and FIG. 3d). When light from a source passes through a polarizer oriented at 45°, a polarization state is produced on the grating order, ideally close to some target state (FIG. 4a, top). When the grating is used in reverse—that is, with the grating followed by a linear polarizer oriented at 45°—each diffraction order may be seen as a polarization state analyzer for its characteristic Stokes vector (FIG. 4a, bottom).

The grating may then be used as a parallel full-Stokes polarimeter with no polarization optics (with the exception of a single polarizer, which may be, for example, integrated on top of the grating. In some embodiments, the polarizer may be necessary for Stokes vector determination). This may rely on a suitable choice of analyzer states, which may be arbitrarily specified. In some embodiments, the four polarization grating may be not sufficient for full-Stokes polarimetry as its states in an ideal situation are not linearly independent. In some embodiments, imperfections of the four polarization grating may break this and render it usable, though not ideally, for polarimetry. For a polarimeter making N=4 measurements, it has been extensively documented that, in the absence of calibration errors [24], a configuration of analyzers whose characteristic Stokes vectors correspond to (any) tetrahedron inscribed in the Poincare sphere yields maximum signal-to-noise ratio in Stokes vector determination [23].

Figure 4C:
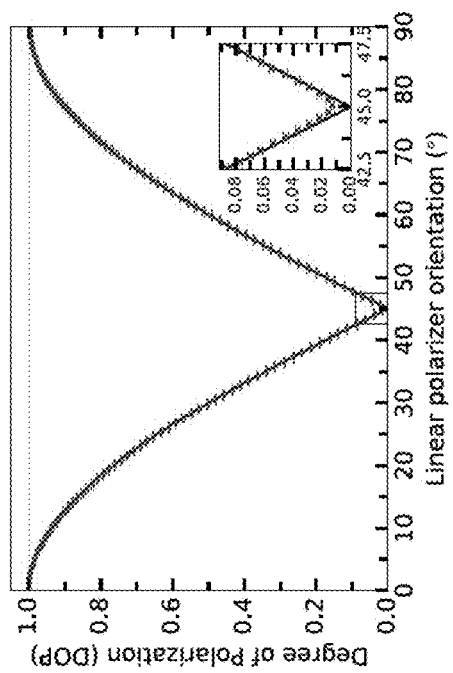

In acknowledgment of this, a larger version (1.5 mm×1.5 mm) of the tetrahedron grating described above was fabricated. When laser light is incident, the four diffraction orders of interest pass through a polarizer oriented at 45° and diverge. Some distance away (cms), each beam impinges on a standard silicon photodiode, producing a photocurrent which is amplified and converted to digital form (FIG. 4c, right side).

The instrument matrix A may be determined by calibration. Accordingly, this disclosure carried out a calibration scheme developed for the four-detector photopolarimeter of Azzam [26], applicable to any polarimeter with four intensity channels (N=4) which explicitly accounts for imperfect quarterwaveplates. The implementation of this calibration is documented in the below disclosure. Each entry of the resultant instrument matrix A may be assigned error bounds which provide for the full covariance matrix of any computed Stokes vector [27], allowing one to place uncertainty bounds on any Stokes vector predicted by the metasurface grating polarimeter.

Quantifying Partially Polarized Light

With the metasurface grating polarimeter calibrated, the Stokes vector of any incident beam may be determined from A and the measured intensities on the photodiodes. An interesting case may be that of partially polarized light. Partially and un-polarized light, inherently a consequence of temporal coherence phenomena [2, 28], are common in all non-laser light sources. The degree to which light is unpolarized is quantified by the degree of polarization (DOP), defined as $$p = \frac{\sqrt{S_1^2 + S_2^2 + S_3^2}}{S_0}$$

where $S_i$ denotes the $i^{th}$ element of the Stokes vector. Fully polarized light corresponds to p=1, totally unpolarized light to p=0; in intermediate cases, p represents the ratio of the beam's power which is polarized to that which is not.

In order to study the response of the metasurface-grating polarimeter to varying DOP, a deterministic means of producing partially polarized light may be involved. This disclosure makes use of a Mach-Zehnder-like setup with two polarization beamsplitters [2, 29]. This is depicted in FIG. 4b, where the boxed components in (i) are included while (ii) is omitted (though (ii)'s presence would theoretically not affect the DOP). As a linear polarizer rotates in front of the interferometer, different fractions of incident light are directed into each arm. When equal parts of the beam travel along each path (when $\theta_{LP}=45°$) and the path-length difference of the interferometer is arranged to be many coherence lengths $L_{coh}$ of the laser source, the recombined beam should be totally unpolarized: The beam will be composed of half x polarized light and half y polarized light which no longer have phase-coherence. On the other hand, when $\theta_{LP}=0°$ or 90°, the beam is completely polarized because all light goes along one path. At intermediate angles, p=|cos$\theta_{LP}$|[29].

A linear polarizer was rotated in front of the interferometer while the Stokes vector reported by the meta-grating was computed. The corresponding DOPs (Eqn. 11) are plotted in FIG. 4e. As shown in the inset, a minimum DOP of 1.2% is observed with an uncertainty of 0.176%.

Comparison With a Commercial Rotating-Waveplate Polarimeter

Finally, this disclosure compares the performance of the metasurfacegrating polarimeter to a commercial and widely used visible-range rotating waveplate polarimeter (ThorLabs model PAX5710VIS-T). In a rotating waveplate polarimeter (RWP), a waveplate mechanically rotates in front of a linear polarizer and a detector; from the Fourier coefficients of the time-varying signal, the incident Stokes vector can be determined [12, 30].

An experiment was carried out using the setup depicted in 4b including boxed components (i) and (ii). A set of randomly selected linear polarizer (LP) and quarterwave-plate angles (QWP) $\theta_{LP}$ and $\theta_{QWP}$ are selected. In an automated measurement, the mounts holding the LP and QWP move to these pre-determined angles and the polarization state produced at each of these configurations is deduced using the meta-grating polarimeter. Next, the commercial rotating waveplate polarimeter (RWP) is placed in the beampath in place of the metasurface-grating polarimeter. The QWP and LP revisit the same positions and the polarizations reported by the RWP are recorded.

The comparison is summarized in FIG. 5 with regards to the quantities of azimuth and ellipticity of the polarization ellipse (plot is made of the double azimuth and ellipticity angles 2θ and 2ε, since these are the angular coordinates on the Poincare sphere) and DOP. The graphs in the top row of FIG. 5 plot the values reported by the metasurface-grating polarimeter along the vertical axis and the values reported by the RWP on the horizontal axis (if the two agreed exactly, all data points would lie along the black 1:1 correspondence line).

For each quantity, the difference in the values reported by the two polarimeters is calculated and plotted in a histogram in the bottom row of FIG. 5. Each is fitted with a normal distribution, whose mean differences (μ) and standard deviations (σ) are shown.

DISCUSSION

Parallel Polarization State Generation

As illustrated in FIG. 3, for both the four polarization and tetrahedron gratings, the polarization ellipses observed experimentally on the diffraction orders compellingly match both the desired target ellipses and those expected from FDTD simulation. A more quantitative view of this comparison is provided herein, and in particular the average deviation in azimuth and ellipticity between target and measurement of 4.37% and 3.57%, respectively, was observed. Additionally, as shown herein, much of this difference may probably be attributed to fabrication imperfections and unpredictability of the exact element dimensions. As the nominal dimensions of the fabricated geometries are adjusted to test this effect, the measured polarization ellipses are observed to change smoothly (supplement). Given even perfect fabrication, the ellipses would not completely match the target states since the optimization will never achieve perfection. From the perspective of polarimetry, at least, an imperfection in the performance of the tetrahedron grating may be accounted for by the calibration (while the condition number of A may increase somewhat). The below disclosure discusses limits of the scheme and suggestions for improvement.

Parallel Polarimetry

Above, a characterization of the metagrating's polarimeter functionality, specifically its ability to measure partially polarized light and its polarimetric performance in comparison with a commercial RWP has been presented. The calibration of the polarimeter may be a somewhat technical issue. The disclosure below discusses several calibration-related issues which could compromise the accuracy of the polarimeter and suggest means for their improvement.

The meta-grating polarimeter can detect partially polarized light produced by a polarization Mach-Zehnder interferometer. The dependence of DOP on linear polarizer angle follows the expected theoretical trend. At 45°, a minimum DOP of 1.2% with an uncertainty of 0.176% was measured. While this ideally ought to be 0%, the DOP aggregates error from all four Stokes components, and the minimum value achievable is in a sense a commentary on the accuracy of the polarimetric system as a whole. As discussed in the below disclosure, there may be several subtleties to the production of partially polarized light with a polarization Mach-Zehnder interferometer, including the DOP varying over the profile of the output beam. The non-zero DOP observed at 45° could be a consequence of errors in the polarimeter, actual deviations of the beam's DOP from zero, or more likely some combination of the two. The result, however, should be taken as a testament to the flexibility of the presented device—a single optical element in a completely parallel measurement can provide information about DOP, a coherence property of the light.

Lastly, the performance of the meta-grating polarimeter to that of a commercial rotating waveplate device was compared. For the quantities of DOP, azimuth, and ellipticity—polarimetric parameters of common interest—the disclosure examined the difference in the values reported by the two polarimeters and treated these as statistical quantities. For DOP, the disclosure observed a standard deviation of $\sigma=1.6\%$ and a mean difference of $\mu=0.6\%$, a systematic error which could easily be attributed to one polarimeter being slightly misaligned. For azimuth $\chi$ and ellipticity $\epsilon$, $\sigma=0.023$ rad=1.32° and $\sigma=0.0075$ rad=0.43°, respectively, were observed. This may implicitly assume that the RWP is an absolute polarization reference; any degree to which this is not true will increase the perceived error of the meta-grating polarimeter. Moreover, the error is itself polarization-dependent (see the below disclosure). By sampling the error more or less uniformly over all possible polarizations, the values of $\sigma$ for each parameter represent worst-case performance. Already, these are in the vicinity of the errors quoted for the RWP used (see the below disclosure). Notably, the performance of the RWP may be matched with a device having no moving parts, no bulk birefringent polarization optics, and detector-limited time resolution.

The below disclosure reports the study of the effect of angle-of-incidence on the polarimeter and concludes that up to about a ±5° accidental misalignment, the polarimeter could still be used with reasonable accuracy.

Technological Perspective

In the present disclosure, polarimetry functionality has been embedded in a single, flat metasurface where the two phase profiles may be applied in the same plane, significantly improving prospects for widescale application. Using just a linear polarizer (which may be, for example, easily integrated on top of the device as a wire grid), a single device may generate/measure polarization in parallel with no bulk birefringent optics, permitting ease of integration. The device may be extended to spectroscopic polarimetry if linear arrays of detectors are used, or to polarization imaging if the detectors are replaced with imaging sensors. This may represent a far simpler solution to integrated full-Stokes polarimeters and polarization cameras which would not involve bulk lithographic patterning of dichroic or birefringent material on top of a focal plane array [5, 48, 49].

BRIEF SUMMARY OF DISCLOSURE SO FAR

The present disclosure provides for a method for designing a metasurface diffraction grating with orders whose polarization states may be arbitrarily specified. Two such gratings were designed and fabricated with the polarization states of the diffraction orders being characterized, finding close correspondence with desired target polarization states. The grating, by symmetry, may also function as a parallel analyzer of polarization, and may permit for snapshot full-Stokes polarimetry. The grating's ability to measure partially polarized light was demonstrated. Additionally, the grating's performance was compared to a commercial RWP. A statistical analysis shows that the grating's accuracy is comparable to the one of the commercial RWP. The metasurface-based polarimeter does not necessarily involve either moving parts or bulk birefringent optics, which may facilitates its integrability, and thus may present a significant simplification in polarimetric technology. The use of the grating may be extended to polarization imaging if detector arrays are used instead. Being a grating, the chromatic dispersion of the orders may also be harnessed for use in spectroscopic polarimetry.

Parallel Polarization State Production

Optimization Procedure

A sketch of the optimization procedure is given in the present disclosure, which is resummarized here. Inputs include:
a set of $\{\ell\}$ diffraction orders of length P whose polarization states are to be controlled by the metasurface;
for each of the P orders, a Jones vector $\vec{j}^{(m)}$ specifying the desired polarization on order $m\{\ell\}$. The Jones vector $\vec{j}^{(m)}$ is parameterized by the quantities $\chi^{(m)}$ and $\phi^{(m)}$ as $$\vec{j}^{(m)} = \begin{bmatrix} \cos \chi^{(m)} \\ \sin \chi^{(m)} e^{i\phi^{(m)}} \end{bmatrix};$$

the relative intensities of the beams on each diffraction order;
the Jones vector of the incident polarization, $\vec{E}_0$; and
the number of phase-shifting elements Q to be included in the grating.

Gradient Descent Optimization

The relative magnitudes and desired polarization states form a set of constraints on the Fourier coefficients of the ultimate phase-grating.

Both x- and y- polarized light experience independent phase gratings. These grating coefficients are a function of the phase profiles $\phi_x(\tilde{x})$ and $\phi_y(\tilde{x})$ of the gratings, as a function of the spatial coordinate $\tilde{x}$:

$$c_x^{(m)}(\phi(\tilde{x})) = \langle m | e^{i\phi_x(\tilde{x})} \rangle = \frac{1}{2\pi} \int_0^d e^{i\phi_x(\tilde{x})} e^{i\frac{2\pi m \tilde{x}}{d}} d\tilde{x} \quad (1)$$

and $$c_y^{(m)}(\phi(\tilde{x})) = \langle m | e^{i\phi_y(\tilde{x})} \rangle = \frac{1}{2\pi} \int_0^d e^{i\phi_y(\tilde{x})} e^{i\frac{2\pi m \tilde{x}}{d}} d\tilde{x} \quad (2)$$

The polarization and energy in each diffraction order is dictated by the functionals $c_x$ and $c_y^m$—the goal is to direct as much energy as possible into the diffraction orders of interest, e.g. the set $\{\ell\}$. As such, optimization is made of the quantity $$\eta(\vec{\Phi}_x, \vec{\Phi}_y) = \Sigma_{m \in \{\ell\}} \sqrt{(c_x^{(m)}(\vec{\Phi}_x))^2 + (c_y^{(m)}(\vec{\Phi}_y))^2} \quad (3)$$

under the constraints $$\frac{|c_y^{(m)}|}{|c_x^{(m)}|} = \tan \chi^{(m)} \quad (4)$$

and $$\delta_x^{(m)} - \delta_y^{(m)} = \phi^{(m)} \quad (5)$$

This is best illustrated with an example from the present disclosure, a grating that produces −45° linear, right-hand circular, left-hand circular, and 45° linear polarizations on the m=−2, −1, +1, +2 diffraction orders, respectively. The design of certain gratings in the present disclosure sought to distribute power equally among the four orders of interest as well.

Certain designs in the present disclosure divided the grating coefficients $c_x^m$ and $c_y^m$ into real and imaginary parts as $c_x^{(m)}=|c_x^{(m)}|e^{i\delta_x^{(m)}}$ and $c_y^m=|c_y^{(m)}|e^{i\delta_y^{(m)}}$ The constraints are, assuming that the incident light has a polarization of $$\frac{1}{\sqrt{2}}\begin{bmatrix}1\\1\end{bmatrix};$$

$$|c_x^{(-2)}|=|c_y^{(-2)}|$$

$$\delta_y^{(-2)}-\delta_x^{(-2)}=\pi$$

$$|c_x^{(-1)}|=|c_y^{(-1)}|$$

$$\delta_y^{(-1)}-\delta_x^{(-1)}=\frac{\pi}{2}$$

$$|c_x^{(+1)}|=|c_y^{(+1)}|$$

$$\delta_y^{(+1)}-\delta_x^{(+1)}=-\frac{\pi}{2}$$

$$|c_x^{(+2)}|=|c_y^{(+2)}|$$

$$\delta_y^{(+2)}-\delta_x^{(+2)}=0$$

$$\sqrt{(c_x^{(-2)})^2+(c_y^{(-2)})^2}=\sqrt{(c_x^{(-1)})^2+(c_y^{(-1)})^2}=\sqrt{(c_x^{(+1)})^2+(c_y^{(+1)})^2}=\sqrt{(c_x^{(+2)})^2+(c_y^{(+2)})^2}$$

Note that the final constraint asserts that optical power should be equally distributed among the different diffraction orders (since the incident polarization is linearly polarized at 45°, the weights on the $c_x$ and $c_y$ are equal).

The power in the orders of interest (Eq. 3) can then be optimized using gradient descent, under these constraints using standard numerical packages.

The results of this gradient descent optimization are given in FIGS. 6 and 7. In FIG. 6, it can be seen that the theoretical efficiency of the phase grating 11 reaches a peak value of 73.1%.

Mathematical Analysis of Polarization Ellipses Produced by Optimized Phase Grating From the optimization procedure above, optimized x- and y-polarization phase gratings producing the desired polarization states on the diffraction orders were obtained.

These phase profiles can be passed through a Fourier transform and the resultant polarization ellipses can be examined; the result is shown in FIG. 8.

Unsurprisingly, the polarization ellipses derived mathematically from the optimized phase profiles match what is desired perfectly. This could have been gathered from FIG. 7, since the constraints are matched nearly perfectly.

Material Implementation

With the optimized phase profiles $\phi_x(\tilde{x})$ and $\phi_y(\tilde{x})$ so obtained, a structure implementing the correct phase on each of x- and y- polarized light at each grating position may be designed.

This has been discussed, for example, in [1 and 2, for this and other references see section Literature below]. The approach is also briefly summarized here.

A wide range of rectangular pillar structures of varying perpendicular transverse dimensions $w_x$ and $w_y$ are simulated assuming plane wave illumination and periodic boundary conditions using the Finite Difference Time Domain method (FDTD). Using far-field projection, the transmission amplitude for each polarization ($t_x$ and $t_y$) and the eigen-phase shifts on each polarization ($\phi_x$ and $\phi_y$) are determined. That is, knowledge of $w_x$ and $w_y$ specifies the phase-shifting and transmission properties of the element through simulation.

Here the interest is in the opposite problem wherein one wishes to know the $w_x/w_y$ best implementing a specified $\phi_x$ and $\phi_y$. The best element can be located by finding the element with the amplitude transmission (as close as possible to 1) while minimizing the deviation of the implemented phase from the desired one. For a more complete description of this, see the supplement to [50].

This allows one to straightforwardly transform an optimized set of grating phase profiles $\vec{\Phi}_x$ and $\vec{\Phi}_y$ into a real geometry to be fabricated in a material of interest (in the present case, $TiO_2$).

FDTD Simulation of Designed Gratings

The periodicity defining a grating may be fortunate from a simulation point of view, and the optimized gratings comprising of 20 elements naturally lend themselves to simulation. Thus, the optimized gratings may be directly simulated and the polarization ellipses examined.

This was performed using plane wave illumination and periodic boundary conditions, using the geometry shown in FIG. 9.

In FIG. 10, polarization ellipses expected from simulation are shown for the four-polarization grating.

Discrepancy Between Simulation And Target

As stated above, the phase profiles $\varphi_x(\tilde{x})$ and $\varphi_y(\tilde{x})$ are optimized and found under the assumption that at each point along the grating, amplitude transmission is uniform. In the selection of elements to implement these phase profiles, a best attempt is made to find an element implementing the requisite $\varphi_x$ and $\varphi_y$ at each position with amplitude transmission as close as possible to unity.

Using FDTD simulation, a library of phase-shifting structures can be assembled in which phase-shifting geometries (e.g., $w_x$ and $w_y$) are associated with phase shifts and amplitude transmissions. The extent to which it is possible to realize any desired set of phases $\{\varphi_x, \varphi_y\}$ with nearly unity transmission depends on the diversity of structures available in a desired material implementation. Once desired phase profiles are converted into such a "best fit" grating geometry, the phase shifts and amplitude transmissions of the structured chosen from the library can be assessed.

This is shown in FIG. 33. It can be seen that at some points along the x- and y-polarization phase gratings, the transmission dips as low as 70%, while at other positions it is indeed near unity. The assumption by the optimization algorithm of unity transmission, then, is broken at the time its results are converted into a real grating design.

Certain non-uniformity in amplitude transmission can easily be incorporated into the Fourier transform and computation of the merit function Eq. 3.

Every set of phase profiles during at any step during the optimization process has an associated "best fit" geometry. Our original solution to this issue, then, was to include an examination of the transmission and phase profiles of this "best fit" grating geometry as part of the optimization process and merit-figure computation. The optimization, however, would often not converge. Instead, a purely mathematical procedure based on gradient descent is used to obtain $\varphi_x(\tilde{x})$ and $\varphi_y(\tilde{x})$, regardless of any particular material implementation. Then, this result is used as the initial condition for a gradient-free scheme (namely, pattern search) that improves this result taking limitations of our library of structures explicitly into account by computing the "best fit" grating geometry at each step of the optimization process.

Generally, the more diffraction orders one wishes to control, the less successful the optimization will be, and there are certain situations in which the optimization could become over-constrained.

In some embodiments of this disclosure, focus is made on gratings in which four diffraction orders possess tailored and controlled polarization states. This is because the Stokes vector itself possesses four elements, so analysis on four of these diffraction orders is sufficient for the construction of a full-Stokes polarimeter. However, as an illustration of the limits of the optimization scheme, it should be noted that a grating controlling six diffraction orders was designed. In particular, it is sought to create a metasurface polarization grating in which the inner six diffraction orders would contain the cardinal directions on the Poincaré sphere—that is, RCP, LCP, 45°, 135°, x, and y.

The results are shown in FIG. 34. First, optimized phase profiles $\varphi_x(\tilde{x})$ and $\varphi_y(\tilde{x})$ are found using gradient descent alone, without reference to any properties of actual phase-shifting structures. Mathematically, then, it is possible to find phase profiles producing the desired polarization ellipses for this case.

However, when the optimization is carried out in two steps (as described above, using pattern search and actual phase-shifter properties) and the resultant grating is simulated, the ellipses are not generally produced without significant distortion. This is shown in the bottom of FIG. 34. By expanding the library of available structures and improvement of the optimization scheme, it may be possible to expand to the control of many more diffraction orders.

Fabrication of Structures

The gratings themselves are fabricated using a titanium dioxide process developed for visible frequency metasurfaces. It is very briefly summarized here.

A positive electron beam resist is spun on a glass substrate and the grating pattern is exposed using electron beam lithography. The resist is developed and an amorphous TiO2 film is deposited in the voids using atomic layer deposition (ALD). Excess $TiO_2$ is etched back using reactive ion etching, and finally the electron beam resist is removed using a solvent, yielding free-standing TiO2 pillars.

The conformality of the ALD process as well as the use of the resist as a template for the pattern yields high aspect ratio structures with near-vertical sidewalls.

Measurement of Polarization Ellipses

The fabricated gratings are mounted on a translation mount and illuminated with a beam of green laser light linearly polarized at 45° with respect to the Cartesian axes of the grating and pillar elements. The light disperses into a multitude of grating orders, each of which can be characterized with a commercial polarimeter (the same polarimeter that is used for comparison in the disclosure).

It is particularly important that the incident light is polarized at 45° relative to the x/y coordinate system of the grating, because the entire design procedure is predicated on the incident light having this polarization. A misalignment of this linear polarization, then, would yield undue experimental error. A two step procedure is undertaken to mutually align the grating and incident polarization:

Alignment of the linear polarizer to the optical table: A Glan-Thompson linear polarizer was used to linearly polarize the laser light. The plane of the optical table was used as a reference coordinate system for the experiment. Using the same commercial rotating waveplate polarimeter employed in the experiments, which presumably is itself well-calibrated with respect to the table on which it is mounted, the linear polarizer was turned until the polarimeter revealed that the light is polarized at 45°.

Alignment of the grating to the optical table: The axes of the grating should themselves be aligned to the plane of the optical table. The plane of the grating orders which fan out in space provide a reference to the orientation of the metasurface grating. The grating is placed in a freely rotating mount and an iris is used to assure that all grating orders are at a consistent height above the table.

Effect of Fabrication Imperfections on Produced Polarization Ellipses

Electron beam lithography comes with its own inherent complications which cause size discrepancies between desired structures (as in a CAD layout file) and what is actually realized. Generally, the fabricated structures are larger than intended. The phase imparted by the structures in this disclosure is size-dependent, so one would expect fabrication imperfections to have a notable effect on the polarization ellipses observed on the diffraction orders, relative to design.

In view of this effect, for each grating design, several samples were fabricated with either fixed size offsets in the CAD (10, 20, or 30 nm smaller than desired) or fixed size scaling factors (all dimensions scaled by 85, 75, or 70%). The polarization states on the diffraction orders from all such gratings were recorded.

The polarization ellipses recorded from the gratings with different size offsets and scalings are shown in FIGS. 11 and 12, for the four-polarization and tetrahedron gratings, respectively.

It can be seen that varying the nominal size of the fabricated structures has a significant effect on the observed polarization ellipses, which is to be expected. The data presented in the text came from samples with −20 nm offset for the four-polarization grating and −30 nm size offset for the tetrahedron grating; these samples produced ellipses closest to the target polarizations.

Extended Results

Power on Diffraction Orders

Tabulated Data on Measured Polarization Ellipses

| Tetrahedron Grating | | | | |
|---|---|---|---|---|
| Quantity | Designed | FDTD | Measured | % Difference |
| m = −2 order | | | | |
| Azimuth angle θ | 0 | −0.0092 | −0.0995 | 3.17 |
| Ellipticity angle ε | 0.1699 | 0.2049 | 0.3066 | 2.23 |
| m = −1 order | | | | |
| Azimuth angle θ | 1.0472 | 1.0399 | 0.8789 | 5.36 |
| Ellipticity angle ε | 0.1699 | 0.2168 | 0.3191 | 9.50 |
| m = +1 order | | | | |
| Azimuth angle θ | −1.0472 | −1.2464 | −1.3687 | 10.23 |
| Ellipticity angle ε | 0.1699 | 0.1089 | 0.2165 | 2.97 |
| m = +2 order | | | | |
| Azimuth angle θ | undefined | 0.3589 | −0.0218 | N/A |
| Ellipticity angle ε | −0.7854 | −0.7568 | −0.7244 | 3.88 |
| Four Polarization Grating | | | | |
| Quantity | Designed | FDTD | Measured | % Difference |
| m = −2 order | | | | |
| Azimuth angle θ | −0.7854 | −0.7867 | −0.8840 | 3.14 |
| Ellipticity angle ε | 0 | −0.0026 | −0.0299 | 1.90 |
| m = −1 order | | | | |
| Azimuth angle θ | undefined | −0.2638 | 1.4019 | N/A |
| Ellipticity angle ε | 0.7854 | 0.7212 | 0.7462 | 2.50 |
| m = +1 order | | | | |
| Azimuth angle θ | undefined | 1.4905 | −0.0428 | N/A |
| Ellipticity angle ε | −0.7854 | −0.7432 | −0.7249 | 3.85 |
| m = +2 order | | | | |
| Azimuth angle θ | 0.7854 | 0.7912 | 0.7282 | 1.82 |
| Ellipticity angle ε | 0 | −0.0297 | −0.0274 | 1.74 |

Metasurface Polarimetry

This section discusses the use of a metasurface polarization grating as a full-Stokes polarimeter, that is, as a sensor allowing the detection of incident polarization state based on the intensities measured on each of the four channels. These channels are the beams diffracted into the m=−2, −1, +1, and +2 diffraction orders, after passing through a linear polarizer oriented at 45°.

Details of Optical Setup

Of particular importance in polarimetry is the quality of polarization optics used in calibration. After all, uncertainty about the polarizations used for calibration degrades the ultimate accuracy of any calibrated polarimeter. Of course, absolute polarization references are few-and-far-between [53]. Perhaps the absolute polarization state references that exist are those of atomic transitions, constrained by quantum mechanical selection rules to take on a certain polarization state. Thus, in the field of polarimetry, polarimeters are often assessed by comparison with pre-established polarimeters. Nevertheless, some certainty about the polarization optics used was established.

Polarizers

Film-based polarizers may be the least expensive options and lend themselves to mass production. For example, for a commercially available film polarizer from the vendor ThorLabs (part no. LPVISE100-A), the part specifications claim an intensity extinction ratio of approximately 8000. Given this, it was initially thought that these would be sufficient for this project's specifications. However, upon testing, it was found that the intensity extinction ratio of these film polarizers is often well below 1000, sometimes on the order of hundreds. For polarimetry, especially the presently considered metasurface-based polarimeter, this may be a significant problem. The fundamental quantity is the electric field, which goes as the square root of the intensity. If the intensity extinction ratio is on the order of hundreds, the electric field extinction ratio is on the order of tens. This may be unacceptable.

Whereas film polarizers rely on inherent material dichroism, a second polarizer technology relies on birefringent crystalline materials. For example, Glan-Thompson (and Glan-Taylor) polarizers sandwich two birefringent crystals together in a beamsplitter-like configuration. The two are cut so that one linear polarization transmits through relatively unattenuated, while the other totally internally reflects. Since the polarizing mechanism here uses total internal reflection rather than some property subject to an artificial medium, the extinction ratios may be much higher. For instance, the primary polarizer used in all the polarimetry and polarization state measurements (ThorLabs part no. GTH5M-A) has a specified intensity extinction ratio of 100000. While the extinction ratio of the present unit was below this, it performed significantly better than a comparable film polarizer.

In any measurement in the text in which a linear polarizer is rotated, as well as in all the measurements testing the polarization-state generation capabilities of the metasurface, the above-mentioned Glan-Thompson polarizer was used.

Quarter-Wave Plates

In optics texts, quarter-(and half-)wave plates are usually presented as mathematical objects, possessing the special property of exactly $$\frac{\pi}{2} \text{ (or } \pi\text{)}$$

retardance. A subtlety often overlooked by many practitioners of optics is that this is seldom the case. Waveplate manufacturing involves the grinding of bulk birefringent crystal with wavelength-scale precision.

Broadly, waveplates may be classified as either zero-order or multi-order. When the crystal is manufactured in a waveplate cut [54], one of the crystalline axes is aligned with the intended propagation axis of the waveplate. Then, in plane, orthogonal axes experience a refractive index difference of $\Delta n$ due to the crystal's birefringence. In a zero-order waveplate, the thickness of the crystal is given by $$t = \frac{\delta\lambda}{2\pi\Delta n},$$

where δ is the desired retardance and λ is the design wavelength. That is, the thickness may be the minimum that still imparts the correct phase retardation on the wavefront. In a multi-order waveplate, on the other hand, the thickness of the crystal is given by $$t = \frac{(2\pi N + \delta)\lambda}{2\pi \Delta n}$$

where N is the "order" of the waveplate.

Higher order waveplates tend to be less accurate, and of course have a higher dispersion of the retardance δ with wavelength. Some of the inaccuracy in zero-order waveplates can be appreciated by examining the means by which they are fabricated—in many cases, the grinding of a crystal waveplate should be stopped and started periodically so that the retardance can be monitored by a polarimetric instrument [54].

Consequently, multi-order quarter-wave plates commonly deviate by ten degrees or more from the desired retardance. This is exacerbated for waveplates that attempt to operate over a broadband. Even zero-order waveplates deviate by up to 3°-4° from the desired retardance, in our experience.

Precise knowledge of the properties of the polarization optic being used may be desired in particular during calibration. In the present case, a technique allowing for imperfections of the quarter-waveplate was employed, so long as the deviation from 90° retardance is small [55]. Zero-order waveplates designed for the wavelength of interest (λ=532 nm) fit this criterion, and as such, a zero-order waveplate from ThorLabs (part no. WPQ10M-532) was used. Any measurement that involves turning a quarter-waveplate, in particular the calibration and comparison to the RWP in the present disclosure, are made using this waveplate.

Other Polarization Optics

The most crucial polarization optics may be the main linear polarizer and quarter-waveplate used during calibration.

Several other polarization optics were also involved in present setup. The first is a quarter-waveplate immediately after the laser output. The laser source has a preferential linear polarization, so a waveplate was inserted in order to (roughly) circularize the source polarization. This way, as the linear polarizer is varied, power variations are minimized. As this circularization need not be exact by any means, most any quarter-waveplate can be used. ThorLabs part no. AQWP05M-600 was readily on hand, an achromatic waveplate in the visible region, whose retardance is estimated by crude means to be approximately 75° at λ=532 nm.

Finally, a polarizer was used behind the metasurface grating. This polarizer was oriented at 45° relative to the metasurface grating (though, in reality, this angle could be wrong and its effect of a potential error can be calibrated away). The integrity of this polarizer is not nearly as important as that of the polarizer used for calibration. In some embodiments, it may be necessary to have a polarizer-like element, as discussed below, for the functioning of the grating as a polarimeter. However, if an extinction ratio for such polarizer-like element is not so high, it may still be used because if the same polarizer is placed behind the metasurface during both calibration and the actual measurement, the polarizer's effect may be compensated.

Therefore, a sheet polarizer, ThorLabs part no. LPVISE100-A was used for that purpose. The grating orders diverge in angle sufficiently fast that using a thick Glan-Thompson polarizer without first collimating the diffraction orders using a lens would present a technical challenge. Therefore, the film polarizer is ideal because all four orders may pass through its 1" clear aperture. Of course, each passes through at a non-normal angle, but since these angles are constant, that effect, too, may be absorbed into the calibration.

Detection Electronics

It may be preferred to use a detector or sensor, which is linear in intensity at a design wavelength, such as λ=532 nm in the actual experiments. Moreover, if no fast polarization modulations are involved, it may be sufficient to monitor the intensity in DC. For example, in the present disclosure, a silicon photodiode, with an optional amplification scheme could be sufficient. In some embodiments, it may be preferred to use a detector with a larger detection area, such as greater than 1 mm² or greater than 2 mm² or greater than 5 mm 2 or greater than 7 mm² or greater than 10 mm². The use of a detector with a larger detection area may, for example, simply the alignment of optical elements.

In particular, this disclosure used Hamamatsu part no. S1223-01, a silicon photodiode with an active area of 3.6 mm×3.6 mm—the large area eases alignment constraints.

Photocurrent from each of the four photodiodes was amplified using a standard transimpedance amplifier. The amplified value is read by a 14-bit analog-to-digital converter (ADC) from National Instruments, transmitted serially over USB, and then recorded on a PC. Given the slow time scale of the measurements (DC, essentially) no particular detail of this configuration is crucial.

Beam Re-Sizing Optics

Though not depicted or mentioned in the present disclosure, two conventional lenses, with focal lengths of roughly 50 and 25 mm, to shrink the beam-waist before illuminating the metasurface. Of course, with electron-beam lithography, there are constraints on the size of a metasurface that can ultimately be fabricated. Since the grating used for polarimetry is 1.5 mm×1.5 mm, the beam was shrunk so that its entire extent may reside inside of the fabricated metasurface. Preferably, even if the beam moves around as polarization optics are rotated, it will remain inside of the metasurface.

The beam re-sizing lenses were deliberately placed before the polarization optics that modify the polarization of the beam. Lenses may have some inherent, polarization-modifying stress-birefringence. Placing them before the final polarization optics may allow neglecting this, if it does exist.

The Polarizer Following the Grating

The present disclosure presents a design scheme for metasurface polarization gratings, that, when illuminated with a prescribed polarization state may produce desired states of polarization on its diffraction orders. By the reciprocity of polarization generators and analyzers, when the grating is used in reverse (that is, light passes through the grating and then a polarizer), the grating may also be used as a polarimeter.

It might seem that the grating itself, without the inclusion of the linear polarizer, could function as a polarimeter alone. After all, as detailed in the present disclosure, each grating order can be thought of as a diattenuator and a waveplate in series. These alone, however, may not be sufficient to form a full-Stokes polarimeter without the linear polarizer.

As detailed in the text, diffraction order m may be thought of as having its own characteristic Jones matrix given by $$J_m = \begin{pmatrix} c_x^m & 0 \\ 0 & c_y^m \end{pmatrix} \begin{pmatrix} e^{j\delta_x^m} & 0 \\ 0 & e^{j\delta_y^m} \end{pmatrix} \quad (6)$$

For a more general view of the behavior of the diffraction order, including its response to partially and un-polarized light, attention turns to the Mueller calculus, that is, the theory of 4×4 matrix operators on Stokes (rather than Jones) vectors [5, 7].

The Mueller matrix of a diattenuator oriented at 0° with respect to the x/y coordinate system is given by $$\frac{1}{2}\begin{pmatrix} c_x^m + c_y^m & c_x^m - c_y^m & 0 & 0 \\ c_x^m - c_y^m & c_x^m + c_y^m & 0 & 0 \\ 0 & 0 & 2\sqrt{c_x^m c_y^m} & 0 \\ 0 & 0 & 0 & 2\sqrt{c_x^m c_y^m} \end{pmatrix} \quad (7)$$

where $c_x^m$ and $c_y^m$ are the amplitude transmission coefficients along x and y. The Mueller matrix of a waveplate also oriented in this way is given by:

$$\begin{pmatrix} 1 & 0 & 0 & 0 \\ 0 & 1 & 0 & 0 \\ 0 & 0 & \cos\delta_m & \sin\delta_m \\ 0 & 0 & -\sin\delta_m & \cos\delta_m \end{pmatrix} \quad (8)$$

Here, $\delta_m = \delta_x^m - \delta_y^m$ is the retardance of the waveplate.

The composite Mueller matrix of diffraction order m, then, is given by $M_m$ the product of the two above matrices:

$$M_m = \frac{1}{2}\begin{pmatrix} c_x^m + c_y^m & c_x^m - c_y^m & 0 & 0 \\ c_x^m - c_y^m & c_x^m + c_y^m & 0 & 0 \\ 0 & 0 & 2\cos\delta_m\sqrt{c_x^m c_y^m} & 2\sin\delta_m\sqrt{c_x^m c_y^m} \\ 0 & 0 & -2\sin\delta_m\sqrt{c_x^m c_y^m} & 2\cos\delta_m\sqrt{c_x^m c_y^m} \end{pmatrix} \quad (9)$$

$M_m$ gives the full-polarization sensitive behavior of the combination of a diattenuator and waveplate on diffraction order m. What is truly of interest is the first row—it is this row that dictates, for a given incident Stokes vector, what power will be measured at the output of the analyzer. If four such analyzers are placed on four diffraction orders, say m=−2, −1, +1, and +2, akin to the polarimeter compared here, one can immediately write the instrument matrix:

$$A = \frac{1}{2}\begin{pmatrix} c_x^{-2} + c_y^{-2} & c_x^{-2} - c_y^{-2} & 0 & 0 \\ c_x^{-1} + c_y^{-1} & c_x^{-1} - c_y^{-1} & 0 & 0 \\ c_x^{+1} + c_y^{+1} & c_x^{+1} - c_y^{+1} & 0 & 0 \\ c_x^{+2} + c_y^{+2} & c_x^{+2} - c_y^{+2} & 0 & 0 \end{pmatrix} \quad (10)$$

By inspection, it is evident that the row-space of A does not span $\mathbb{R}^4$ and one can immediately conclude that det A=0. Inversion is impossible, and this configuration cannot act as a full-Stokes polarimeter.

Let us consider a situation instead in which a polarizer is placed after the diattenuator/waveplate configuration. The polarizer is allowed to take on a general orientation angle relative to x/y which we denote θ. Its Mueller matrix is:

$$\frac{1}{2}\begin{pmatrix} 1 & \cos 2\theta & \sin 2\theta & 0 \\ \cos 2\theta & \cos^2 2\theta & \sin 2\theta \cos 2\theta & 0 \\ \sin 2\theta & \sin 2\theta \cos 2\theta & \sin^2 2\theta & 0 \\ 0 & 0 & 0 & 2 \end{pmatrix} \quad (11)$$

If pre-multiplication is performed for $M_m$ from above with the Mueller matrix of a polarizer oriented at θ, one obtains the Mueller matrix:

$$M'_m = \frac{1}{4}\begin{pmatrix} c_x^m + c_y^m + (c_x^m - c_y^m)\cos 2\theta & c_x^m - c_y^m + (c_x^m + c_y^m)\cos 2\theta & 2\sqrt{c_x^m c_y^m}\cos\delta_m \sin 2\theta & 2\sqrt{c_x^m c_y^m}\sin\delta_m \sin 2\theta \\ \cos 2\theta(c_x^m + c_y^m + (c_x^m - c_y^m))\cos 2\theta & \cos 2\theta(c_x^m - c_y^m + (c_x^m + c_y^m))\cos 2\theta & \sqrt{c_x^m c_y^m}\cos\delta_m \sin 4\theta & \sqrt{c_x^m c_y^m}\sin\delta_m \sin 4\theta \\ (c_x^m + c_y^m + (c_x^m - c_y^m)\cos 2\theta)\sin 2\theta & (c_x^m - c_y^m + (c_x^m + c_y^m)\cos 2\theta)\sin 2\theta & 2\sqrt{c_x^m c_y^m}\cos\delta_m \sin^2 2\theta & 2\sqrt{c_x^m c_y^m}\sin\delta_m \sin^2 2\theta \\ 0 & 0 & -4\sqrt{c_x^m c_y^m}\sin\delta_m & 4\sqrt{c_x^m c_y^m}\cos\delta_m \end{pmatrix} \quad (12)$$

Notably, the first row of this matrix has components in all four of its entries that are, in general, non-zero. An instrument matrix from four such analyzers, all sharing the same polarizer at the same orientation θ:

$$A' = \begin{pmatrix} c_x^{-2} + c_y^{-2} + (c_x^{-2} - c_y^{-2})\cos 2\theta & c_x^{-2} - c_y^{-2} + (c_x^{-2} + c_y^{-2})\cos 2\theta & 2\sqrt{c_x^{-2} c_y^{-2}}\cos\delta_{-2} \sin 2\theta & 2\sqrt{c_x^{-2} c_y^{-2}}\sin\delta_{-2} \sin 2\theta \\ c_x^{-1} + c_y^{-1} + (c_x^{-1} - c_y^{-1})\cos 2\theta & c_x^{-1} - c_y^{-1} + (c_x^{-1} + c_y^{-1})\cos 2\theta & 2\sqrt{c_x^{-1} c_y^{-1}}\cos\delta_{-1} \sin 2\theta & 2\sqrt{c_x^{-1} c_y^{-1}}\sin\delta_{-1} \sin 2\theta \\ c_x^{+1} + c_y^{+1} + (c_x^{+1} - c_y^{+1})\cos 2\theta & c_x^{+1} - c_y^{+1} + (c_x^{+1} + c_y^{+1})\cos 2\theta & 2\sqrt{c_x^{+1} c_y^{+1}}\cos\delta_{+1} \sin 2\theta & 2\sqrt{c_x^{+1} c_y^{+1}}\sin\delta_{+1} \sin 2\theta \\ c_x^{+2} + c_y^{+2} + (c_x^{+2} - c_y^{+2})\cos 2\theta & c_x^{+2} - c_y^{+2} + (c_x^{+2} + c_y^{+2})\cos 2\theta & 2\sqrt{c_x^{+2} c_y^{+2}}\cos\delta_{+2} \sin 2\theta & 2\sqrt{c_x^{+2} c_y^{+2}}\sin\delta_{+2} \sin 2\theta \end{pmatrix} \quad (13)$$

There are suitable choices of the $\{c_x^m\}$, $\{c_y^m\}$, and $\{\delta_m\}$ such that A' is invertible.

Calibration Procedure, Step-by-Step

This section details the calibration procedure used to calibrate the metasurface polarimeter in a very deliberate manner. The process used here may be viewed as a modification of that presented in [55].

Linear Polarizer

Following [55], one may write the instrument matrix to-be-determined in terms of its columns:

$$A = \begin{pmatrix} | & | & | & | \\ \vec{A}_0 & \vec{A}_1 & \vec{A}_2 & \vec{A}_3 \\ | & | & | & | \end{pmatrix} \quad (14)$$

In this first calibration step, the polarization incident on the meta-grating polarimeter is set by a single linear polarizer (Glan-Thompson). When the linear polarizer is oriented at an angle θ, it produces a Stokes vector given by $\vec{S}(\theta) = [1\ \cos2\theta\ \sin2\theta\ 0]^T$ assuming that the power of the incident beam is unity. Then, the intensity vector (that is, the list of intensities measured on the four photodiodes) is given by $A\vec{S}(\theta)$:

$$\vec{I} = \vec{A}_0 + \vec{A}_1 \cos2\theta + \vec{A}_2 \sin2\theta \quad (15)$$

As the incident linear polarization is varied, the values on each of the four channels can be recorded. We can normalize these values by the incident beam power $i_\theta$ and plot against θ.

This yields four sinusoidal curves. By fitting the curves to the functional form of Eqn. 15, the first three columns of the instrument matrix are obtained (that is, $\vec{A}_0$, $\vec{A}_1$, and $\vec{A}_2$).

In FIG. 18, the optical setup during this first stage of calibration is shown. Light from the laser source at λ=532 nm bounces off two alignment mirrors and passes through a quarter-waveplate (as discussed above) to compensate for the preferred linear polarization of the laser source. It passes through two beam reduction lenses so that its spatial extent may fit inside the square boundaries of the 1.5 mm×1.5 mm metasurface polarization grating. After being polarized by a Glan-Thompson linear polarizer, light passes through the metasurface diffraction grating and is split into many diffraction orders, the central four of which pass through a fixed linear polarizer at 45° and then impinge upon four photodiodes, whose values are amplified and recorded on a computer.

The linear polarizer is placed in a motorized rotation mount and its orientation is varied in 5° steps. At each step, a photodiode swings in front of the beam (blocking it), records the beam power, and then swings back out in an automated fashion in order to obtain the incident beam power $i_\theta$. Additionally, for every θ, measurement is made of the power reported by the four photodiodes directly following the metasurface.

It should be noted that this first calibration step introduces a coordinate system to the polarimeter—the θ=0° point of the linear polarizer becomes the origin of the polarimeter's angular coordinate system. This need not be necessarily well-aligned with the optical table or any external coordinate frame.

It was found that, as the linear polarizer rotated, its trajectory on the metasurface sample moved around in a circular orbit, of sorts (as in FIG. 19). At times, the incident beam would near the edge of the sample. This "orbiting" effect compromised the measurements and would severely skew the sinusoidal calibration curves. In order to allow a freedom to correct this effect, the Glan-Thompson polarizer was mounted in a tip/tilt mount before placing it in a motorized rotation mount. Then, the rotation mount was set to rotate at a constant angular velocity and observe the aforementioned "orbit" effect and correct the tip/tilt of the polarizer until it was eliminated.

The source of this effect was not reliably identified. It may be possible that the Glan-Thompson, being a prism polarizer, may suffer from some misalignment of the two prisms relative to one another. Consequently, there would be a refraction at the middle interface.

Linear Polarizer and Quarter-Waveplate

With just a linear polarizer, the first three columns of the instrument matrix are easily determined. The last column involves test polarization states with some chirality.

Circularly polarized light has a Stokes vector given by $[1\ 0\ 0\ \pm 1]^T$ where the ±distinguishes between right- and left-handed circular polarization. As shown in [55], the last column of the instrument matrix may be written as $$\vec{A}_3 = \frac{1}{2}\left(\vec{I}_{RCP} - \vec{I}_{LCP}\right) \quad (16)$$

The (incident intensity normalized) values of the readings on all four photodiodes are to be obtained when exposed to each circular polarization. This presents a problem however; as detailed above, production of perfect circular polarization—at least with off-the-shelf waveplates—is nearly impossible.

Azzam presents a solution [55], so long as the retardance of the waveplate is nearly a quarter-wave, that is, so long as it deviates from 90° by a small angle. A linear polarization and a quarter-waveplate oriented at 45° relative to one another produce nearly circular polarization. If both the polarizer and the waveplate are rotated together by 90°, the same nearly-circular elliptical polarization will be produced, but rotated by 90°. To first order, the effect of averaging the polarimeter's readings when exposed to both configurations is the same as if perfect circular polarization were available.

In Azzam's original scheme, this average contains two data points, at 0° and 90°. In the present disclosure, many such data points between 0° and 360° may be taken in order to decrease error.

In the experiment, as depicted in FIG. 15, both a linear polarizer and a quarter-waveplate are placed in the beampath in front of the metasurface grating polarimeter. Both are controlled with automated rotation mounts. When the quarter-waveplate is inserted, the angular position of its fast axis should be determined. A second Glan-Thompson polarizer is placed in front of the first, and the first polarizer is rotated until the intensity of the beam is nulled (the polarizers are crossed). Then, the quarter-waveplate is inserted between the two, and angular position at which the intensity transmitted through the polarizer-waveplate-polarizer configuration is maximized. This should be where the fast axis is at 45° relative to the first polarizer. This position is determined by testing the transmitted intensity at many angular locations and fitting a trigonometric function to find the location of the maximum.

Next, the second polarizer is removed, so that the first polarizer and the waveplate oriented at a relative angle of 45° remain. The polarizer/waveplate combination is rotated in tandem in 5° increments and at each configuration, the intensities on the four photodiodes are recorded. In addition, the power of the incident beam $i_\theta$ is also recorded in each configuration by a photodiode that moves in and out of the beam.

For each of the four photodiodes, the normalized intensities measured at each $\theta$ are computed. These are averaged together to form the vector $\vec{I}_{RCP}$. Then, the quarter-waveplate is rotated by 90°, and the entire process above is repeated to obtain the vector $\vec{I}_{LPC}$.

This data is depicted in FIG. 16. It is of note that for incident RCP light, the intensity on PD #4 is very low, while for LCP the case is reversed. This confirms that, indeed, one of the diffraction orders produces near-circularly polarized light, as desired. Second, it is noted that the values on each photodiode vary as the linear polarizer/QWP combination is rotated. This is to be expected to a certain extent, since the polarization is not exactly circular. One would expect, however, that the variation would be sinusoidal in nature. Despite our best efforts, we cannot account for the skewed shape of these curves; it may have something to do with the orbiting effect of FIG. 14.

Compilation of the Instrument Matrix

Finally, the instrument matrix can be assembled—the first three columns can be drawn from the linear polarization-only measurements, while the last column can be computed from limp and $\vec{I}_{RCP}$ and $\vec{I}_{LCP}$ cf. Eqn. 16.

A Consistency Check

Once the instrument matrix A has been determined, a consistency check may be conducted to ascertain whether it may be grossly inaccurate, a kind of sanity check.

With all of the data from the calibration on hand, including from the first step with linear polarizations, the raw, un-normalized intensity data recorded on each of the four channels observed as the linear polarizer is rotated. For each linear polarizer orientation $\theta$, recording is made of an intensity vector $\vec{I}_\theta$ during calibration. Computation is performed of $\vec{S}_\theta = A^{-1} \vec{I}_\theta$ which should ideally be a linear polarization state with DOP=1.

In FIG. 17, we plot this calculated DOP of the linear polarization states used during calibration. It can be observed that they never differ by more than about 0.5% from 1. This means that the two parts of the calibration—with the linear polarizer alone and with the linear polarizer and quarter-waveplate together—were in some sense self-consistent. If the DOP were not physical, one may not be able to have faith in the obtained instrument matrix A.

Production of Partially Polarized Light

Conceptual Foundation

Full-Stokes polarimetry, as its name connotes, provides for the determination of the entire Stokes vector. Notably, this allows for the analysis of partially polarized beams of light for which the degree of polarization p may be less than unity.

Partially polarized light may be broken into two broad categories [54]:

Coherently depolarized, in which a beam is composed of many frequencies, each of which has its own time-independent Jones vector. If the Jones vectors of all frequency components align, p=1, but if they are different, in general p<1.

Incoherently depolarized, in which a beam, even if composed of one frequency, may have p<1 if the parameters of the Jones vectors vary in time.

In our experiment, partially polarized light is produced deterministically using a two polarization beamsplitters in a Mach-Zehnder configuration [57], as in the text. The mechanism of depolarization here falls into the latter category: The beam (laser light at $\lambda$=532 nm) is to a very good approximation monochromatic. By varying the distribution of power in the two arms of the interferometer, the light is incoherently depolarized by combining two beams with a lack of phase memory of one another. This configuration is corresponding to a device used in fiber optics known as an air-gap polarization-dependent delay line [54].

One important consideration in constructing this interferometer is that the path length difference be longer than the temporal coherence length $L_{coh}$ of the source being used, so that the arms may truly lack phase coherence with one another. Our laser source was a relatively inexpensive diode-pumped solid state (DPSS) laser at $\lambda$=532 nm. In order to test $L_{coh}$ light is passed from the source into a simple Michelson interferometer, and varied the path length difference between arms until interference fringes were no longer visible [58]. From this quick, qualitative measurement, it is concluded that $L_{coh}$ was on the order of ~1 cm.

As described in the present disclosure and depicted in FIG. 18, as a linear polarizer is rotated in front of the first polarization beamsplitter, the amount of light distributed among the arms of the Mach-Zehnder interferometer is varied and the degree of polarization varies from p=0 to 1 as dictated by the functional relation $|\cos 2\theta|$ where $\theta$ is the angle of the linear polarizer with respect to the axis of the polarization beamsplitter.

As the linear polarizer is rotated in front of the Mach-Zehnder interferometer, recording is made of the values on each of the four photodiodes behind the metasurface grating polarimeter. Using the instrument matrix A obtained above, one may determine the incident Stokes vector $\vec{S}_{inc}$ and thus its degree of polarization p. In the text, it is shown that as the angle of the linear polarizer is varied from 0° to 90°, the measured DOP ranges from unity to a value of 1.2% at 45°. Since $$p = \frac{\sqrt{S_1^2 + S_2^2 + S_3^2}}{S_0},$$

the DOP contains error from every individual Stokes component. Measuring p near 0 presents an especially stringent specification; in order to measure p=0, the intensity readings on all channels should be equal (adjusting for differences in the efficiency of each channel). That is, the projection of unpolarized light onto any analyzer vector is equal. The low DOP reported in the present disclosure, then, speaks to the accuracy of the metasurface grating polarimeter.

Experimental Comment

Described here some subtleties of this measurement as well as difficulties encountered.

Full dataset: For the sake of completeness, it is noted that the partial DOP data presented in FIG. 3d shows data for linear polarizer orientation between 0° and 90°, and a fraction of the data points taken in this range. Indeed, the LP angle changed in increments of 0.25° and the measurement took place over the full range of LP angles between 0° and 360°. This full dataset is shown in FIG. 19.

Sensitivity of alignment: Assurance is made that the front face of each polarization beam splitter (PBS) depicted in FIG. 18 was normal to the incident laser beam. In addition, great care was taken to align the two mirrors of the interferometer (both on tip/tilt mounts) so as to assure that both arms combined into a single, co-linearly propagating output beam.

Beam divergence: Clearly, the beamsplitter configuration depicted in FIG. 18 has an optical path length difference between its arms; it is this very effect that allows it to function as a depolarizer. However, due to a combination of the small size of the beam coming from the telescope (it should be small enough to entirely fit inside the spatial extent of the 1.5 mm×1.5 mm grating structure) and imperfect beam re-collimation (the positions of the lenses are adjusted by hand), the beam diverges by different amounts when traversing the two arms of the interferometer. As a result of this effect, the beams coming from the two arms of the interferometer are not equal in size.

While this effect is minimized, it may not be truly eliminated. It is theorized that this effect is a major source of error in determining the degree of polarization. In order to observe a DOP near zero, beams of equal intensity from the two arms should interfere in order to produce an incoherently depolarized beam. However, if the two beams possess a different spatial profile from one another, the degree of polarization will vary over the area of the resulting beam and the measured degree of polarization will be some spatial average that is, in general not 0. This effect is depicted in FIG. 21. This could be a major contributor limiting the minimum DOP measured.

When all of these effects were not fully accounted for, measurement is made of some deviating results. Some of these are shown in FIG. 20. In certain cases (such as a), the DOP variation was not symmetric about 45°. In other cases (b), the DOP follows the correct trend in angle but does not stay within the correct bounds. The DOP in b can be observed to, not return to the expected value of 1 while at other angles it exceeds it, which is unphysical. It is theorized that these erroneous curves derive from a combination of the effects detailed above.

Error Propagation And Error Bars

It is aimed to be able to place uncertainty bounds on each element of the Stokes vectors computed with the metagrating based polarimeter. Recall that the Stokes vectors are determined from the formula $$\vec{S} = A^{-1} \vec{I}$$

If the uncertainty on the elements of A and $\vec{I}$ is known, it is possible to propagate this uncertainty through Eq. 17 in order to determine uncertainty bounds on all four Stokes coordinates.

First discussion is made of how uncertainty on A and $\vec{I}$ is determined.

Uncertainty Bounds on Measured Intensities

Being a four-vector, the uncertainty in $\vec{I}$ is most generally described by a symmetric 4×4 covariance matrix which not only characterizes the self-variance of each entry but also correlations between variances of the elements.

In this disclosure, the intensity on each photodiode is sampled for a duration of ~0.5 seconds. There is, then, a statistical distribution of measured voltages during this time interval.

For each photodiode i, computation is made of the standard deviation $\sigma_i$ of this distribution. This is taken to be the self variance of channel i. For simplicity, the covariances are regarded to be 0, an assumption which may well not be justified. The covariance matrix of $\vec{I}$, then, is taken to be diagonal. Except in the case of, e.g., the laser source unexpectedly mode-hopping, variations in $\vec{I}$ are generally very small; the error bars would, probably, not be much affected by neglecting the error in $\vec{I}$ altogether.

Uncertainty in the Instrument Matrix

The instrument matrix A, though used to ascertain the Stokes vector $\vec{S}$, is itself also a measured quantity. The elements of the 4×4 instrument matrix are themselves determined by the calibration procedure. The matrix, being a list of 16 statistical quantities, has an associated 16×16 symmetric covariance matrix quantifying its uncertainty.

The first three columns, that is, the leftmost 12 elements of the instrument matrix, are determined from the calibration step involving a linear polarizer only. For each photodiode, the normalized intensity is recorded as a function of the linear polarizer angle. Theoretically, the resulting data follows a three-parameter trigonometric curve for each photodiode. The first three elements of row i of the instrument matrix come from the fitting parameters to the data from photodiode i.

The curves are fitted with a nonlinear least-squares regression which, along with the optimized fitting parameters, provides estimate of the covariance matrix for the fitting parameters. The square root of the diagonal of this matrix provides the variance of each of the fitting parameters. Off-diagonal elements provide the covariance of the fitting parameters for photodiode i.

While we can obtain a covariance matrix for each of the individual curve fits, this technique provides no measure of the covariance between fitting parameters for different curves. Thus, covariances are disregarded between different fitting parameters and the self-variance (e.g., the standard deviation) of each fitting parameter is kept.

The approximation is made that the covariance matrix for A, then, is diagonal.

Next, uncertainty bounds are placed on the rightmost column of the instrument matrix. This part is obtained from the step in the calibration that uses both a quarter-waveplate and a linear polarizer. This procedure is done for both nominally LCP and RCP light, cf. FIG. 16. The difference in the mean values for LCP and RCP become the fourth column of the instrument matrix. The variation of the voltage of each photodiode with angle is taken to be a statistical quantity, and take the uncertainty in each element of the fourth column to be the standard deviation of these variations in FIG. 16. The final uncertainty in the elements of the fourth column is the difference between the mean values in both curves, so the errors from each curve have to be appropriately propagated. Notably here covariances are ignored—one could selectively generate a covariance matrix for the fourth column, but there is no clear way to estimate the covariances of elements in the fourth column with the rest of the matrix. Moreover, this is likely not the best estimate of the variance of these elements—the intensity variations manifest in FIG. 16 are in some sense expected, and are not a result of random variations. Perhaps a better measure would be the deviation of the curve from a sine curve, its expected theoretical form.

In summary, the full 16×16 covariance matrix of the 4×4 instrument matrix A is assumed to be diagonal in form. This is perhaps a limiting assumption. Overall, however, this is intended to merely provide order-of-magnitude estimates for the precision of the polarimeter. (Note: Once propagated through the matrix inversion process, the covariance matrix of $A^{-1}$ is in general not diagonal [59]).

The above information is summarized in FIG. 22.

Error in the Measured Stokes Vector

Obtained are estimates for the covariance $cov(I_k, I_l)$ between the kth and lth elements of $\vec{I}$, and the covariance $cov(A_{ij}, A_{qp})$ between the ijth and qpth entries in A—both taken to be diagonal matrices. It is desired to compute $cov(S_i, S_j)$, or more generally the covariance matrix for the inferred Stokes vector.

An explicit solution to this problem in the context of polarimetry was first presented in [59]. It is reproduced here.

The covariance matrix of $\vec{S}$ is given by $$cov(S_i, S_j) = \Sigma_{\alpha,\beta} I_\alpha I_\beta cov(D_{i\alpha}, D_{j\beta}) + \Sigma_{k,l} D_{ik} D_{jl} cov(I_k, I_l) \quad (18)$$

The $\alpha$, $\beta$ summation is over all combinations of $\alpha=[1, 4]$ and $\beta=[1, 4]$, with the same for the k, l summation. Here $D=A-1$. Its covariance matrix is given in the case of a square matrix by $$cov(D_{\alpha\beta}, D_{ab}) = \Sigma_{i,j} D_{\alpha i} D_{j\beta} D_{ai} D_{jb} \sigma(A)_{ij}^2 \quad (19)$$

where $\sigma(A)_{ij}^2$ is the self-variance of the ijth element of A (assumption is made that A has a diagonal covariance matrix).

Error bars can be placed on the computed Stokes parameters by examining the diagonal elements of Eqn. 18. The full covariance matrix obtained can be used to propagate the error to quantities derived from the Stokes parameters.

Error in Derived Quantities

In the present disclosure, data is presented on several quantities derived from the Stokes vector $\vec{S}$. Presented here, for the sake of completeness, are error propagation formulae based on knowledge of the full covariance matrix of the Stokes vector.

Degree of polarization:

$$p = \frac{\sqrt{S_1^2 + S_2^2 + S_3^2}}{S_0},$$

so the variance in the degree of polarization $$\Delta p = \sqrt{\sigma^2(S_0) \frac{S_1^2 + S_2^2 + S_3^2}{S_0^4} + \Sigma_{i=1}^3 \frac{\sigma^2(S_i) S_i^2}{S_0^2(S_1^2 + S_2^2 + S_3^2)} - \Sigma_{i=1}^3 \frac{2cov(S_0, S_i) S_i}{S_0^3} + \Sigma_{i,j} \frac{2cov(S_i, S_j) S_i S_j}{S_0^2(S_1^2 + S_2^2 + S_3^2)}} \quad (20)$$

The last sum is taken over all unique pairs i, j for values of i and j between 1 and 3 for which i≠j. $\sigma^2(S_i) = cov(S_i, S_i)$.

Azimuth: The azimuth $\theta$ of the polarization ellipse is given by $$\theta = \frac{1}{2} \arctan \frac{S_2}{S_1}.$$

Then the variance is obtained as $$\Delta\theta = \frac{1}{2} \sqrt{\frac{S_1^2 \sigma^2(S_2) + S_2^2 \sigma^2(S_1) - 2S_1 S_2 cov(S_1, S_2)}{S_1^2 + S_2^2}} \quad (21)$$

Ellipticity: The ellipticity angle $\epsilon$ of the polarization ellipse is given by $$\epsilon = \frac{1}{2} \arctan \frac{S_3}{\sqrt{S_1^2 + S_2^2}}.$$

Its variance is obtained as $$\Delta\epsilon = \frac{1}{2} \sqrt{\frac{\sigma^2(S_3)(S_1^2 + S_2^2)}{(S_1^2 + S_2^2 + S_3^2)^2} + \frac{\sigma^2(S_2) S_2^2 S_3^2}{(S_1^2 + S_2^2)(S_1^2 + S_2^2 + S_3^2)^2} + \frac{\sigma^2(S_1) S_1^2 S_3^2}{(S_1^2 + S_2^2)(S_1^2 + S_2^2 + S_3^2)^2} + \frac{2cov(S_1, S_3) S_1 S_3 + 2cov(S_2, S_3) S_2 S_3}{(S_1^2 + S_2^2 + S_3^2)^2}} \quad (22)$$

This expressions are derived straightforwardly from partial derivatives and error analysis. These values set the error bars on these quantities and utilize the full covariance matrix of the $\vec{S}$.

It should be noted that, by the very nature of these expressions, the error is larger near some values than others. This can be seen in graphs of azimuth and ellipticity in the present disclosure. In regions where $S_1$ is very nearly 0, the azimuth $\theta$ is very nearly 45°; the error bar on azimuth here will be larger due to dividing by a small quantity with error. The same can be said of ellipticity near 45°.

Comparison With the Commercial Rotating Waveplate Polarimeter (RWP)

General Description of Experiment

In the present disclosure, comparison is made the performance of the meta-grating based polarimeter to that of a commercial rotating waveplate polarimeter. In particular use is made of ThorLabs #PAX5710VIS-T, a visible frequency, free-space rotating waveplate polarimeter.

In the experiment, laser light bounces off of two alignment mirrors, passes through a low-quality quarter-waveplate in order to compensate for the laser's preferential polarization, and then goes through the aforementioned beam re-sizing optics to shrink the laser beam to a size that fits inside the 1.5 mm×1.5 mm metasurface grating. These features are common to FIGS. 23 and 24. However, as is detailed below, the setup is changed slightly for different aspects of the comparison.

Comparison of Degree of Polarization

First, comparison is made of DOP readings between polarimeters. As depicted in FIG. 23, the setup includes a rotating (Glan-Thompson) linear polarizer (LP) on a motorized rotation mount in front of the previously described Mach-Zehnder setup. The metasurface grating polarimeter (i) is placed in the beampath, and a list of random LP angular orientations is generated and stored. Intensity measurements are recorded on all four photodiodes, and using the previously determined instrument matrix A, the resulting Stokes vector and its DOP are computed.

The metasurface grating polarimeter is replaced with the RWP (ii). The same LP angular orientations are visited, in the same order. The RWP determines the full-Stokes vector, including the measured DOP, and it is stored on a computer.

In the present disclosure, computation is made of the differences in the DOP measured by both polarimeters and find that the distribution of differences has a mean value $\mu=0.6\%$ and a standard deviation of $\sigma=1.6\%$. Note that in the comparison plot, there is a bias toward high DOP due to the shape of the $|\cos 2\theta_{LP}|$ curve.

Comparison of Ellipticity and Azimuth

Next, comparison is made of the properties of the polarization ellipse reported by both polarimeters. Use is made of the setup in FIG. 24, which is mostly identical to that in FIG. 23 except for a zero-order quarter-waveplate (QWP) on a motorized rotation mount in place of the Mach-Zehnder interferometer. The metasurface grating polarimeter (i) is placed in the beampath, and a set of random LP and QWP angular orientations is generated and stored. The list of orientations is re-ordered to optimize for travel time. Then, the LP and QWP visit each of these angular orientations and the voltages on all four photodiodes are computed and converted to a Stokes vector by using A. Then, computation is made of the azimuth and ellipticity double angles:

$$2\theta = \arctan\frac{S_2}{S_1} \quad (23)$$

and $$2\epsilon = \arctan\frac{S_3}{\sqrt{S_1^2 + S_2^2}} \quad (24)$$

Consideration is made of $2\theta$ and $2\epsilon$ because these are the angular coordinates from the Poincare sphere, and are double the parameters of the actual ellipse.

The metasurface grating polarimeter is removed and the RWP is put in its place (ii). The same set of angles is revisited and the polarization parameters reported by the RWP are stored on the computer.

In the present disclosure, computation is made of the differences in the these quantities measured by both polarimeters and examine them as statistical distributions. It is found that for azimuth $2\theta$, the mean difference is $\mu=0.004$ rad and the standard deviation is $\sigma=0.046$ rad. For ellipticity $2\epsilon$, the mean difference is $\mu=0$ rad and $\sigma=0.015$ rad. These quantities are multiplied by $\frac{1}{2}$ for $\theta$ and $\epsilon$ alone.

Reason for Change in Setup

In the most general case, DOP, azimuth, and ellipticity can all vary simultaneously. Thus, for the most general comparison between polarimeters, the LP/Mach-Zehnder configuration should be followed by a second LP and a QWP. This way, by varying the angles of both LPs and the QWP, arbitrary states of polarization with varying overall intensity, DOP, azimuth, and ellipticity would be generated and compared.

It is noticed however, that the inclusion of the Mach-Zehnder interferometer to generate arbitrary DOP added significant noise to the determined polarization ellipse. Even without touching anything, it is noticed that the reading can vary significantly within the time scale of a second. When the mirrors of the Mach-Zehnder were brushed lightly with, e.g., a fingertip, the polarization ellipse would change drastically.

This effect is noticed in the readings from both the metasurface grating polarimeter and the commercial RWP, and it was particularly pronounced at low DOP. After all, the DOP p quantifies the ratio of the beam that may be considered fully polarized to that part that is totally unpolarized. Consequently, when trying to determine the parameters of the polarization ellipse at low DOP, the power that informs such a measurement is a small fraction of that of the incident beam. Compared to the unpolarized background, this is consequently harder to measure, and it is also more affected by noise in the measurement.

Therefore, a comparison of fully arbitrary polarization states between the two polarimeters would present an unfair assessment of the performance of the metasurface grating polarimeter. Since the polarization ellipse parameters were especially jittery on both polarimeters, this effect may be encountered twice over since the RWP is regarded to be an absolute polarization reference. Therefore, comparison is made of DOP and ellipticity/azimuth from separate datasets. The full parameters from both such datasets—with and without the Mach-Zehnder—are presented in FIGS. 25 and 26, respectively. The portions of these figures used in present disclosure FIG. 4a are highlighted with a dashed box. The standard deviations of azimuth/ellipticity in FIG. 25 are indeed about double those in FIG. 26, and the DOPs measured in FIG. 26 are all about 1.0, as is to be expected.

Data Post-Processing

Documented here is post-processing performed on the polarimeter comparison dataset before it is presented in FIG. 4 of the present disclosure.

Azimuth offset: During calibration of the metasurface grating polarimeter, the orientation of the linear polarizer which is labeled "0" becomes the origin of the polarimeter's coordinate system. Similarly, when the RWP is calibrated, it too is imbued with a coordinate system. These coordinate systems are in general rotated by an angle relative to one another called the azimuth offset. This is a constant offset to azimuth between data reported by the two polarimeters. For the sake of simplicity, subtraction is made from all metasurface azimuth data the mean difference in azimuths reported by both polarimeters. This is perhaps not the best scheme—in essence, this means that the metasurface azimuth data is shifted so as to assure that the mean difference in azimuth values between the polarimeters is 0. Thus, the mean of the azimuth histogram has no meaning. A better, unbiased strategy would be to measure the state produced with the LP at 0° with the RWP and use its azimuth as the azimuth offset. However, many calibrations are run and this additional step is omitted. This may be employed in other implementations presenting a thorough error characterization of the metasurface grating polarimeter. It is note that this procedure has no effect on the comparison of the ellipticity between polarimeters.

Distinction between RCP and LCP: Which handedness of circular polarization is called "right" or "left" is ultimately a subjective distinction. Which the metasurface grating polarimeter "calls" right (or left) is set during the step of the calibration involving a LP and QWP together; whichever is deemed "right" there becomes right for the polarimeter. This convention may differ between the two polarimeters, which would manifest itself as a negative ellipticity correlation rather than positive. If this is present, the trend of the data is reversed to correct for the arbitrary distinction.

Pruning of data with especially high error bars: A peculiarity of the (very basic, inexpensive) λ=532 nm laser source used in our experiment is that it tends to occasionally hop modes, producing sharp fluctuations in output power. Measurements by the metasurface grating polarimeter were averaged over a 0.5 s integration time, and the resulting polarimetric measurement is skewed if this occurs. Since the measurements were completely automated, there was no means of identifying this at-the-time-of-measurement to discard these data points. Instead, these points are identifiable by their especially large error bars. Fluctuation during measurement produces high error in 1 which is propagated to measured quantities. In particular, removal is made of any points from the data whose error in any of the three quantities (DOP, azimuth, ellipticity) is larger than three times the mean value of error for the dataset.

Comment on Results

What exactly do the histograms presented in present disclosure FIG. 4a mean? It is the error bars on the individual data points which quantify the precision of the measurements (e.g., the range of measured values expected over many subsequent iterations of the measurement with the same incident polarization). However, in certain regimes one may expect that these error bars are larger than others (as discussed above); that is, the size of the error bar for, e.g., azimuth or ellipticity is in part a function of the azimuth or ellipticity itself. In the histograms, the statistical distribution of the difference is considered between the measured value and (what is taken to be) the true value. Depending on the polarization states of the test points, these distributions could be artificially broadened or narrowed. That is if, e.g., we concentrate on polarization states whose azimuths fall in the regions where the precision on azimuth is consequently higher, the distribution will be narrower. If measurements are concentrated in a region where, e.g., the precision of azimuth is less, the distribution will be artificially broadened, and one would say that the polarimeter is less accurate. In order to be unbiased, the measurement points should be uniformly distributed in the entire range of the given parameter, so that all of the best cases and the worst cases are uniformly represented. If this is done, the standard deviation of the distribution of differences between measurement and a reference can be indicative of the accuracy of the polarimeter in that particular quantity; the mean is indicative of some systematic error that causes the polarimeter to be off by a constant amount relative to a reference.

TABLE I

Comparison of accuracy results from the polarimeter comparison

| Quantity | Metagrating Polarimeter | ThorLabs Spec Sheet (RWP) |
|---|---|---|
| Degree of Polarization (DOP) | 1.6% | 0.5% |
| Azimuth | 1.32° | 0.2° |
| Ellipticity | 0.43° | 0.2° |

In this disclosure, exploration is made of (somewhat uniformly) all possible values of DOP, azimuth, and ellipticity relative to what is treated as an absolute polarization reference, that being the RWP. To a good approximation, then, one can treat the σ of these differences to be a measure of the accuracy.

The results of this are listed in Table I, with values for the RWP obtained from the spec sheet (as of this time listed on ThorLabs' webpage. In comparing the values, one should keep in mind that how the accuracies of the RWP are obtained are unknown, so whether they are directly comparable is unknown. Additionally, the RWP is treated as an absolute polarization reference. If this is not the case (it is certainly not), it will increase the perceived error of the metasurface grating polarimeter.

The overall point made here is that the accuracies for the metasurface grating polarimeter are in the same ballpark as that of the RWP, despite being a device with no moving parts or bulk polarization optics. With further optimization and engineering, the two polarimeters could unquestionably become comparable.

Angle Dependence Of Polarization Production And Polarimetry

A practical question that arises with any new diffractive optical element is that of angle-dependence. In this disclosure, metasurface polarization gratings are presented that may generate specific states of polarization when a known polarization state is incident. Additionally, the grating may function as a polarimeter. In this section, examination is made of angle-of-incidence effects on both of these applications.

In the strictest sense, the phase shift produced by the individual metasurface subwavelength elements is valid for a given angle. However, as will be seen in what follows, the metasurface is surprisingly robust with respect to angle.

Effect of Off-Normal Incidence on the Produced Polarization Ellipses

The metasurface is designed so that, when illuminated with 45° linearly polarized light, desired polarization states are produced on the diffraction orders. In order to investigate this effect, the experiment shown schematically in FIG. 27 is performed. Light passes through a linear polarizer (LP) oriented at 45° relative to the coordinate system of the diffraction grating. The grating is turned about its center at an angle of θ relative to the beam, and the polarization ellipses of the light on the diffraction orders are measured with a commercial RWP.

This measurement is carried out for θ between −40° and +40°, for gratings producing a tetrahedron of polarization ellipses and the grating producing +45°/RCP/LCP/−45°. The results are presented in a variety of forms in FIGS. 28, 29, and 30.

Effect of Off-Normal Incidence on Polarimeter Calibration and Stokes Vector Determination Description of Error Analysis Scheme A polarimeter is calibrated with a beam impinging at one angle of incidence; if it is then used at a different angle of incidence, the determined Stokes vector will consequently contain error. This is an effect relevant to all polarimeters, including the rotating waveplate polarimeter where the angle of incidence on the rotating QWP unquestionably affects the retardance observed.

A small study is conducted on the metasurface grating polarimeter to determine its susceptibility to angle dependent effects. If the polarimeter is calibrated for a 0° angle-of-incidence, how much could an end user accidentally tilt the device and still expect to obtain reasonably accurate results?

A scenario is considered in which the polarimeter is used assuming an instrument matrix obtained from a calibration at, say, 0° incidence, at a different angle. In this case then, there is a "perceived" instrument matrix $A_p$ which the user applies believing that is correct, and an "actual" instrument matrix $A_a$ that reflects the true behavior of the polarimeter. If the user makes an observation in the form of an intensity vector $\vec{I}_{meas}$, they will report a measured Stokes vector $\vec{S}_p = A_p^{-1} \vec{I}_{meas}$. The Stokes vector in actuality, however, is $\vec{S}_a = A_a^{-1} \vec{I}_{meas}$, meaning that there is a measurement error which one can express in vector form:

$$\vec{\Delta}(\vec{I}_{meas}) = (A_p^{-1} - A_a^{-1}) \vec{I}_{meas} \quad (25)$$

Notably, the error $\vec{\Delta}$ is itself a function of the measured intensities $\vec{I}_{meas}$. Those measured intensities are a function of the actual incident polarization state, $\vec{S}_a$. Thus, the error accrued from use of the incorrect instrument matrix (because of e.g., an angular tilt of the polarimeter) has a polarization dependence.

The above discussion suggests a Monte-Carlo-like error analysis scheme. This scheme is depicted in FIG. 26. One can start with a set of actual Stokes vectors that might be incident on the polarimeter, $\{\vec{S}_a\}$. Using the actual instrument matrix of the device (e.g., the instrument matrix at a given tilt θ), computation can be made, for each of the actual Stokes vectors of a set of measured intensity vectors that would actually be observed by the user, $\{\vec{I}_{meas}\}$. Since the user makes use of an incorrect, perceived instrument matrix $A_p$, when these measured intensities are analyzed, they will compute a set of perceived Stokes vectors $\{\vec{S}_p\} = A_p^{-1} \{\vec{I}_{meas}\}$. Of course, if $A_p = A_a$, the user will reproduce the actual Stokes vectors, but in general this is not the case, and the error of the polarimeter can be analyzed by comparing the elements of $\{\vec{S}_a\}$ to those of $\{\vec{S}_p\}$ (FIG. 26). There are many possible metrics for quantifying this error.

This error analysis scheme shows how a given Stokes vector will be measured by a polarimeter that is out of its calibration condition. In general, the whole Stokes vector will be deformed, so a user measuring a given beam will not only observe a different polarization ellipse, but may also report a different beam power or a beam that appears artificially polarized or depolarized.

Incident Angle Error Analysis of Meta-Grating Polarimeter

The difference between $A_a$ and $A_p$ could come from any error source, but in the present case it is desired to examine the effect of angle of incidence. To this end, calibration is made of the polarimeter using the methods extensively detailed in this disclosure at normal incidence. Then, the calibration is conducted at several other angles of incidence (the meta-grating is mounted on a rotation mount, akin to the experiment shown in FIG. 27). In particular, the calibration is conducted at incident angles of 5°, 10°, 15°, and 20°.

In a realistic situation, a user will believe that they are using the instrument matrix from calibration, that is, $A_p = A_0°$. If, however, the device is tilted at angle θ, $A_a = A_θ$. The analysis detailed above is performed for all incident angles for which calibration is made of the polarimeter. Consideration is made of the simulated input polarizations $\{\vec{S}_a\}$ a uniform sampling of points on the surface of the Poincaré sphere. (In a more general analysis, the entire volume of the sphere would be included too to account for partially polarized inputs).

The analysis described above is conducted; the results are depicted in FIG. 32a-c. One starts with a set of incident Stokes vectors $\{\vec{S}_a\}$ which more or less sample the surface of the Poincare sphere (left side of FIG. 32a-c). Then, at each angle θ, the "perceived" Stokes vectors $\{\vec{S}_p\}$ that would be reported are computed using the scheme in FIG. 31. The set $\{\vec{S}_p\}$ for each angle is plotted on the Poincare sphere in FIG. 32a-c, and its error relative to the set $\{\vec{S}_a\}$ is evaluated using several metrics. One of these is the absolute error in degree of polarization (DOP) between $\{\vec{S}_a\}$ and $\{\vec{S}_p\}$. The results for each angle, including the maximum and minimum DOP error for the entire set, are displayed in FIG. 32a-c, where the error in DOP is depicted by a color scale between green and red with red indicating the highest error.

The Stokes vectors constituting the rows of the instrument matrix are frequently referred to as analyzer vectors because any incident Stokes vector is projected on these to produce the measured intensities $\vec{I}$. Also shown in FIG. 32a-c are the analyzer vectors at angle θ (the rows of the instrument matrix $A_θ$) alongside the ideal tetrahedron.

Discussion/Conclusion

From the previous study whose results are detailed in Table I, the uncertainty on the DOP, azimuth, and ellipticity of measured polarization ellipses are known for normal-incidence polarimetry. In order to evaluate the effect of off-normal incidence on polarimetric performance, the a of the errors for each quantity (displayed in FIG. 32a-c) may be compared to the precision (in Table III). Even at a 5° misalignment, the errors exceed the uncertainties measured at normal incidence, but not exceedingly so (6% vs. 1.6% for DOP, 2.96° vs. 1.32° for azimuth, and 1.59° vs. 0.43° for ellipticity). Qualitatively, then, the polarimeter could suffer an accidental misalignment of 5° or less and still offer reasonable accuracy, with some polarization states that would yield particularly high error (clustered around the red regions in FIG. 32a-c).

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale.

There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

All of the publications, patent applications and patents cited in this specification are incorporated herein by reference in their entirety.

What is claimed is:

1. A detector comprising:
a substrate; and
an array of pillars disposed on the substrate, wherein each pillar includes two perpendicular mirror symmetry axes, and each adjacent pair of the pillars are separated by less than 1 micron,
wherein the array of pillars are configured to produce, when illuminated with a polarized incident light, a diffracted light beam with a distinct polarization state for each of a finite number of diffraction orders, wherein the finite number is 2 or more.

2. The detector of claim 1, wherein the phase-shifting elements comprise titanium dioxide, silicon nitride, an oxide, a nitride, a sulfide, or a pure element.

3. The detector of claim 1, wherein the array of pillars are further configured to produce, when illuminated with the polarized incident light, four distinct polarization states.

4. The detector of claim 3, wherein the array of pillars are further configured to produce a +45° linear polarization state, a right circular polarization state, a left circular polarization state and a −45° linear polarization state at −2, −1, +1 and +2 diffraction orders, respectively, when illuminated with the polarized incident light which is +45° linear polarized relative to a surface of the substrate.

5. The detector of claim 3, wherein the array of pillars are further configured to produce at −2, −1, +1 and +2 diffraction orders four polarization states corresponding to vertices of a tetrahedron inscribed in a Poincaré sphere when illuminated with the polarized incident light which is +45° linear polarized relative to a surface of the substrate.

6. The detector of claim 1, wherein each dimension of the substrate parallel to a surface of the substrate is no more than 2 millimeters.

7. The detector of claim 1, wherein polarization states for each of the diffraction orders are linearly independent.

8. The detector of claim 1, further comprising one or more detecting elements, each configured to detect the diffracted light beam for one of the diffraction orders.

9. The detector of claim 8, wherein the one or more detecting elements comprise one or more single-wavelength detecting elements, one or more multi-wavelength detecting elements, or one or more imaging sensors.

10. The detector of claim 9, wherein the one or more single-wavelength detecting elements are linear in intensity at a wavelength of the polarized incident light.

11. The detector of claim 8, wherein the one or more detecting elements comprises one or more imaging sensor elements.

12. The detector of claim 1, further comprising a first linear polarizer positioned on an optical path of an incident light towards the array of subwavelength-spaced phase-shifting elements.

13. The detector of claim 12, further comprising a second linear polarizer on an optical path of the diffracted light beam towards the one or more detecting elements.

14. The detector of claim 13, wherein an extinction ratio of the second linear polarizer is in a range from 500 to 200,000.

15. The detector of claim 1, further comprising a refractive lens positioned in an optical path of the diffracted light beam or in an optical path of the incident light.

16. The detector of claim 1, wherein each of the pillars have different dimensions from at least one other pillar of the array.

17. The detector of claim 16, wherein the different dimensions comprise different widths or different lengths.

18. The detector of claim 16, wherein the dimensions of the pillars adjust for independent and tunable phase delays $\phi_x$ and $\phi_y$ on the incident light of x and y polarization.

19. The detector of claim 1, wherein the array of pillars are rectangular.

20. The detector of claim 1, wherein the array of pillars tessellate together to form a two-dimensional grating.

21. The detector of claim 1, wherein the array of pillars all have the same angular orientation.

22. The detector of claim 1, wherein the array of pillars are formed in unit cells, wherein each unit cell has 10 to 40 pillars.

23. The detector of claim 22, wherein the unit cells are tessellated to form a two-dimensional grating.

* * * * *